(12) United States Patent
Hori et al.

(10) Patent No.: US 6,792,280 B1
(45) Date of Patent: Sep. 14, 2004

(54) INFORMATION DELIVERY SYSTEM AND SERVER

(75) Inventors: Yoshihiro Hori, Gifu (JP); Miwa Kanamori, Ogaki (JP); Megumi Makino, Gifu (JP); Toshiaki Hioki, Ogaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 271 days.

(21) Appl. No.: 09/610,639

(22) Filed: Jul. 5, 2000

(30) Foreign Application Priority Data

Jul. 5, 1999 (JP) .......................................... 11-190484
Apr. 17, 2000 (JP) ...................................... 2000-114641

(51) Int. Cl.[7] .............................................. H04B 1/20
(52) U.S. Cl. ........................ 455/517; 455/418; 455/419
(58) Field of Search ............................... 455/405, 406, 455/412, 413, 422, 466, 414, 414.1, 412.1, 517, 419, 426.1, 414.4; 705/40

(56) References Cited

U.S. PATENT DOCUMENTS 6,014,569 A  *  1/2000  Bottum ...................... 455/466
6,044,275 A  *  3/2000  Boltz et al. .................. 455/466
6,167,255 A  * 12/2000  Kennedy et al. .......... 455/414.1
6,317,609 B1 * 11/2001  Alperovich et al. ...... 455/556.1
6,330,550 B1 * 12/2001  Brisebois et al. ............. 705/75
6,349,224 B1 *  2/2002  Lim .......................... 455/466

FOREIGN PATENT DOCUMENTS

EP     0 898 378 A2  *  2/1999  ............ H04B/1/20

* cited by examiner

Primary Examiner—William Trost
Assistant Examiner—Brandon J Miller
(74) Attorney, Agent, or Firm—Armstrong, Kratz, Quintos, Hanson & Brooks, LLP

(57) ABSTRACT

An information delivery system includes a delivery server and two cellular phones. For example, when one cellular phone accesses the delivery server and requests a delivery of content data such as music data, desired music data is delivered from the delivery server onto the one cellular phone. Meanwhile, if the one cellular phone accesses the delivery server and designates a destination (the other portable phone) and a day and hour of delivery and then executes a schedule of delivery, music data is delivered on a scheduled day and hour from the delivery server to the other cellular phone.

44 Claims, 30 Drawing Sheets

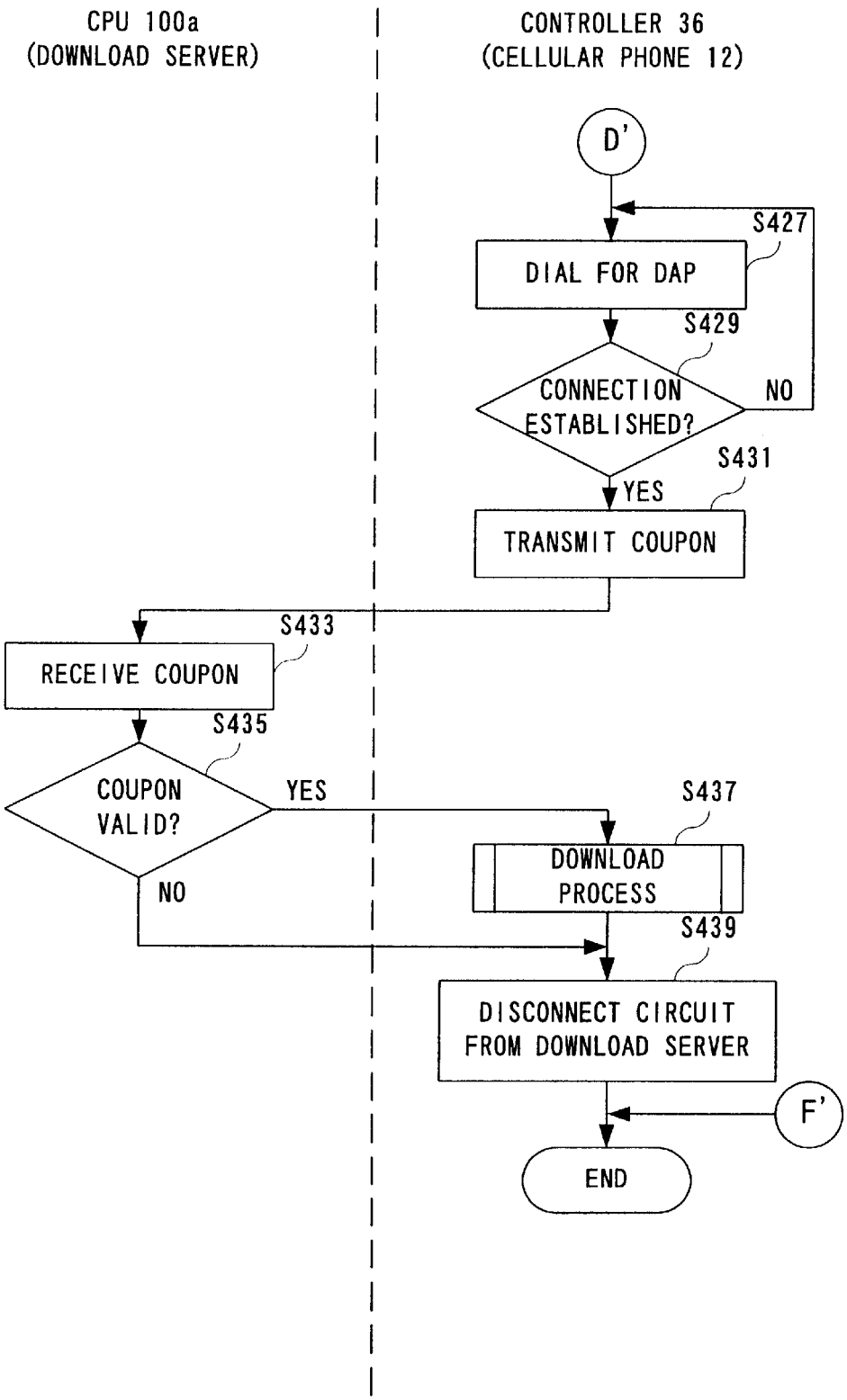

INFORMATION DELIVERY SYSTEM AND SERVER

BACKGROUND OF THE INVENTION

1. Field of the Invention

This invention relates generally to information delivery systems and, more particularly, to an information delivery system for delivering content data such as music data.

2. Description of the Prior Art

Presently, music information (music data) previously recorded on a recording medium, such as a compact disk (CD) or a mini-disk (MD), is reproducible by use of an exclusive reproducer. Meanwhile, there recently are proposals on such a system that music information is delivered to a communication equipment installed at a particular site so that a user can record the delivered music information onto his or her recording media.

However, in the former case there is a necessity of purchasing a desired recording medium in a record shop. There often are cases for newly released popular music to be sold out. Meanwhile, in the latter case music information must be obtained through a communication equipment installed at a particular site thus resulting in inconvenience.

In order to avoid this, the present inventors have proposed, in Japanese Patent Application No. H11-75916, a system having delivery terminal and music reproducing functions provided on the cellular phones in order to facilitate delivery of music while protecting copyright thereof.

This system is convenient in receiving desired music information on one's own cellular phone. However, where delivering music information, there is difficulty in giving music information to another person because identification is required with a unique ID related to a telephone no. of the cellular phone.

SUMMARY OF THE INVENTION

Therefore, it is a primary object of the present invention to provide an information delivery system capable of giving a present of music information to another person.

An information delivery system according to the present invention, comprises: at least two portable communication terminals; and a delivery server for delivering data to the portable communication terminal, wherein the portable communication terminal includes delivery information input means to input delivery information including destination terminal information representative of at least the portable communication terminal as a destination, a delivery information transmitting means to transmit the delivery information inputted by the delivery information input means to the delivery server, delivery data receiving means to receive the data delivered from the delivery server, and recording means to record the data received by the delivery data receiving means; and the delivery server including delivery information receiving means to receive the delivery information from any of the portable communication terminals, and delivery means to deliver the data to the portable communication terminal as the destination based on the delivery information received by the delivery information receiving means.

The information delivery system of the invention has at least two portable communication terminals. The portable communication terminal has delivery information input means. The input means inputs delivery information including destination terminal information representative of at least a destination portable communication terminal, and the delivery information transmitting means transmits it to the delivery server. In the delivery server, the delivery information receiving means receives the delivery information. Accordingly, the delivery means delivers data such as music data encrypted based on the received delivery information, data required to reproduce the encrypted music data, etc. to the destination portable communication terminal. The data is received by the data receiving means provided on the portable communication terminal and recorded to a recording means. That is, data can be delivered to a desired portable communication terminal. In other words, it is possible to give a present to a user at a destination of a portable communication terminal. Incidentally, if a telephone no. of one's portable communication terminal is inputted as a destination of delivery, music data such as newly released popular music can be delivered to his or her portable communication terminal.

According to the invention, delivery information includes destination terminal information representing a portable communication terminal as a destination so that data is delivered based on the delivery information. Consequently, data such as music data can be given as a present to other persons.

In a certain aspect of the invention, the delivery server includes notifying means to notify the destination portable communication terminal of a presence of data to be delivered. Accordingly, the portable communication terminal can access the delivery means in response to the notification. Consequently, the delivery means can deliver the data when there is a response to a notification of the notifying means from the destination portable communication terminal.

In a certain aspect of the invention, the portable communication terminal has message input means to input a message to a presentee. The message transmitting means transmits the message inputted by the message input means to the delivery server. In the delivery server, message receiving means receives the message. Notifying means notifies the destination portable communication terminal of a presence of the message. Accordingly, the delivery means delivers the data when there is a response to a notification of the notifying means from the destination portable communication terminal. In this manner, the destination portable communication terminal is allowed to receive the message, such as congratulations, from a delivery requester, and receives a notification of a presence of data to be delivered and access the delivery means thus being delivered with data.

In another aspect of the invention, the delivery information includes delivery day and hour information representative of a day and hour of delivery for the data. Consequently, where giving a present of music data to a user of another portable communication terminal, delivery is possible on a particular day, e.g. birthday or memorable day.

In a certain embodiment of the invention, the delivery server includes notifying means to notify the destination portable communication terminal of a presence of data to be delivered on the delivery day and hour. Consequently, the delivery means can deliver the data when there is a response to the notification of the notifying means from the destination portable communication terminal.

In another embodiment of the invention, the delivery server includes managing means to manage the delivery information. The managing means postpones (updates) the delivery day and hour when there is no response to the notification of the notifying means from the destination portable communication terminal. The notifying means can repeatedly notify the destination portable communication terminal of a presence of the message and data to be delivered.

In another embodiment of the invention, the portable communication terminal has message input means capable of inputting a message. Message transmitting means transmits the message inputted on a requester's portable communication terminal to the delivery server. In the delivery server, if message receiving means receives the message and the delivery day and hour comes, message notifying means notifies the destination portable communication terminal of a presence of the message data to be delivered. Accordingly, the delivery means delivers the data when there is a response to a notification of the notifying means from the destination portable communication terminal. In this manner, the destination portable communication terminal can receive the message and access the delivery means thereby being delivered with data. In other words, the requester can make a present of data with a message such as congratulations attached.

In still another embodiment of the invention, the delivery server further includes managing means to manage the delivery information. The managing means postpones (updates) the delivery day and hour when there is no response from the destination portable communication terminal. Consequently, the notifying means can repeatedly notify the destination portable communication terminal of a presence of the message and data to be delivered.

In another embodiment of the invention, the delivery server includes transmitting means to perform automatic transmission to the destination portable communication terminal on the delivery day and hour. The destination communication terminal has an automatic arrival processing function. Where the function is effective, the delivery means can deliver the data when there is a response to automatic transmission from the destination portable communication terminal. That is, music data can be delivered without operation of the user.

In another embodiment of the invention, the delivery server includes managing means to manage delivery information. For example, the managing means updates a delivery day and hour when there is no response to automatic transmission of the transmitting means from the destination portable communication terminal or when there is a response to automatic transmission of the transmitting means from the destination portable communication terminal but data cannot be recorded to recording means of the portable communication terminal. Accordingly, automatic transmission is possible repeatedly to the destination portable communication terminal.

In still another embodiment of the invention, the delivery server includes notifying means to notify a presence of data to be delivered. For example, the notifying means notifies the destination portable communication terminal of a presence of data to be delivered when there is no response to automatic transmission of the transmitting means from the destination portable communication terminal or there is a response to automatic transmission of the transmitting means from the destination portable communication terminal but data cannot be recorded to recording medium of the portable communication terminal. Consequently, the destination portable communication terminal can activate its automatic arrival processing function or secure a vacant capacity, e.g. by exchanging recording means such as a memory card.

In still another aspect of the invention, the portable communication terminal is provided with message input means so that a message inputted through the message input means can be transmitted to the delivery server by the message transmitting means. In the delivery server, the message receiving means receives the message. The delivery means delivers the data and the message received by the message receiving means to the destination portable communication terminal. In this manner, it is possible to implement delivery (giving a present) of data, such as music data, with a message attached thereto.

In another aspect of the invention, the delivery information receiving means further includes producing means to produce a coupon based on the delivery information, and delivery guide transmitting means transmits a delivery guide including the coupon produced. In the portable communication terminal, delivery guide receiving means receives the delivery guide, and coupon transmitting means transmits the coupon included in the delivery guide to the delivery means. Accordingly, the delivery means receives the coupon from the portable communication terminal, and data delivery means delivers the data to the destination portable communication terminal based on the coupon received. That is, data can be delivered (presented) to a desired seatination portable communication terminal.

In a certain embodiment of the invention, the delivery guide includes connection information to the delivery means. Consequently, the destination portable communication terminal easily accesses the delivery means based on the connection information. Thus, the coupon transmitting means can transmit the coupon to the delivery means.

In another embodiment of the invention, in the delivery means, comparing means compares between the coupon produced by the producing means and the coupon received by the coupon receiving means. The data delivery means delivers data depending upon a result of comparison by the comparing means. Thus, there is no possibility of delivering data to an incorrect destination. Also, where an effective term is expired, data will not be delivered.

In another embodiment of the invention, the portable communication terminal has message input means. Message transmitting means transmits the message inputted by the message input means to the delivery server. In the delivery server, message receiving means receives the message. The delivery guide transmitting means transmits the delivery guide and the message to the destination portable communication terminal. That is, the destination portable communication terminal can receive a message of congratulations and transmit the coupon included in the delivery guide to the delivery means thus being delivered with data.

In still another embodiment of the invention, the delivery information receiving means includes producing means to produce a coupon based on the delivery information, determining means. Also, determining means determines whether the portable communication terminal is a terminal to be delivered with the data or not, i.e. determined whether or not there exists a coupon for a portable communication terminal come into connection. Delivery guide transmitting means transmits a delivery guide including the coupon to the portable communication terminal when determined as a terminal to be delivered with the data. Also, the portable communication terminal has establishing means to establish a connection state with the delivery information receiving means. When a connection state is established, if there is an own coupon, delivery guide receiving means receives the delivery guide including an own-directed coupon. Accordingly, in the portable communication terminal, coupon transmitting means transmits the coupon included in the delivery guide. In the delivery means, coupon receiving means receives the coupon from the portable communication terminal, and the data delivery means delivers the data based on the coupon received. In this manner, it is also possible to make a present of data by transmitting a delivery guide when a portable communication terminal to be data-delivered accesses the delivery server (delivery information receiving means), instead of notifying a presence of data to be delivered on a particular day and hour by the notifying means.

In a certain embodiment of the invention, the portable communication terminal includes message input means to input a message. Message transmitting means transmits the message inputted by the message input means to the delivery server. In the delivery server, message receiving means receives the message. When a terminal to be data-delivered accesses, delivery guide transmitting means transmits the delivery guide and the message means to the portable communication terminal. For example, it is possible to transmit an electronic mail having a delivery guide attached to a message thereof to a portable communication terminal.

In another embodiment of the invention, the delivery guide includes connection information to the delivery means. Accordingly, the destination portable communication terminal easily accesses the delivery means according to the connection information. The coupon transmitting means transmits the coupon to the delivery means. Accordingly, the destination portable communication terminal can be delivered with the data.

In another aspect of the invention, an information delivery system further comprises a mail server to transmit and receive an electronic mail between the portable communication terminals. The delivery information receiving means includes producing means to produce a coupon based on the delivery information. Delivery guide transmitting means transmits a delivery guide including a coupon produced by the producing means to the portable communication terminal. The portable communication terminal at a requester includes delivery guide receiving means to receive the delivery guide. Establishing means establishes a connection state to the mail server, and then registering means registers in the mail server an electronic mail directed to the destination portable communication terminal including the delivery guide. In the mail server, arrival notifying means receives registration of the electronic mail from the portable communication terminal and notifies of a presence of the electronic mail to the destination portable communication terminal. In the destination portable communication means, establishing means establishes a connection state to the mail server to receive the electronic mail. That is, the mail server transmits the electronic mail to the destination portable communication terminal come into connection in response to a notification by the arrival notifying means. Consequently, the destination portable communication terminal receives the delivery guide. Coupon transmitting means transmits the coupon included in the delivery guide to the the delivery means. In the delivery means, coupon receiving means receives the coupon. Data delivery means delivers the data to the destination portable communication terminal according to the coupon. In this manner, it is also possible to make a present of data to a destination portable communication terminal by transmitting a delivery guide including a coupon to a requester's portable communication terminal and registering the electronic mail including the delivery guide to the mail server by the requester's portable communication terminal. Incidentally, although the mail server is provided separately from the delivery server, it may be provided within the delivery server.

In a certain embodiment of the invention, the portable communication terminal includes message input means to input a message. The registering means can register in the mail server the electronic mail including the delivery guide and the message input. Accordingly, the destination portable communication terminal can receive, for example, an electronic mail having a delivery guide attached to a massage thereof. That is, it is possible to receive a message such as congratulations and data delivered according to a delivery guide.

In another embodiment of the invention, the delivery guide includes connection information to the delivery means. Accordingly, the destination portable communication terminal easily accesses the delivery means based on the connection information. The coupon transmitting means can transmit the coupon to the delivery means. Consequently, the destination portable communication terminal can be delivered with the data.

In another aspect of the invention, the delivery server has billing means concerning data delivery to charge on a source of the delivery information. For example, charging can be upon completion of music data delivery. Also, charging is also possible when receiving delivery information from a portable communication terminal. Furthermore, charging is also possible when notifying delivery information to a destination portable communication terminal. Charging may be upon any of these occasions.

A delivery server according to another invention, comprises: delivery information receiving means for receiving, from an arbitrary portable communication terminal, delivery information including destination terminal information representing at least the destination portable communication terminal; and delivery means for delivering data to the destination portable communication terminal based on the delivery information received by the delivery information receiving means.

In the delivery server of the other invention, the delivery information receiving means receives delivery information including destination terminal information representing at least a portable communication terminal as a destination from an arbitrary portable communication terminal. Accordingly, the delivery means can deliver the data to the destination portable communication terminal based on the delivery information.

According to the other invention, content data such as music data can be delivered to a designated destination. Accordingly, designating a portable communication terminal owned by another user as a destination enables to make a present of music data onto it.

In a certain aspect of the other invention, because notifying means notifies of a presence of data to be delivered, the destination portable communication terminal can access the delivery means in response to the notification. Also, the delivery means can deliver data as a response to the notification of a presence of data to be delivered, when the destination portable communication terminal responds.

In another aspect of the other invention, the delivery information includes information of a day and hour on which the data is to be delivered. Consequently, the data can be delivered on the delivery day and hour. For example, music data can be presented on a particular day and hour, e.g. birthday or memorable day.

In another embodiment of the other invention, notifying means included in the delivery means notifies, on the delivery day and hour, the destination portable communication terminal of a presence of data to be delivered.

Consequently, the delivery means may deliver the data when there is a response to a notification of the notifying means from the destination portable communication terminal.

In another embodiment of the other invention, managing means manages the delivery information. The managing means postpones (updates) the delivery day and hour when there is no response to a notification of the notifying means from the destination portable communication terminal. Accordingly, the notifying means can repeatedly notify the destination portable communication terminal of a presence of data to be delivered.

In another embodiment of the other invention, transmitting means performs automatic transmission to the destination portable communication terminal on the delivery day and hour. The destination portable communication terminal possesses an automatic arrival function. Where the function is effective, the delivery means can deliver the data when there is a response from the destination portable communication terminal. That is, delivery of data is possible without operation of the user.

In another aspect of the other invention, the delivery information receiving means has producing means to produce a coupon based on the delivery information. Delivery guide transmitting means transmits a delivery guide including the coupon produced by the producing means to the destination portable communication terminal. In the delivery means, coupon receiving means receives the coupon from the portable communication terminal. Data delivery means delivers the data to the destination portable communication terminal based on the coupon received by the coupon receiving means. That is, the destination portable communication terminal if receiving a delivery guide transmits the coupon included in the delivery guide to the delivery means. The data delivery means can receive the data to be delivered.

In a certain embodiment of the other invention, the delivery information includes connection information to the delivery means. Accordingly, the destination portable communication terminal easily accesses the delivery means according to the connection information and transmits the coupon to the delivery means. Consequently, the destination portable communication terminal can be delivered with the data.

In another embodiment of the other invention, comparing means included in the delivery means compares between the coupon produced by the producing means and the coupon received by the coupon receiving means. The data delivery means delivers the data depending upon a result of comparison by the comparing means. Thus, there is no possibility of delivering the data to an incorrect destination. Also, where the effective term expires, the data will not be delivered.

In still another aspect of the other invention, message receiving means receives a message from the portable communication terminal and notifies the destination portable communication terminal of a presence of the message received by the message receiving means and data to be delivered. Consequently, the destination portable communication terminal can receive a message such as congratulations and access the delivery means responsive to the notification of a presence of data to be delivered, thus being delivered with data.

In another aspect of the other invention, the message receiving means receives a message from the portable communication terminal and the delivery means delivers the data and the message received from the message receiving means to the destination portable communication terminal. That is, it is possible to deliver data with a message attached thereto.

In a still another aspect of the other invention, the delivery information receiving means has producing means to produce a coupon based on the delivery information. Also, determining means determines whether or not the portable communication terminal is a terminal to be delivered with the data, i.e. whether or not there is a coupon for the portable communication terminal accessed. Delivery guide transmitting means transmits a delivery guide including the coupon to the portable communication terminal when determined as a terminal to be delivered with the data. In the delivery means, coupon receiving means receives the coupon from the portable communication terminal. Data delivery means delivers the data based on the coupon received. In this manner, it is also possible to make a present of data by transmitting a delivery guide when a portable communication terminal to be delivered with data accesses the delivery server (delivery information receiving means), instead of notifying on a particular day and hour of a presence of data to be delivered by the notifying means.

In a certain embodiment of the invention, message receiving means receives a message from the portable communication terminal, while delivery guide transmitting means transmits the delivery guide and the message received by the message receiving means to the portable communication terminal. For example, an electronic mail attached to a message can be transmitted to the portable communication terminal.

In another aspect of this invention, electronic mail managing means is provided to transmit and receive an electronic mail between the portable communication terminals. In the delivery information receiving means, producing means produces a coupon based on the delivery information. Delivery guide transmitting means transmits a delivery guide including the coupon produced by the producing means to the requester's portable communication terminal. The requester's portable communication terminal registers the delivery guide to electronic mail managing means. Consequently, in the electronic mail managing means, arrival notifying means notifies the destination portable communication terminal of a presence of the electronic mail directed to the destination portable communication terminal. Electronic mail transmitting means transmits the electronic mail to the destination portable communication terminal accessed responsive to the notification. Consequently, the destination portable communication terminal receives the delivery guide and transmits the coupon included in the delivery guide to the delivery means. Accordingly, in the delivery means, coupon receiving means receives the coupon. Data delivery means to delivers the data to the destination portable communication terminal based upon the coupon. In this manner, it is also possible to make a present of data to a destination portable communication terminal by transmitting a delivery guide including a coupon to a requester's portable communication terminal and registering an electronic mail including the delivery guide to the notifying means by the requester's portable communication terminal.

In another aspect of the other invention, billing means is provided concerning delivery of data. The billing means to charge on a delivery information source, i.e. a delivery requester. For example, charging is possible to implement upon completion of music data delivery. Also, charging is also possible when receiving delivery information from a portable communication terminal. Furthermore, charging can be made when notifying a delivery guide to a destination portable communication terminal. Thus, charging may be on any of these occasions.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 35 is a flowchart showing yet another part of the process to execute present-giving schedule and real-time delivery in the fifth embodiment of the information delivery system of the invention.

DETAILED DESCRIPTION OF THE PREFERRED EMBODIMENTS

First Embodiment

Figure 1:
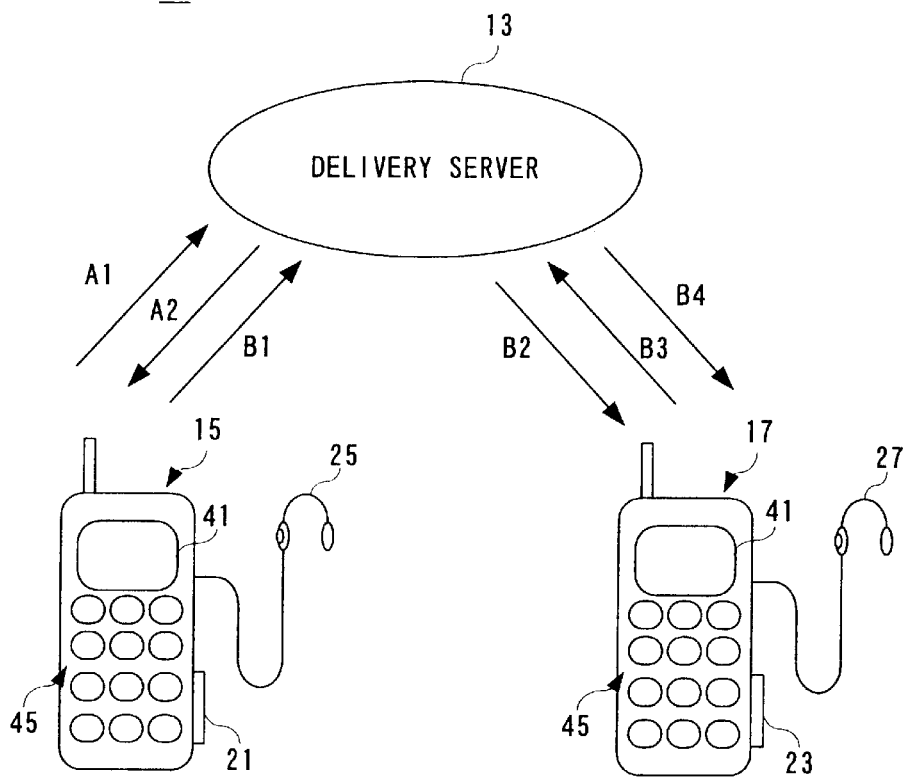
FIG. 1 is an illustrative view showing a first embodiment of the present invention.

Referring to FIG. 1, an information delivery server 11 of a first embodiment includes a delivery server 13, a cellular phone 15 and a cellular phone 17. The delivery server 13 is for delivering music data. The music data includes encrypted music data, an encrypted content key having a content key encrypted as a key to decrypt the encrypted music data, additional information such as copyright information of titles, artists (singers, performers, etc.), composers, lyric writers, etc. of the music data and access information to the delivery server 13, and a transfer delivery code as management information for the music data.

Figure 2:
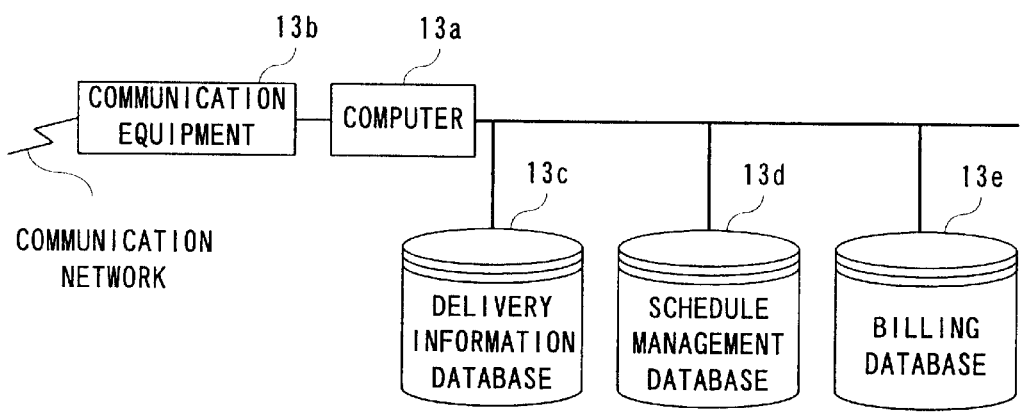
FIG. 2 is an illustrative view showing a structure of a delivery server shown in the FIG. 1 embodiment.

The delivery server 13 is configured as shown in FIG. 2, and includes a computer 13a. The computer 13a is connected with a communication equipment 13b. The communication equipment 13b is connected to a cellular phone network through a not-shown private line or digital public network (ISDN, packet switching network). Furthermore, the delivery server 13 is provided with a delivery information database 13c, a schedule management database 13b and a billing database 13e. The delivery information database 13c records encrypted music data having music data encrypted for delivery, a content key to decrypt encrypted music data and additional information including copyright information of music data such as data titles, artists (singers, performers, etc.), composers, lyric writers, etc. of the music data. The schedule management database 13d records information to manage scheduled deliveries of music data delivered. Furthermore, the billing database 13e records information about pays of deliveries.

The cellular phone 15 and the cellular phone 17 respectively have telephone no.s "090-ΔΔΔΔ-XXX1" and "090-Δ○○Δ-XXX2". Each of the telephone main bodies has a mechanism to removably mount a memory card formed by a recording medium, e.g. a semiconductor memory. In this first embodiment, a memory card 21 is mounted on the cellular phone 15 and a memory card 23 on the cellular phone 17. Also, the cellular phone 15 and the cellular phone 17 are connected respectively with a headphone 25 and a headphone 27. Thus, the user is allowed to listen to music being delivered.

Figure 3:
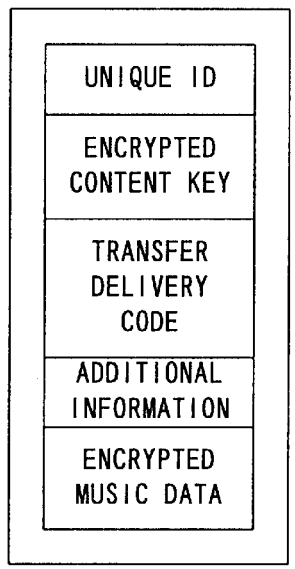
FIG. 3 is an illustrative view showing a configuration of data in a memory card shown in the FIG. 1 embodiment.

Referring to FIG. 3, the memory card 21 records, for example, a unique ID related to a telephone no. of the cellular phone 15, an encrypted content key to be decrypted by use of as a key a unique ID delivered as delivery information from the delivery server 13, and encrypted music data to be decrypted by use of a content key. The memory card 21 also records copyright information about the encrypted music data, additional information such as a telephone no. of the delivery server 13, and a transfer delivery code to manage the encrypted music data delivered.

Meanwhile, in the first embodiment, the unique ID is configured not to be taken out of the memory card 21. Thus, the memory card 21 is provided with a security function for music data. Meanwhile, the transfer delivery code includes, for example, restrictive information in movement of music data (movement restrictive information) and copy restrictive information to restrict upon the number of copies of music data.

Figure 4:
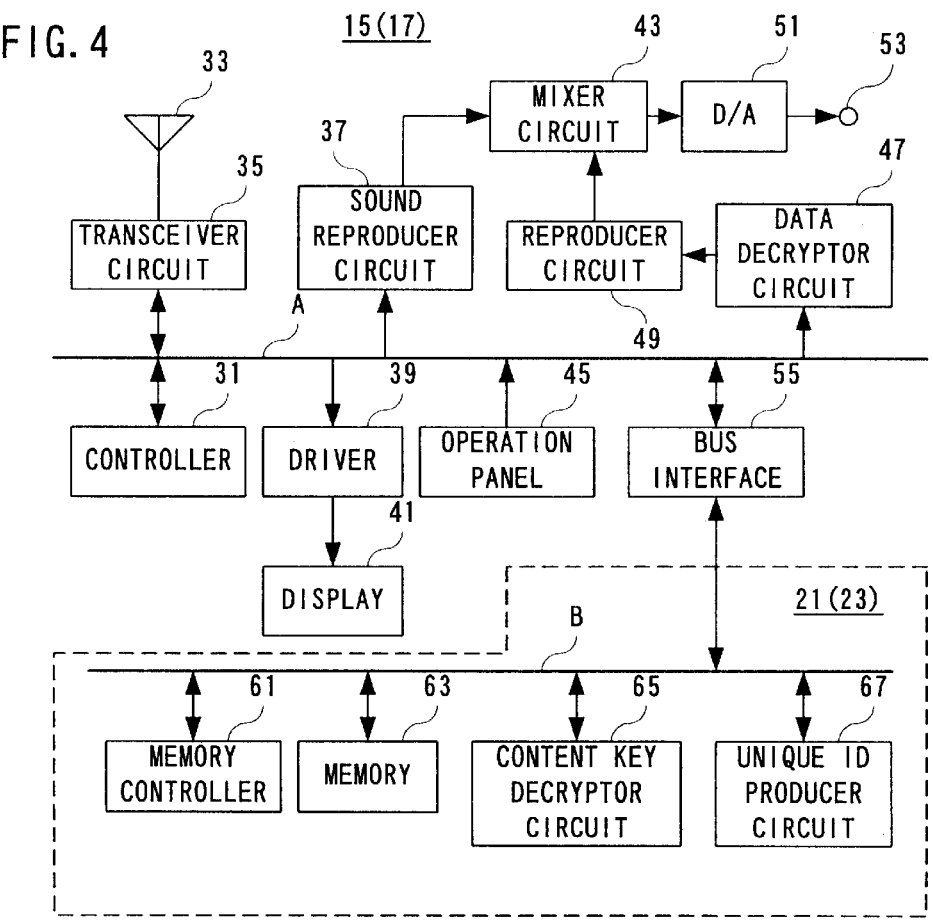
FIG. 4 is an illustrative view showing a configuration of a cellular phone and memory card shown in the FIG. 1 embodiment.

The cellular phone 15 and the cellular phone 17 in concrete are configured as shown in FIG. 4. Note that FIG. 4 depicts only the blocks related to the information delivery system 11 of the invention for the sake of simplifying explanations, wherein the blocks concerning the telephonic function possessed in nature by the cellular phone 15 and cellular phone 17 are omitted in part thereof. Also, because the cellular phone 15 and the cellular phone 17 are same in structure, explanations will be only on the cellular phone 15.

Referring to FIG. 4, the cellular phone 15 includes a controller 31. The controller 31 transmits and receives control signals to and from each block in order to carry out the overall control for the cellular phone 15. Incidentally, notations of various control signals are omitted for the simplification sake. Also, the cellular phone 15 includes an antenna 33, and the antenna 33 is connected to a transceiver circuit 35. The transceiver circuit 35 implements speech data or data communications. The transceiver 35 is connected to the controller 31 through a bus A. Furthermore, the cellular phone 15 is provided with a voice reproducer circuit 37, a driver 39 and a display 41. The voice reproducer circuit 37 digitally reproduces received speech data and outputs the reproduced digital speech sound to a mixer circuit 43 in a rear stage. The driver 39 serves to display information such as characters, etc. on the display 41 according to an instruction given from the controller 31.

Furthermore, the cellular phone 15 has an operation panel 45 thereon. The operation panel 45 is arranged, although not shown, dial keys such as ten keys and particular keys, etc. The information inputted on the operation panel 45 is supplied through the bus A to the controller 31 thereby displaying information such as characters on the display 41 as mentioned before. Also, the cellular phone 15 includes a data decryptor circuit 47. The data decryptor circuit 47 decrypts the encrypted music data recorded in the memory card 21 by use of as a key a content key decrypted of an encrypted content key within the memory card 21, to output coded music data to a rear-staged music reproducer circuit 49. The music reproducer circuit 49 digitally reproduces the coded music data given from the data decryptor circuit 47 and supplies the reproduced data to a mixer circuit 43.

The mixer circuit 43 selects and output either one of digital speech sound supplied from the voice reproducer circuit 49 or digital music supplied from the music reproducer circuit 49. Meanwhile, the mixer circuit 43 can afford to mix and output both digital speech sound and digital music in a predetermined ratio. The output digital signal from the mixer circuit 43 is converted into an analog signal by a D/A converter 51 and then outputted through a terminal (earphone jack) 53 onto a headphone 25. That is, speech voice or reproduced music is outputted onto the headphone 25. Incidentally, in the case of mixed at a predetermined ratio by the mixer circuit 43, speech communication is possible with music played as background music.

Meanwhile, the memory card 21 mounted on the cellular phone 15 includes a memory controller 61. The memory controller 61 is connected through a bus interface 55 and bus A to the controller 31 so that it controls each block of the memory card 21 according to an instruction given from the controller 31. Note that the notations of various control signals are omitted for the simplification sake. The memory card 21 also includes a memory 63. The memory 63 records encrypted music data, an encrypted content key, a unique ID, additional information and a transfer delivery code. The memory card 21 further includes a content key decryptor circuit 65. The content key decryptor circuit 65 decrypts the encrypted content key recorded in the memory 63 by using as a key a unique ID recorded in the memory 63. Furthermore, the memory card 21 includes a unique ID reproducer circuit 67. The unique ID producer circuit 67 produces a unique ID related to a telephone no. of the cellular phone 15.

Referring back to FIG. 1, explanation will be made on the principle of the information delivery system 11. The delivery server 13 now provides for two deliveries. Specifically, the first one is real-time delivery that the cellular phone 15 in access to the delivery server 13 requests a delivery and then the delivery server 13 carries out a delivery. The second one is scheduled delivery that the cellular phone 15 in access to the delivery server 13 makes a scheduling for delivery by designating a destination (the cellular phone 17 in the first embodiment) of delivery as well as a day and hours thereof so that the cellular phone 17 as a destination can receive the delivery.

In e.g. a real-time delivery, a user of the cellular phone 15 accesses the delivery server in order to receive a delivery of music data for his or her own purpose. The selection of music data to be delivered and a request of real-time delivery are transmitted as delivery information to the delivery server 13 (A1). In response, the delivery server 13 reads delivery-requested music data out of the delivery information database 13c and delivers it onto the cellular phone 15 (A2). At the same time, the billing database 13e is updated to record therein pay to the music data delivery. Thus, the real-time delivery of music data completes.

Meanwhile, in a scheduled delivery, the user of the cellular phone 15 accesses the delivery server 13 to offer music data to a user of the cellular phone 17 as a third person. To the delivery server 13 are transmitted information required for a scheduled delivery (scheduled delivery information) such as a scheduled delivery request, a selection of music data to be delivered, a telephone no. of the cellular phone 15 of a requester for the scheduled delivery, a delivery day and hour and a telephone no. of the cellular phone 17 as destination (destination telephone no.), as well as a message by the requester to the destination (B1). In response, the delivery server 13 accepts the scheduled delivery request, i.e., scheduled delivery information and a message from the cellular phone 15, and records them in the schedule management database 13d.

The delivery server 13 periodically accesses the schedule management database 13d and, on a scheduled day and hour, makes notification of a presence of music data delivery request to the cellular phone 17 (B2). At the same time, notifications are recorded in the schedule management database 13d by updating the same.

The cellular phone 17 notified of a presence of delivery request makes access to the delivery server 13 (B3). The delivery server 13, upon accessed by the cellular phone 17, reads scheduled music data out of the delivery information database 13c and delivers it onto the cellular phone 17. Consequently, the memory card 23 of the cellular phone 15 under delivery is recorded with music data as scheduled on the cellular phone 15. Also, simultaneous with this, the message is transmitted from the cellular phone 15 to the cellular phone 17 (B4). When completing the delivery, a pay for the scheduled delivery is recorded to the billing database 13e based on the requester (cellular phone 15) of the scheduled delivery.

Meanwhile, in order to induce the cellular phone 17 to access the delivery server 13, the delivery server 13 in the absence of access from the cellular phone 17 repeats notification a particular number of times to the cellular phone 17 at a particular interval, according to the notification record in the schedule management database 13d (B2). Each time of notification, the delivery server 13 updates the schedule management database 13d thereby leaving notification record.

Furthermore, in the event that no delivery could be made to the cellular phone 17, scheduled delivery (scheduled delivery information) may be cancelled in compliance with a contract with a user of the cellular phone 15.

According to the first embodiment, an information delivery system can be architected allowing for a scheduled delivery of music data. This makes it possible to give a present of music data to a third person via the delivery server.

Furthermore, downloaded music data is reproducible. Explanation will be made using FIG. 4 on a case of reproducing music data by the cellular phone 15. Note that the process is similar in a case of reproducing by the cellular phone 17.

For example, when the user manipulates the operation panel 45 and instructs to reproduce music, a controller 31 instructs reproducing to a memory controller 61. Due to this, a content key is read out of an encrypted content key and unique ID recorded within a memory 63. Also, the memory controller 61 reads out encrypted music data recorded in the memory 63. Then, a decrypted content key and read-out encrypted data are supplied to a data decryptor circuit 47. The data decryptor circuit 47 decrypts the encrypted music data to obtain coded music data compressed of music data. The coded music data is music data compressed in data amount through a coding scheme, such as MIDI and MPEG Audio. A music reproducer circuit 49 performs a reproducing process according to a coding scheme of the music data thereby obtaining a digital music. The digital music is sent to a mixer circuit 43.

The mixer circuit 43 selectively outputs a digital music from the music reproducer circuit 49, according to an instruction given from the controller 31. Consequently, the digital music outputted from the mixer circuit 43 is converted into an analog signal by a D/A converter 51 and outputted onto an earphone jack 53. That is, a reproduced music is outputted through a headphone 25. Thus, the user can enjoy music through the headphone 25.

Second Embodiment

Figure 5:
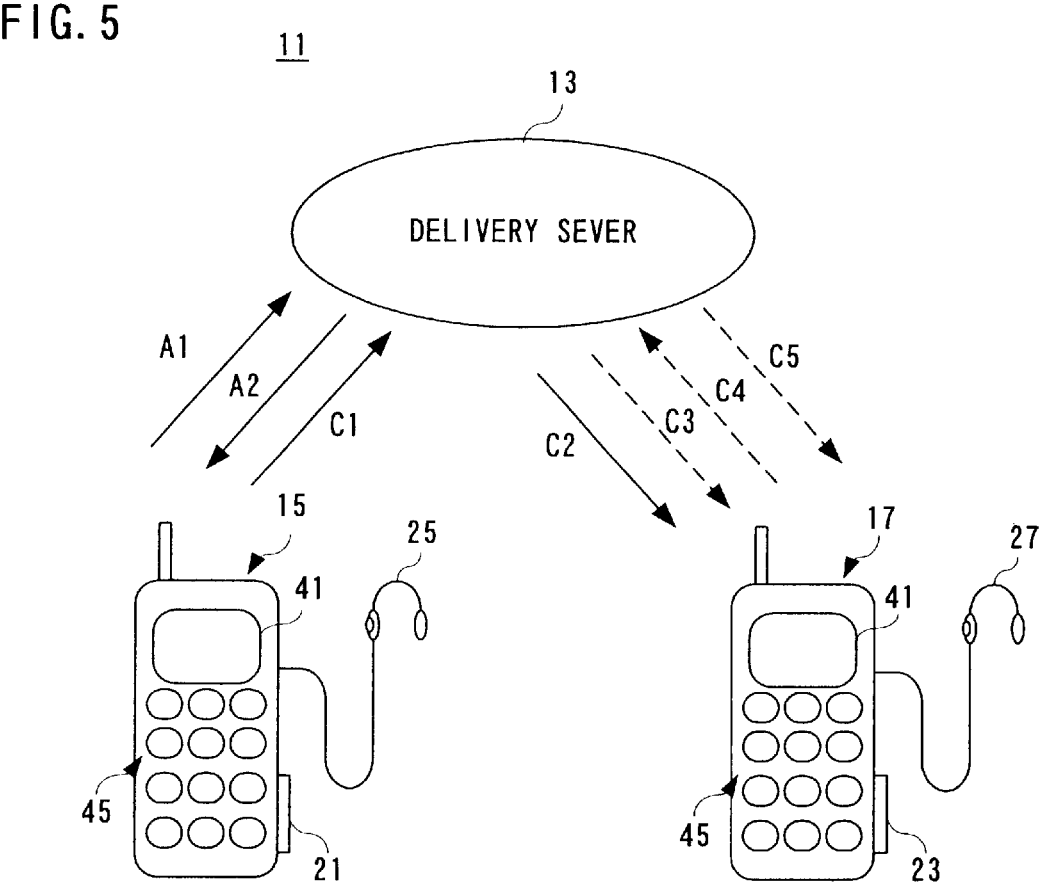
FIG. 5 is an illustrative view showing a second embodiment of the invention.

Referring to FIG. 5, an information delivery system 11 of a second embodiment is same as the first embodiment except in that music data is to be automatically delivered to a cellular phone as a destination, hence duplicated explanations being omitted herein.

In the case of carrying out a scheduled delivery by an information delivery system 11 shown in FIG. 5, a user of a cellular phone 15 accesses a delivery server 13 to request a scheduled delivery of music data in order to give a present of music data to a third person (user of a cellular phone 17 in the second embodiment) (C1). The delivery server 13 accepts the request of scheduled delivery from the cellular phone 15 and records, to a schedule management database 13d, scheduled delivery information required for scheduled delivery, such as a telephone no. of the cellular phone 15 as a requester of delivery, a title of music data to be delivered, a day and hour of delivery and a telephone no. of the cellular phone 17 as a destination of delivery, as well as a message from the requester.

In response, the delivery server 13 periodically accesses the schedule management database 13d and, on a scheduled day and hour, automatically dials (automatic calling) to the cellular phone 17 to try connection to the cellular phone 17 as the destination.

For example, where the cellular phone 17 is provided with an automatic call receiving function to automatically receive a delivery of music data and the automatic call receiving function is activated by the user, a request of connection through automatic calling from the delivery server 13 is automatically received. If the memory 63 has a vacant space available for recording, the music data is delivered (C2).

Ending the delivery, in the delivery server 13 the schedule management database 13d is updated, i.e. completion of scheduled delivery is recorded. At the same time, a pay for the scheduled delivery is recorded to the billing database 13e on the scheduled delivery requester basis, i.e. the billing data is updated.

In this manner, music data can be delivered to a memory of a memory card mounted on a cellular phone as a destination without requiring use's operation.

Incidentally, where the cellular phone 17 is not provided with an automatic call receiving function of music data or such an automatic call receiving function is provided but not activated, the cellular phone 17 receives an automatic call from the delivery server 13 depending upon operation of the user. If there is a vacant space for recording in the memory 63, the music data is delivered in accordance with an instruction by the user (C2).

In the event that delivery is put impossible due to circuit irregularity or memory 63 insufficient capacity, the schedule management database 13d is updated to leave record. After delivery is tried a particular number of times at a particular interval to the cellular phone 17a, notification is given to the cellular phone 17 of a presence of a request of music data delivery (C3). Simultaneous therewith, the schedule management database 13d is updated for recording in accordance with a record of notification.

Consequently, the notified cellular phone 17 makes access to the delivery server 13 (C4). Accessed by the cellular phone 17, the delivery server 13 reads scheduled music data out of the delivery information database 13c and delivers it onto the cellular phone 17 (C5). This records the scheduled music data onto the memory card 23 of the cellular phone 17 in delivery.

In the case that no access is available from the cellular phone 17 despite notification has been sent, notifications are repeated to the cellular phone 17 to prompt it to make access. The schedule management database 13e is updated on each notification to leave a record of notifications.

Incidentally, in the event that delivery could not be made to the cellular phone 17, scheduled delivery information may be cancelled in compliance with a contract with the user of the cellular phone 15.

According to the second embodiment, music data can be delivered onto a cellular phone having an automatic call receiving function without the necessity of user's operation.

Note that, in the first and second embodiments, a present can be made on a particular day and hour, e.g. on a birthday, memorable day, etc. because a delivery day and hour is to be designated.

Meanwhile, although the first and second embodiments were explained with the cellular phone possessed by a third person taken as a destination, one's own cellular phone may be designated as a destination. In this case, it is possible to conduct a scheduled delivery with newly released popular music.

Furthermore, although the first and second embodiments explained that the cellular phones had the structure to be removably mounted with a memory card incorporating a memory, a memory may be built in the cellular phone. That is, it is satisfactory to record music data delivered from the delivery server.

Furthermore, the first and second embodiments explained that real-time delivery, and request and execution of scheduled delivery are to be made on one delivery server. Alternatively, these can be made on separate servers. However, in this case the schedule management database must be structured as a common database to enable scheduled delivery purchase and execution processes.

Also, although the first and second embodiments explained concerning only the music data, it is of course possible to apply for other kinds of information (data), such as character data, voice data, map data or image data.

The information delivery systems 11 shown in these first and second embodiments illustrated the forms that copyright protection (security) is relied upon the cellular phone (terminal) itself. In contrast, a third embodiment and the subsequent will explain on cases that security is relied upon a memory card mounted on a cellular phone main body wherein consideration is given to security on a communication line (data transmission and reception) in downloading and reproducing processes.

Third Embodiment

Figure 6:
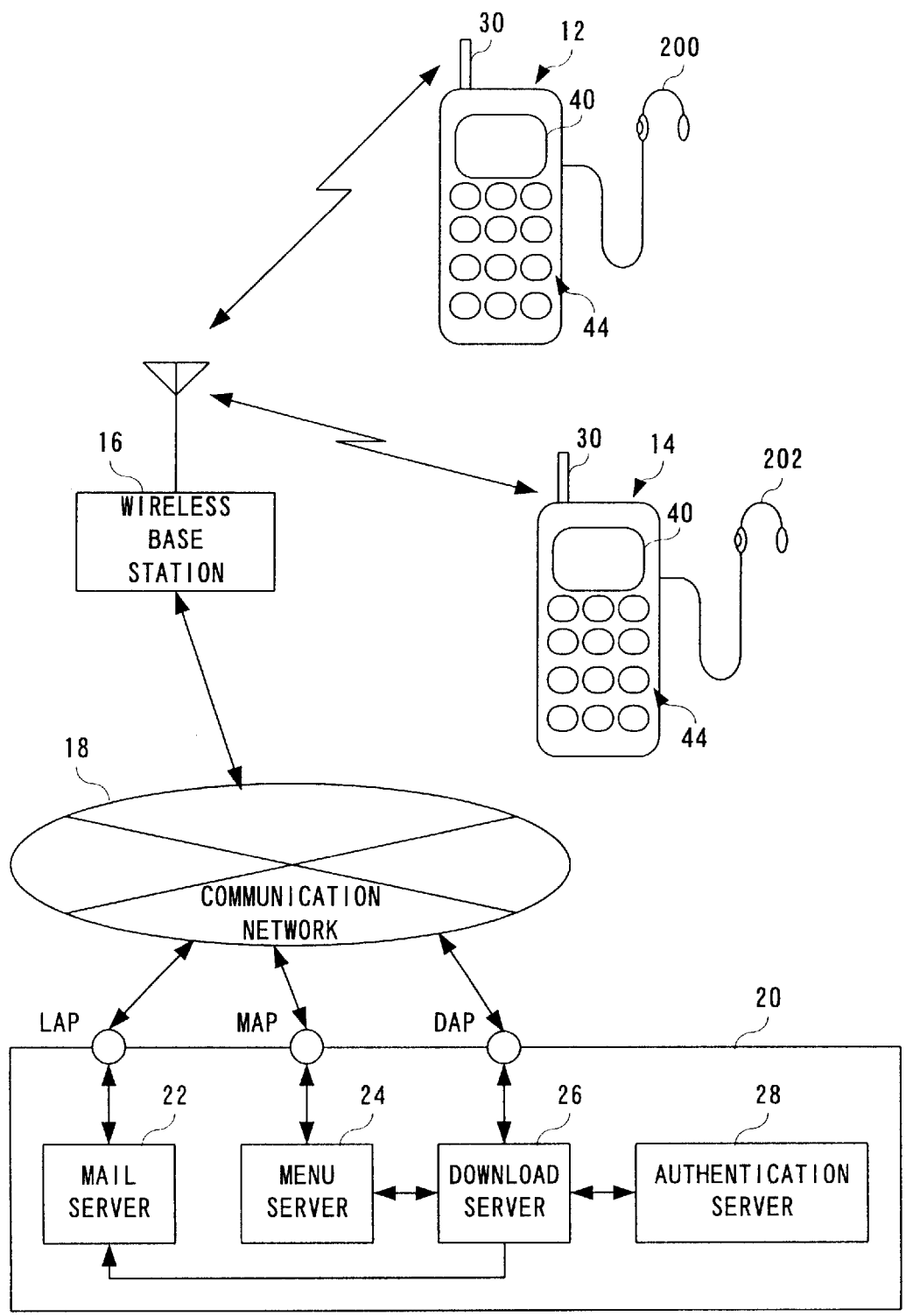
FIG. 6 is an illustrative view showing a third embodiment of the invention.

Referring to FIG. 6, an information delivery system 10 of a third embodiment includes a cellular phone 12 and a cellular phone 14. The cellular phone 12 and the cellular phone 14 are coupled to a delivery server 20 through a wireless base station 16 and a cellular phone network 18. This delivery server 20 includes a mail server 22, a menu server 24, a download server 26 and an authentication server 28. The menu server 24 is coupled to the download server 26 to enable mutual communications. Also, the download server 26 and the authentication server 28 are coupled to each other for mutual communications. Furthermore, the download server 26 is unilaterally coupled to the mail server 22. Incidentally, the mail server 22, the menu server 24 and the download server 26 are respectively coupled to the cellular phone network 18 through networks such as private lines or digital public lines (ISDN, packet exchange network).

Figure 7:
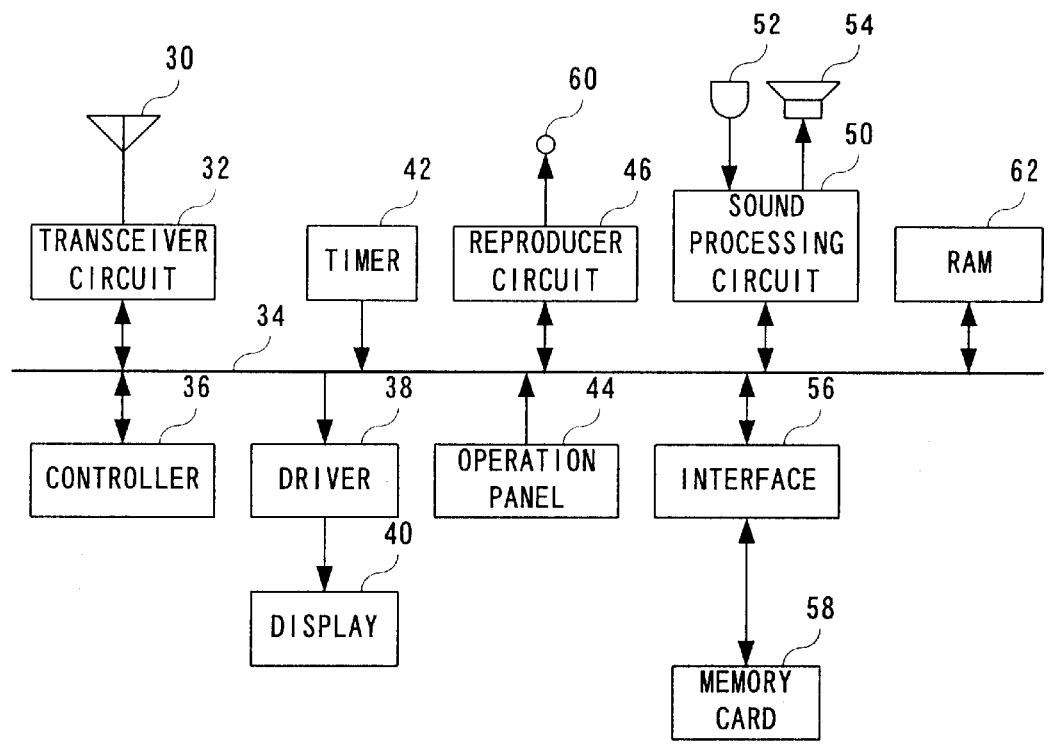
FIG. 7 is an illustrative view showing a configuration of a cellular phone shown in FIG. 6.

The cellular phone 12 and the cellular phone 14 in electrical configuration are as shown in FIG. 7. Incidentally, because the cellular phone 12 and the cellular phone 14 are same in configuration, explanations will be made on only the cellular phone 12.

Referring to FIG. 7, the cellular phone 12 includes an antenna 30. The antenna 30 is coupled to a transceiver circuit 32. The transceiver circuit 32 is coupled to a controller 36 via an internal bus (hereinafter merely referred to as "bus") 34. Also, the controller 36 in turn coupled to an operation panel 44 through the bus 34. The operation panel 44, although not shown, is an input device having dial keys, such as ten keys, and particular keys. The information inputted on the operation panel 44 thus configured is supplied to the controller 36 via the bus 34. The controller 36 controls a driver 38 to display information, such as characters, on the display 40.

For example, if the user inputs a telephone no. of an opposite side of communication by use of the operation panel 44, the controller 36 in response controls the driver 38 to display a telephone no. of an opposite side of communication on the display 40. Subsequently, when the user instructs calling by use of the operation panel 44, the controller 36 executes calling operation. If establishing a connection to the opposite side of communication, the controller 36 executes a calling process. Specifically, a voice signal from the opposite side of communication is received at the antenna 30 and fetched in the controller 36 through the transceiver circuit 32, and then outputted from the speaker 54 through the bus 34 and sound processing circuit 50. On the other hand, a user-voice signal is inputted at the microphone 52 and fetched in the controller 36 through the sound processing circuit 50 and bus 34 and then transmitted from the antenna 30 through the bus 34 and transceiver circuit 32.

Meanwhile, the controller 36 executes a call receiving process in response to an incoming call from the opposite side of communication. That is, the controller 36 controls the sound processing circuit 50 and outputs a calling tone or melody through the speaker 54. The user recognizes "a presence of incoming call" due to the calling tone or melody so that he or she can input a call receiving operation by use of the operation panel 44. As a consequence, a state of connection is established to allow the controller 36 to execute a speech process as mentioned before.

The cellular phone 12 also includes a timer 42. Based upon time information outputted from the timer 42, the controller 36 controls the driver 38 to display a calendar (date), time and the like on the display 40.

The cellular phone 12 also includes a reproducer circuit 46 and an interface 56. The reproducer circuit 46 and interface 56 are coupled to the controller 36 through the bus 34. The reproducer circuit 46 is connected with a terminal 60. As shown in FIG. 1, a headphone 200 is to be connected to the terminal 60. Incidentally, a headphone 202 is to be connected to the cellular phone 14. Also, the interface 56 is to be connected with a memory card that is to be removably loaded on a phone main body. Accordingly, when the user instructs reproduction by use of the operation panel 44, the controller 36 in response executes a reproducing process. That is, encrypted music data stored in the memory card 58 is read out. The reproducer circuit 46 reproduces this data into a signal to be outputted through the headphone 200.

Incidentally, the third embodiment outputs, during telephonic speech, speech and music reproducing signals separately through the speaker 54 and the terminal 60. Alternatively, a mixer circuit may be provided between the sound processing circuit 50 and the terminal 60 to mix the speech and reproduced signal in a predetermined ratio for output through the terminal 60. That is, calling is possible while listening to music as background music. It should be noted that the predetermined ratio may be freely set in function setting on the cellular phone 12 by the user.

Also, the encrypted music data in the third embodiment is data compressed by a coding scheme, e.g. MIDI, MPEG Audio, etc.

Figure 8:
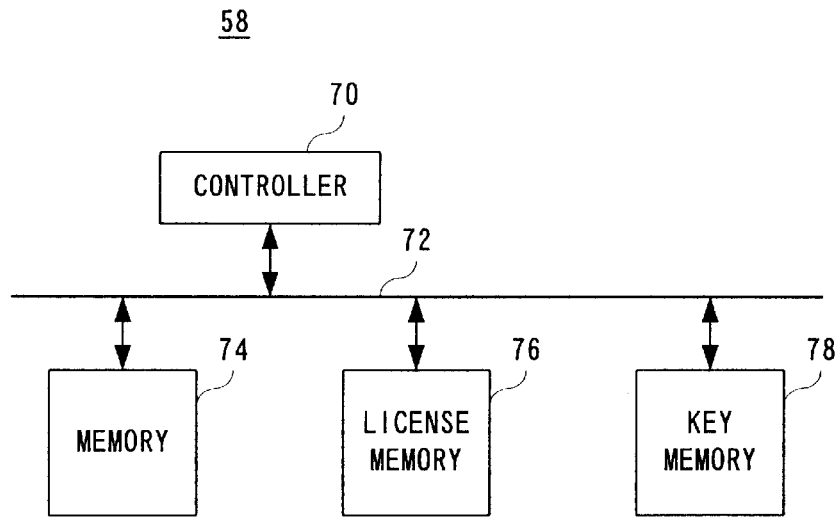
FIG. 8 is an illustrative view showing a configuration of a memory card shown in FIG. 6.

Referring to FIG. 8, the memory card 58 includes a controller 70. The controller 70 is coupled through a bus 72 to a memory 74, a license memory 76 and a key memory 78. The memory 74 holds data to freely interact with data to be protected under copyright (content data), such as music data, with encrypted data. Also, the license memory 76 stores license data required to protect a copyright, such as of a content key. Furthermore, the key memory 78 is a memory not directly accessible by the user or the like, and previously stores a key for use in a mutual authentication (encryption) process to be conducted upon transmission and reception of license data. That is, the memory card 58 has a security function for content data, such as of music data, to be protected under copyright.

Figure 9:
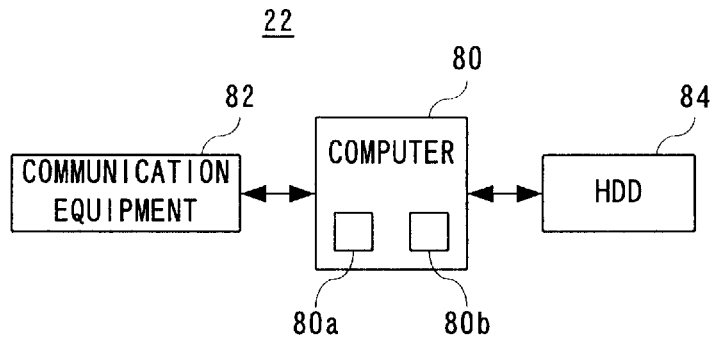
FIG. 9 is an illustrative view showing a configuration of a mail server shown in FIG. 6.

Referring to FIG. 9, the mail server 22 includes a computer 80, such as a personal computer or workstation. The computer 80 is coupled to a communication equipment 82 and an HDD (Hard Disk Drive) 84. The communication equipment 82 can establish connection to a cellular phone 12 or a cellular phone 14 through a cellular phone network 18 and wireless base station 16, according to an instruction by a CPU 80a provided on the computer 80. Incidentally, although the third embodiment shows connectable to two, i.e. cellular phone 12 or cellular phone 14, it is of course possible to establish connection to other cellular phones. This is true hereinafter for the menu server 24 and the download server 26. Also, the HDD 84 is to save a mail transmitted from the cellular phone 12 or cellular phone 14 or to save a mail to transmit to the cellular phone 12 or cellular phone 14.

Figure 10:
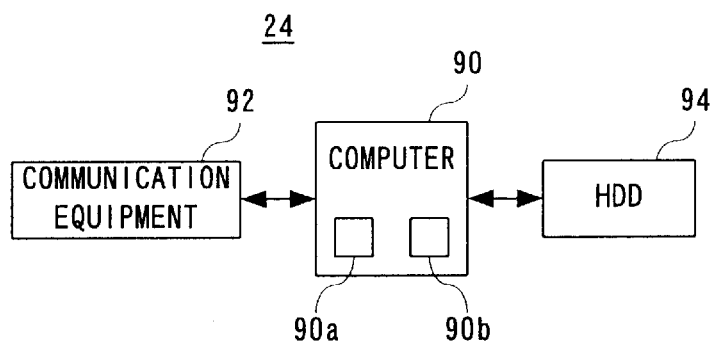
FIG. 10 is an illustrative view showing a configuration of a menu server shown in FIG. 6.

As shown in FIG. 10, the menu server 24 also includes a computer 90, such as a personal computer or workstation. The computer 90 is coupled to a communication equipment 92 and an HDD 94. The communication equipment 92 can establish a connection between the cellular phone 12 and the cellular phone 14 through the cellular phone network 18 and the wireless base station 16, according to an instruction by a CPU 90a provided on the computer 90. Also, the HDD 94 stores music selection menu data to display a list of a plurality of music data titles and artists as well as a plurality of kinds of information required for downloading correspondingly to the respective ones of music data (download information). The music selection menu data and download information are read out of the HDD 94 according to an instruction from the CPU 90a, and transmitted to the cellular phone 12 or cellular phone 14 through the communication equipment 92. That is, when the cellular phone 12 or the cellular phone 14 accesses the menu server 24 through the communication base station 16 and cellular phone network 18, it can acquire a list of music data, i.e. download information of music selection menu data and download information corresponding to desired ones of music data.

Here, download information refers to identification information of music data (content ID), coupons including a condition of purchasing a license by a user and information of connection (DAP-TEL) of music data download destination (download server 26) to an access point (DAP).

Figure 11:
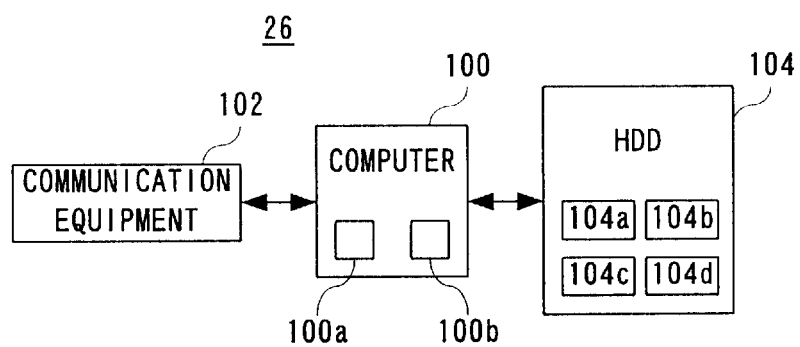
FIG. 11 is an illustrative view showing a configuration of a download server shown in FIG. 6.

Referring to FIG. 11, the download server 26 is same in configuration as the above-mentioned mail server 22 and menu server 24, and includes a computer 100. The computer 100 is coupled to a communication equipment 102 and an HDD 104. The communication equipment 102 can establish connection to the cellular phone 12 or cellular phone 14 through the cellular phone network 18 and wireless base station 16, according to an instruction of a CPU 100a provided on the computer 100. Also, the HDD 104 includes at least four databases 104a–104b.

The database 104a is a delivery information database storing a plurality of encrypted music data and a plurality of content keys to decrypt the respective ones of encrypted music data. According to an instruction by the CPU 100a, encrypted music data and a content key are read out and transmitted to the cellular phone 12 or cellular phone 14 through the communication equipment 102. That is, the cellular phone 12 and the cellular phone 14 can access the download server 26 via the communication basis station 16 and cellular phone network 18 to download desired encrypted music data. Also, they can decrypted and reproduce encrypted music data by using the content key.

Meanwhile, the database 104b is a coupon management database to manage for the coupons included in download information produced by the menu server 24.

Furthermore, the database 104c is a schedule management database storing information (schedule information) that the cellular phone 12 or cellular phone 14 accessed the menu server 24 and made a scheduling of music data delivery. This schedule information includes identification information concerning a telephone no. of the cellular phone 12 (or cellular phone 14) as an opposite side of communication (destination) to which music data is to be delivered, music data to be delivered, delivery day and time, etc. That is, the CPU 100a carries out schedule management based on the schedule information. When comes the delivery day and hour in the schedule information, the CPU 100a transmits the coupon simultaneously recorded in the database 104b with recording the schedule information, to the destination through the mail server 22. The CPU 100a also reads desired music data out of the database 104a according to the coupon re-transmitted from the destination, and manages the delivery to the predetermined opposite side of communication (cellular phone 12 or cellular phone 14).

Furthermore, the database 104d is a billing database storing bulling information for music data delivery and the like (billing information).

For example, when the user inputs an instruction to download music data by use of the operation panel 44, i.e. if inputting connection information (MAP-TEL) of a menu server 24 access point (MAP) and executing a calling operation, a connection is established between the cellular phone 12 and the menu server 24. Incidentally, the connection information (MAP-TEL) to the menu server 24 access point (MAP) includes telephone no.s, URL, etc.

Accordingly, music selection menu data is transmitted through the menu server 24 onto the cellular phone 12. This music selection menu data comprises a list that music data can be retrieved on the basis of a singer name or title, as in a book used e.g. in karaoke music selection.

Incidentally, because such music selection menu data is enormous in amount, in the third embodiment the data is transmitted by a predetermined amount at one time according to user's instruction and menus are sequentially displayed on the display 40.

When the user selects a desired music data from a music selection menu by use of the control panel 44, a result of the selection is transmitted to the menu server 24. In response, the menu server 24 transmits to the cellular phone 12 a coupon corresponding to the selected music data and connection information (DAP-TEL) to the download server 26. Consequently, the cellular phone 12 is allowed to access the download server 26 in accordance with the connection information (DAP-TEL), to download desired music data according to the coupon.

Meanwhile, it is also possible to give a present of music data from the user of the cellular phone 12 to the user of the cellular phone 14. The user of the cellular phone 12 uses the operation panel to access the menu server 24. Desired music data is selected according to a music selection menu, as described above. In the case of giving a present of music data, registered is an electronic mail (e-mail) address, etc. (hereinafter merely referred to as "telephone no., etc. ") assigned to a telephone no. of the cellular phone 14 or the cellular phone of a person as a presentee (user of the cellular phone 14), followed by inputting a date of giving a present. Furthermore, if the user inputs a message, the menu server 24 registers schedule information, such as opposite side telephone no. (destination), unique ID of a presentation requester (debtor), presentation day and hour (delivery day and hour), etc. to the database 104c of the download server 26.

The menu server 24 also produces a coupon including a music data identification code (content ID), a delivery destination and a debtor, and registers the produced coupon to the database 104b of the download server 26. That is, scheduling of presentation is possible to carry out. Thereafter, when coming a delivery day and hour, the download server 26 registers, as an e-mail, a destination, message, connection information (DAP-TEL) of download server 26 access point (DAP) and a coupon to the mail server 22.

The mail server 22, when registering an e-mail from the download server 26, notifies the destination (the user of cellular phone 14) of a presence of a present. In response, if there is an access from the cellular phone 14 to the mail server 22, a message, connection information (DAP-TEL) and coupon as described above are transmitted as an e-mail. Consequently, the user of the cellular phone 14 accesses the download server 26 based on the connection information (DAP-TEL) in the received e-mail and transmits a coupon to the download server 26. The download server 26 if the coupon is valid delivers music data (encrypted music data) according to the coupon. Specifically, the cellular phone 14 can download from the download server 26 encrypted music data, related information and a content key required for reproducing the encrypted music data.

Incidentally, if registering the user per se, i.e. the telephone no. of the cellular phone 12, is registered in designating a destination, scheduled delivery (download scheduling) is feasible of newly released popular music.

The operation as above is concretely processed according to a flowchart shown in FIG. 12 to FIG. 21. It should be noted that, where downloading such music data as protected under copyright, there is a need to pay copyright fee to the copyright owner. There is also the problem that music data if put under free transaction leads to insufficient protection of copyright. In order to avoid such a problem, a present-giving schedule and download process will be explained based upon the processing uniquely devised by the present inventors. Incidentally, such download processing is concretely described in Japanese Patent Application No. H11-345229 filed by the present inventors.

In the figures, dot-lined partitioning is provided in order to facilitate understanding the processing by a controller 36, a controller 70, a CPU 80a, a CPU 90a and a CPU 100a respectively included in the cellular phone 12, the cellular phone 14, the mail server 22, the mail server 24 and download server 26.

Figure 12:
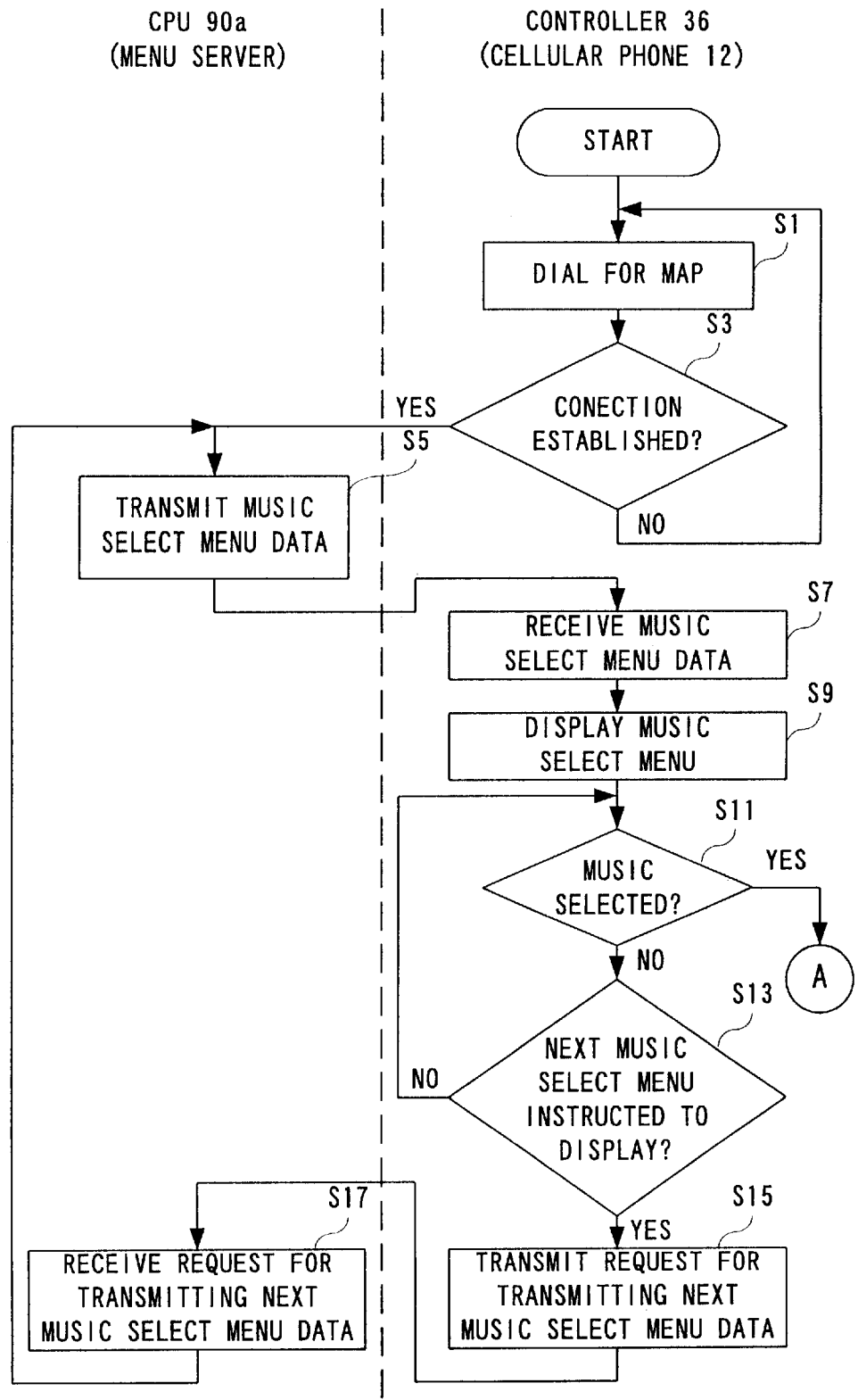
FIG. 12 is a flowchart showing one part of processing in executing present-giving schedule and real-time delivery on the information delivery system shown in FIG. 6.

Referring to FIG. 12, first the controller 36 in step S1 dials for connection information (MAP-TEL) to a menu server 24 access point (MAP). In the subsequent step S3 the controller 36 determines whether a connection has been established or not. If "NO" in step S3, i.e. if no connection is established, the process returns to S1 to perform re-dialing. On the other hand, if "YES" in step S3, i.e. if a connection is established, the CPU 90a in step S5 transmits a predetermined amount of selection music menu data.

Accordingly, in step S7 the controller 36 receives the selection music menu data and in step S9 controls the driver 38 to display a music selection menu on the display 40. That is, on the display 40 is displayed a list in the order of kana syllabary on a singer-by-singer or title-by-title basis. Subsequently, the controller 36 in step S11 determines whether there is music selection or not. That is, it is determined whether a determine button (not shown) provided on the operation panel 44 has been pressed or not. If "YES" in step S11, i.e. if the determine button is pressed, the process advances to step S19 shown in FIG. 13.

On the other hand, if "NO" in step S11, i.e. if the determine button is not pressed, the controller in step S13 determines whether there is an instruction of displaying a next music selection menu or not. That is, it is determined whether a next page button (not shown) provided on the operation panel 44 has been pressed or not. If "NO" in step S13, i.e. if the next page button is not pressed, the process directly returns to step S11. On the other hand, if "YES" in step S13, i.e. if the next page button is pressed, then in step S15 is transmitted transmission request for the next one of music selection menu data. Accordingly, the CPU 90a in step S17 receives a transmission request of selection menu data and in step S5 executes transmission of the next one of music selection menu data in accordance therewith.

Figure 13:
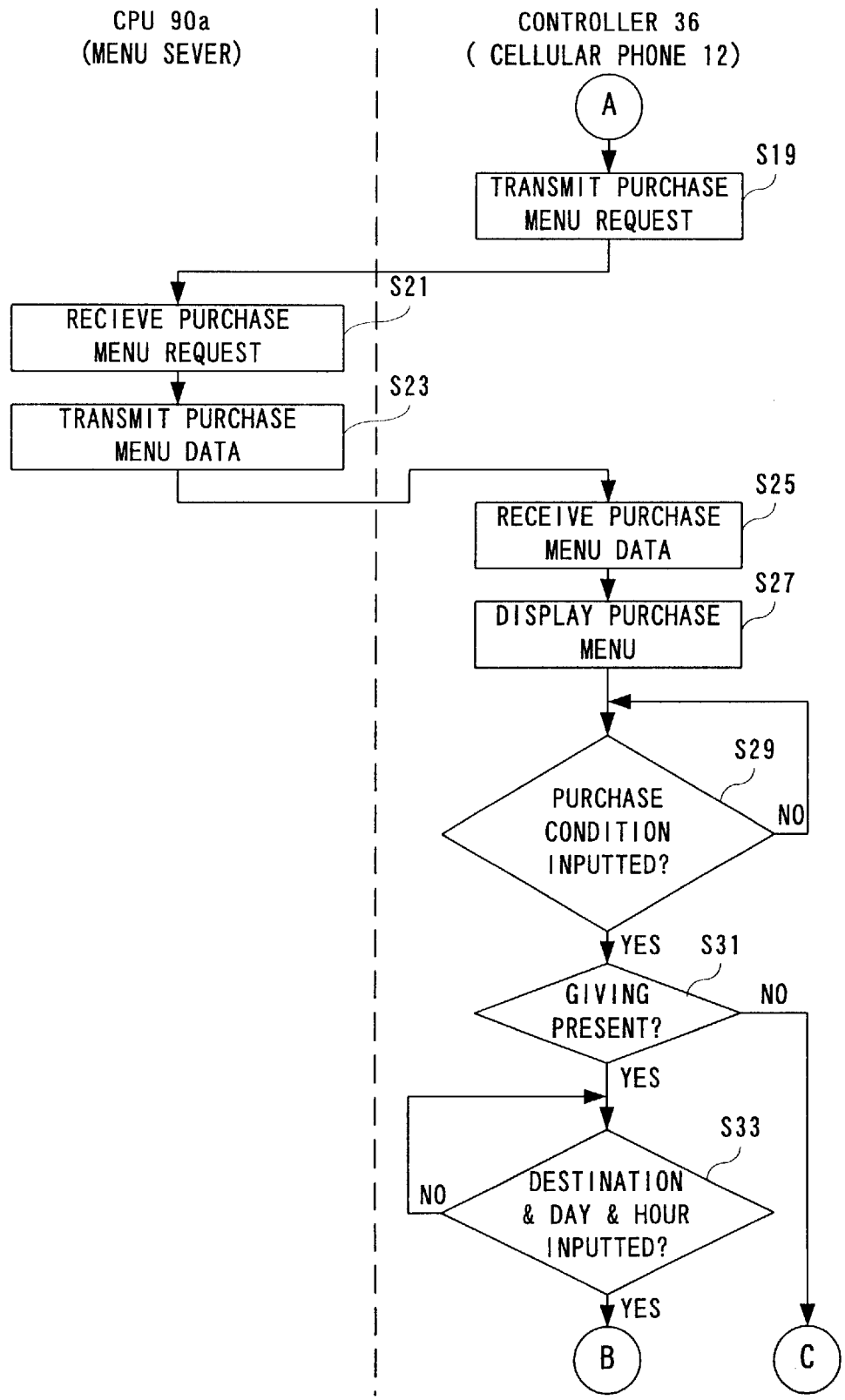
FIG. 13 is a flowchart showing another part of the processing in executing present-giving schedule and real-time delivery on the information delivery system shown in FIG. 6.

In step S19 shown in FIG. 13, transmitted is a purchase menu request. In the subsequent step S21, the CPU 90a receives a purchase menu request. In response, the CPU 90a in step S23 transmits purchase menu data. Accordingly, in step S25 the controller 36 receives purchase menu data and in step S27 controls the driver 38 to display a purchase menu on the display 40. The user is allowed to input a purchase condition according to the purchase menu. For example, it is possible to select (input) whether making a present or not, or to input a day on which presentation is to be made (or a day on which download is to be made). Furthermore, it is also possible to input a reproduce condition, such as a number of times of reproductions.

In the subsequent step S29 the controller 36 determines whether the input of the purchase condition has been finished or not. That is, it is determined whether a reproduce condition or the like has been inputted or not. If "NO" in step S29, i.e. if input such as of a reproduce condition is not ended, the process directly returns to the step S29. On the other hand, if "YES" in the step S29, i.e. if the input such as of a reproduce condition is ended, controller 36 in step S31 determines whether making a present or not. That is, it is determined whether making a present has been selected on the purchase menu or not.

Figure 14:
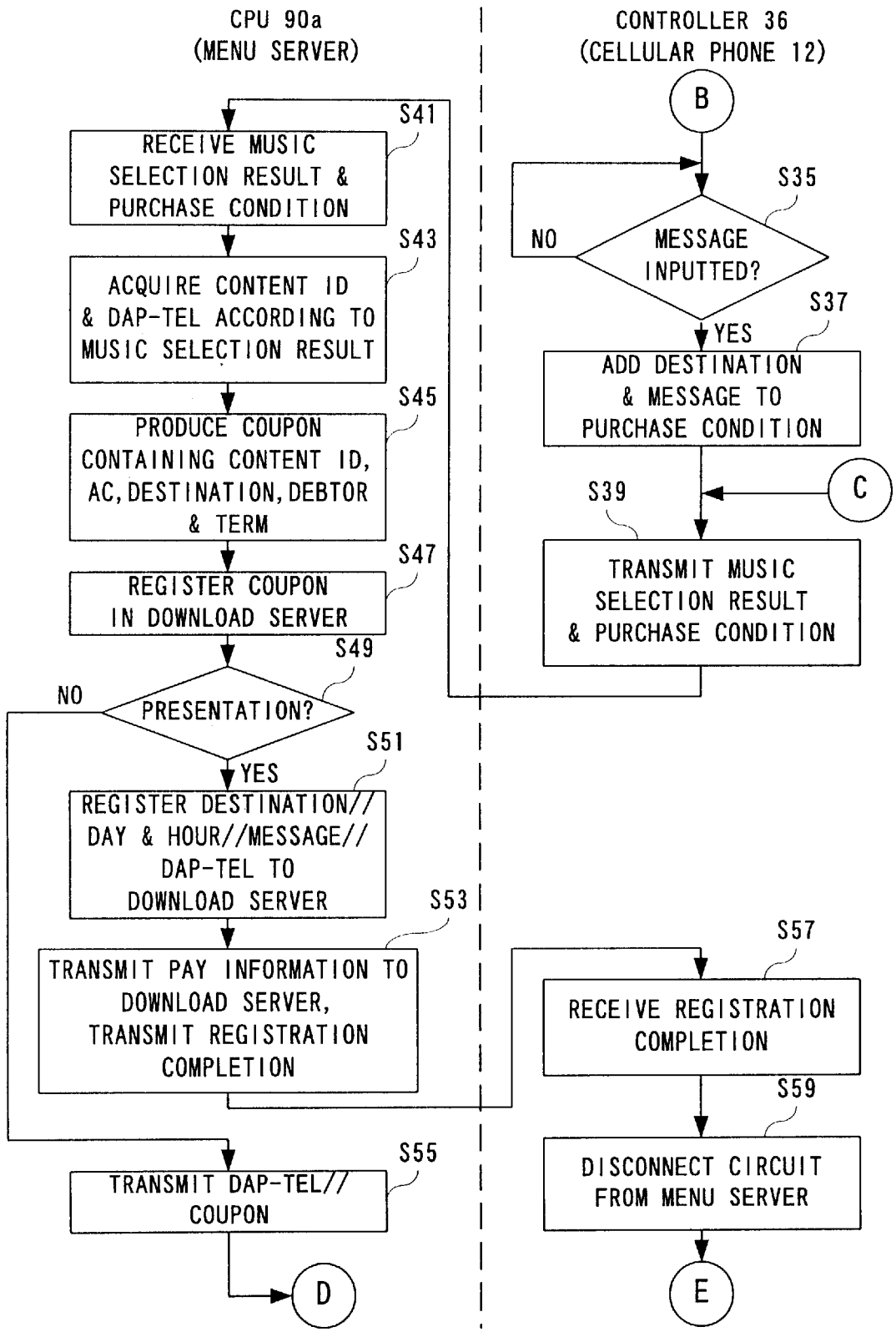
FIG. 14 is a flowchart showing still another part of the processing in executing present-giving schedule and real-time delivery on the information delivery system shown in FIG. 6.

If "NO" in step S31, i.e. if not making a present, the process directly advances to step S39 shown in FIG. 14. Meanwhile, if "YES" in the step S31, i.e. making a present, it is determined in step S33 whether or not a destination has been designated, i.e. inputted are a telephone no. of the cellular phone 14 as a destination, and a delivery day and hour, i.e. a day and hour on which notification is to be made. If "NO" in the step S33, i.e. if either one or both of a destination or a day and time of delivery has not been inputted, the process directly returns to the step S33. On the other hand, if "YES" in the step S33, i.e. if a destination and day and time of delivery are inputted, the process advances to step S35 shown in FIG. 14.

In step S35 the controller 36 determines whether a message has been inputted or not. If "NO" in the step S35, i.e. a message is not inputted, the process returns directly to the step S35. On the other hand, if "YES" in the step S35, i.e. a message is inputted, in step S37 a destination (telephone no., etc.), delivery day and hour and message are added to the purchase condition, and the process proceeds to step S39. In the step S39 the controller 36 transmits a music selection result and purchase condition.

Accordingly, in step S41 the CPU 90a receives a music selection result and purchase condition. In the succeeding step S43 the CPU 90a acquires from an HDD 94 a content ID and connection information (DAP-TEL) to a download server 26 access point (DAP) according to the music selection result. Next, the CPU 90a in step S45 produces a coupon including a content ID, license request information AC, destination, debtor and downloadable term according to the purchase condition.

Incidentally, the license request information AC is a coded portion concerning content reproduction and handling of a purchase condition. From the license request information AC is determined a reproduce condition stated later. Also, the downloadable term represents a coupon valid term. This valid term, in making a present, is to be determined from a time of delivery as a start point. On the other hand, it, if not making a present, is to be determined from a time of accessing the menu server 24 as a starting point.

Then, the CPU 90a in step S47 communicates with the download server 26 and registers a coupon to the download server 26. That is, the coupon is stored to the database 104c on an HDD 104 provided in the download server 26. Here, in the case of not making a present, a destination is user himself or herself, i.e. a telephone no. of the cellular phone 12 or the like. In the case of making a present, a destination is presentee, i.e. a telephone no. of the cellular phone 14 or the like.

Subsequently, the CPU 90a in step S49 determines based on the purchase condition whether making a present or not. If "YES" in the step S49, i.e. making a present, then in step S51 the download server 26 is communicated with to register to the download server 26 a destination, day and hour, message and connection information (DAP-TEL) to the download server 26 access point (DAP). That is, a destination//delivery day and hour//message//DAP-TEL are stored (registered) to the database 104c on the HDD 104 provided in the download server 26. At this time, correspondence is put to a coupon stored earlier to the database 104b.

Note that the representation X//Y means transmission and reception of X and Y. This is true hereinafter throughout the present Specification.

Figure 15:
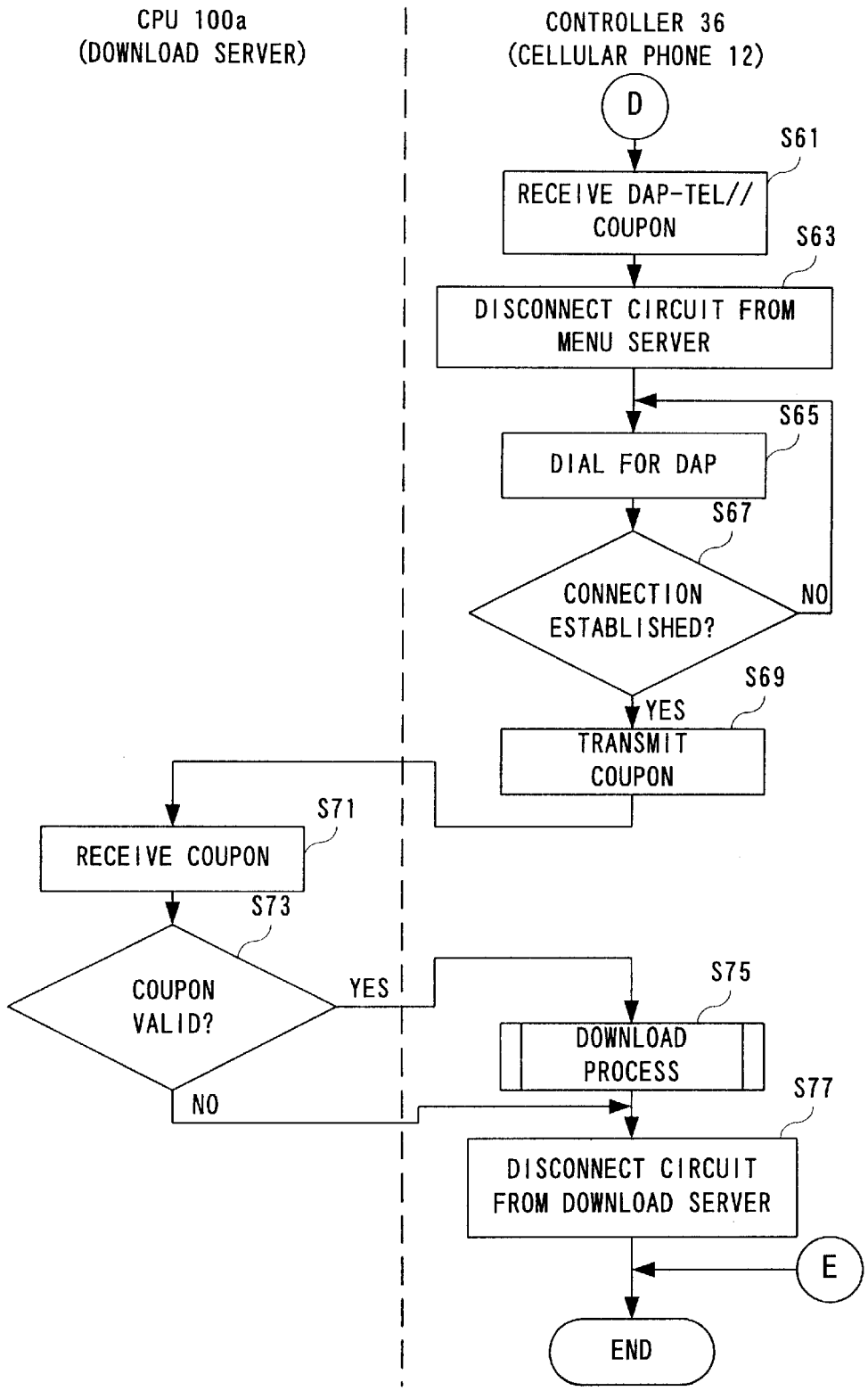
FIG. 15 is a flowchart showing yet another part of the processing in executing present-giving schedule and real-time delivery on the information delivery system shown in FIG. 6.

Then, in step S53 the CPU 90a communicates with the download server 26 and registers pay information based on a unique ID (requester) contained in schedule information, then finishing register completion of present-giving scheduling. Incidentally, the pay information is stored to the database 104c on the HDD 104 provided in the download server 26. The controller 36 in step S57 receives register completion and in step S59 disconnects the circuit from the menu server 24, thus ending the process as shown in FIG. 15. That is, the instant schedule process is completed.

Meanwhile, if "NO" in the step S49, i.e. not making a present, the cellular phone 12 is used for entering a process of downloading encrypted music data for the purpose of own possession. As viewed conversely from the delivery server 20, a real-time delivery process is entered. Specifically, the CPU 90a in step S55 transmits a DAP-TEL//coupon to the cellular phone 12. Consequently, as shown in FIG. 15, the controller 36 in step S61 receives the DAP-TEL//coupon and in step S63 disconnects the circuit from the menu server 24. Subsequently, the controller 36 in step S65 dials for the connection information (DAP-TEL) to a received download server 26 access point (DAP). In step S67 the controller 36 determines whether a connection has been established to the download server 26 or not. If "NO" in step S67, i.e. a connection is not established, the process returns to the step S65 to perform re-dialing. On the other hand, if "YES" in the step S67, i.e. a connection is established, the controller 36 in step S69 transmits a coupon to the download server 26.

Accordingly, in step S71 the CPU 100a of the download server 26 receives a coupon and in the subsequent step S73 determines whether the coupon is valid or not. Specifically, reference is made to a coupon that is stored in the database 104c on the HDD 104 and given by the menu server 24, thereby confirming a content thereof. That is, check is made for a content contained in the coupon, such as a destination and downloadable term. If "YES" in the step S73, i.e. the coupon is valid, the controller 36 in step S75 executes a download process and in step S77 disconnects the circuit from the download server 26, then ending the process. On the other hand, if "NO" in the step S73, i.e. the coupon is invalid, the controller in step S77 directly disconnects the circuit from the download server 26 thus ending the process.

In this manner, encrypted music data can be downloaded directly onto one's own cellular phone 12 (or 14) or scheduled for giving a present.

For example, where executing a scheduled presentation, the CPU 100a of the download server 26 periodically accesses the database 104c of the HDD 104 to notify by an e-mail a presence of a present to the presentee (destination) through the mail server 22 according to a delivery day and hour contained in the schedule information. That is, the mail server 22 notifies the destination of receiving an e-mail. In accordance with this, the destination accesses the mail server 22 and receives as an e-mail a message, a download server 26 access point (DAP-TEL) and a coupon. Thus, the destination is allowed to access the download server 26 to download encrypted music data.

Figure 16:
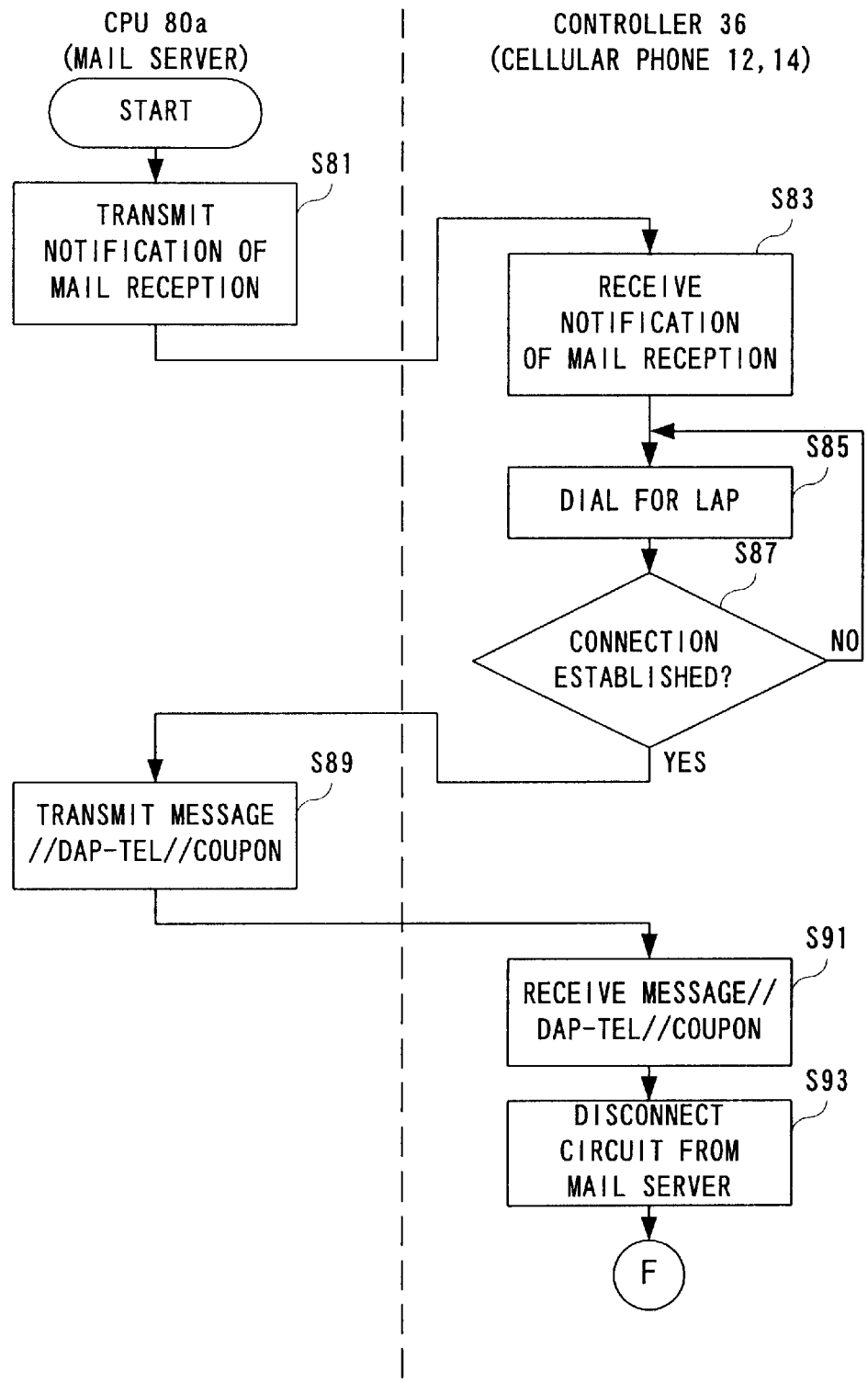
FIG. 16 is a flowchart showing one part of processing in executing present reception on the information delivery system shown in FIG. 6.
Figure 17:
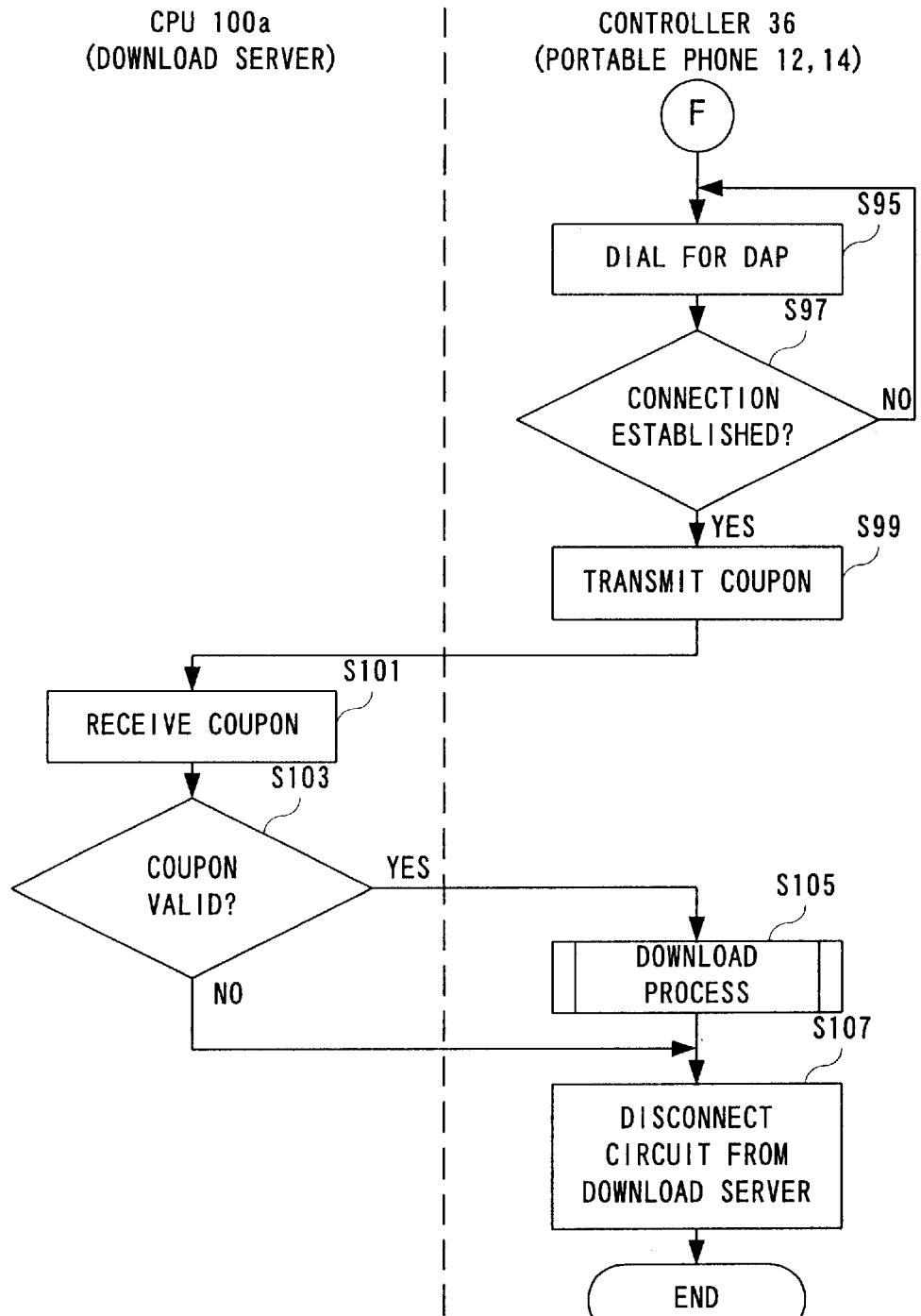
FIG. 17 is a flowchart showing another part of the processing in executing present reception on the information delivery system shown in FIG. 6.

Specifically, a present receiving process is carried out according to a flowchart shown in FIG. 16 and FIG. 17. Incidentally, as stated above, a similar process is executed where designating as a destination a telephone no. of one's own cellular phone in present-giving scheduling. That is, it is possible to deliver by scheduling encrypted music data for the purpose of own position.

Referring to FIG. 16, first in step S81 the CPU 80a transmits to notify mail reception, i.e. notify receiving an e-mail. Accordingly, the controller 36 of the cellular phone 14 in step S83 receives the notification of mail reception. Subsequently, the controller 36 in step S85 dials for connection information (LAP-TEL) to a mail server 22 access point (LAP). It is determined in step S87 whether a connection is established to the mail server 22 or not. If "NO" in the step S87, i.e. a connection is not established, the process returns to the step S85 to perform re-dialing. On the other hand, if "YES" in the step S87, i.e. a connection is established, the CPU 80a in step S89 reads out of the HDD 84 a message, connection information to the access point (DAP) for accessing the download server 26, and a coupon, and then transmits them, i.e. a message//DAP-TELL// coupon.

Accordingly, in step S91 the controller 36 receives the message//DAP-TEL//coupon. Then, the controller 36 in step S93 disconnects the circuit from the mail server 22 and dials for connection information (DAP-TEL) to an access point (DAP) to the download server 26. In step S97 the controller 36 determines whether a connection has been established to the download server 26. If "NO" in step S97, i.e. a connection is not established, the process returns to the step S95 to perform re-dialing. On the other hand, if "YES" in the step S97, i.e. a connection is established, then in step S99 a coupon is transmitted to the download server 26.

Accordingly, the CPU 100a of the download server 26 in step S101 receives the coupon and in step S103 determines whether the coupon is valid or not. If "YES" in the step S103, i.e. the coupon is valid, the controller 36 in step S105 executes a download process and in step S107 disconnects the circuit from the download server 26, thereafter ending the process. On the other hand, if "NO" in the step S103, i.e. the coupon is valid, the controller 36 in the step S107 disconnects the circuit from the download server 26 and finishes the process.

The download processes shown in FIG. 15 and FIG. 17 are the same process and can be represented in detail by a flowchart as shown in FIG. 18 to FIG. 21. Incidentally, FIG. 15 and FIG. 17 describe that the controller 36 included in the cellular phone 12 or cellular phone 14 executes a download process. However, a download process in actual is executed by communication between the CPU 100a in the download server 26 and the controller 70 in the memory card 58 through the controller 36 in the cellular phone 12 (or cellular phone 14). Accordingly, partitioning is provided in the figure in order to make easy to understand the processes of the controller 36, the controller 70 and the CPU 100a.

When a download process is started, first in step S111 the controller 70 outputs a certified public encryption key ({KPmc(1)}KPma). Note that the certified public encryption key ({KPmc(1)}KPma) is stored within a key memory 78 not directly accessible by a user, etc. Also, the public encryption key (KPmc(1)) is a public encryption key unique to a media class (kind, production lot, etc.) of the memory card 58.

In the subsequent step S113 the controller 36 transmits the certified public encryption key ({KPmc(1)}KPma). In step S115 the CPU 100a receives the certified public encryption key ({KPmc(1)}KPma) and in step S117 shown in FIG. 19 decrypts the certified public encryption key ({KPmc(1)}KPma) using a RAM 100b as a work memory.

Incidentally, the download server 26 previously holds within the computer 100 a public key (authentication key: KPma) to decrypt the certified public encryption key ({KPmc(1)}KPma). Using the authentication key (KPma), the certified public encryption key ({KPmc(1)}KPma) is decrypted. Also, the expression {X}Y means information of X encrypted in a decryptable form by a key Y. This is true hereunder throughout the present Specification.

In step S119 the CPU 100a determines from a result of decryption whether the public encryption key (KPmc(1)) contained in the received certified public encryption key ({KPmc(1)}KPma) is valid or not. At this time, the CPU 100a makes an inquiry to an authentication server 28 to thereby examine whether the public encryption key (KPmc (1)) is effective or not.

Figure 21:
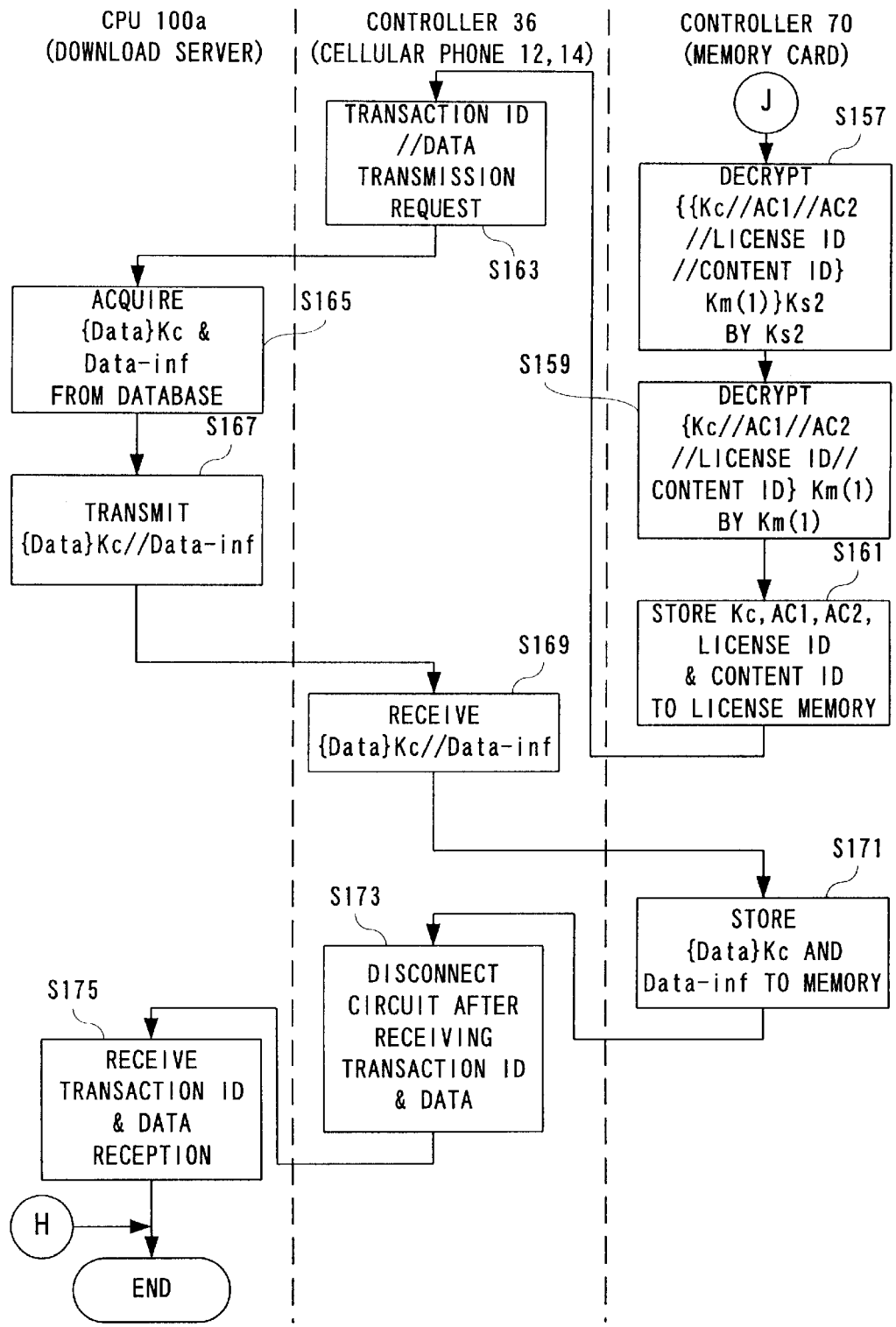
FIG. 21 is a flowchart showing yet another part of the download process to actually download music data from the download server shown in FIG. 6 onto the memory card.

If "NO" in the step S119, i.e. the public encryption key (KPmc(1)) is in valid, the process is ended as it is as shown in FIG. 21. On the other hand, if "YES" in the step S119, i.e. the public encryption key (KPmc(1)) is valid, in step S121 the CPU 100a uses RAM 100b to produce a code (transaction ID) capable of specifying a delivery session. Subsequently, the CPU 100a in step S123 produces a common key (Ks1) unique to the session by use of the RAM 100b, and performs encryption in a decryptable form with a privacy decryption key (Kmc(1)) unique to a media class of an asymmetric memory card 58 by use of the public encryption key (KPmc(1)). That is, ({Ks1}Kmc(1)is produced. Then, the CPU 100a in step S125 transmits the produced transaction ID and {Ks1}Kmc(1).

In the subsequent step S127, the controller 36 receives the transaction ID and {Ks1}Kmc(1), and in step S129 accepts only the transaction ID and transmits {Ks1}Kmc(1) as it is to the controller 70 of the memory card 58. Accordingly, in step S131 the controller 70 receives {Ks1}Kmc(1) and decrypts this {Ks1}Kmc(1) by using the privacy decryption key (Kmc(1)) unique to the memory card 58, accepting a common key (Ks1) unique to the session. Incidentally, the privacy decryption key (Kmc(1)) unique to the memory card 58 is also stored in the key memory 78 similarly to the certified public encryption key ({KPmc(1)}Kpma).

Next, the controller 70 in step S133 generates a common key (Ks2) unique to the session, and decryptably encrypts and outputs the common key (Ks2) unique to a session and the public encryption key (KPm(1)) by use of the common key (Ks1) unique to the session. That is, {Ks2//KPm(1)}Ks1 is created and delivered to the controller 36 through the bus 32.

Note that the representation {X//Y} Z means information of X and Y encrypted in a decryptable form by a key Z. This is true hereunder throughout the Specification.

Then, the controller 36 in step S135 adds the transaction ID to {Ks2//KPm(1)}Ks1, and in step S137 transmits {Ks2//KPm(1)}Ks1//transaction ID.

The CPU 100a in step S139 receives the {Ks2//KPm(1)}Ks1//transaction ID, and in step S141 decrypts {Ks2//KPm(1)}Ks1 with the common key (Ks1) unique to the session by use of RAM 100 b. Thus, Ks2 and KPm(1) are obtained. Subsequently, the CPU 100a in step S143 shown in FIG. 20 acquires a content key (Kc) from a database stored on the HDD 104 according to the content ID acquired before (in the step S115). Then, the CPU 100a in step S145 generates a management code (license ID) capable of specifying issuance of a license.

Also, the CPU 100a in step S147 generates limitation information (AC1) and control information (AC2) for the reproducer circuit 46, according to the license request information AC obtained before (in the step S115). The limitation information (AC1) includes permission information for determining whether to output a content key (Kc) stored in the memory card 58, number-of-times limitation information for limiting the number of times of reproducing, limitation information concerning movement of content data (movement limitation information) and duplication limiting information for limiting the number of duplications of the content data.

Incidentally, the number-of-times limiting information is, for example, 2-bit data and set between "00"–"FF". The number-of times limiting information "00" represents prohibition from reproducing while "FF" shows the limitless number of times of reproducing. Also, the number of times of reproducing is limited in between "01"–"FE". More precisely, the content key (Kc) is limited in the number of times of outputting.

Meanwhile, in the third embodiment because the content data will not moved to another memory card or duplicated, explanations of movement limiting information and duplication limiting information will be hereunder omitted.

On the other hand, the control information (AC2) is information representative of a limitation of reproducing, such as a time limit of reproducing, on a side of a reproducer circuit. Specifically, the time limit of reproducing limits a reproducible day and hour.

Next, the CPU 100a in step S149 encrypts the content key (Kc), limiting information (AC1), control information (AC2), license ID and content ID with use of the public encryption key (KPm(1)) decryptable by the decryption key (Km(1)) unique to the memory card 42. That is, {Kc//AC1//AC2//license ID//content ID}Km(1) is produced and held in the RAM 100b.

Subsequently, the CPU 100a in step S151 encrypts {Kc//AC1//AC2//license ID//content ID}Km(1) held in the RAM 100b by use of the common key (Ks2) unique to the session. That is, {Kc//AC1//AC2//license ID//content ID}Km(1)}Ks2 is produced. Then, in step S153 this {{Kc//AC1//AC2//license ID//content ID}Km(1)}Ks2 is tranmitted.

Accordingly, the controller 36 in step S155 receives {{Kc//AC1//AC2//license ID//content ID}Km(1)}Ks2, and thereafter provides it to the controller 70. In response, the controller 70 in step S157 shown in FIG. 21 decrypts {{Kc//AC1//AC2//license ID//content ID}Km(1)}Ks2. Consequently, {Kc//AC1/AC2//license ID//content ID}Km(1) is created. Next, the controller 70 in step S159 decrypts {Kc//AC1//AC2//license ID//content ID}Km(1) into a normal text by use of the decryption key (Km(1)) unique to the memory card 58. This accordingly provides a content key (Kc), limiting information (AC1), control information (AC2), license ID and content ID. In the subsequent step S161, the controller 70 stores the content key (Kc), limiting information (AC1), controller information (AC2), license ID and content ID into the license memory 76.

When the content key (Kc), limiting information (AC1), control information (AC2), license ID and content ID are stored in the license memory 76, the controller 36 in step S163 transmits the transaction ID acquired before (in the step S129) and a data transmission request. In response, the CPU 100a acquires {Data}Kc decryptably encrypted, by the content key (Kc), the music data encrypted out of the database 104a on the HDD 104, i.e. content data, and additional information (Data-inf) corresponding thereto. Incidentally, the additional information (Data-inf) includes normal text information, such as corresponding content data related to copyright or related to server access, titles, artists (singers, performers, etc.), composers, song writers words and jackets. In the subsequent step S167, the CPU 100a transmits {Data}Kc//Data-inf.

Accordingly, the controller 36 in step S169 receives {Data}Kc//Data-inf, and thereafter provides it to the controller 70. The controller 70 in step S171 accepts {Data}Kc//Data-inf and stores encrypted content data {Data}Kc and additional information (Data-inf) to the memory 74.

Having stored the encrypted content data {Data}Kc and additional information (Data-inf), the controller 36 in step S173 transmits the transaction ID and data reception, and thereafter disconnects the circuit. Accordingly, CPU 100a in step S175 receives the transaction ID and data acceptance, thus ending the process.

In this manner, the cellular phone 12 or cellular phone 14 accesses the download server 26 to store (download) encrypted content data (music data), additional information thereto and information required for reproducing, such as a decryption key (license information) into the memory card 58.

Meanwhile, the downloaded music data is to be reproduced by use of the cellular phone 12 (or cellular phone 14). Consequently, the reproduced music data is outputted through the headphone 200 (or headphone 202) connected to the output terminal 60.

Figure 22:
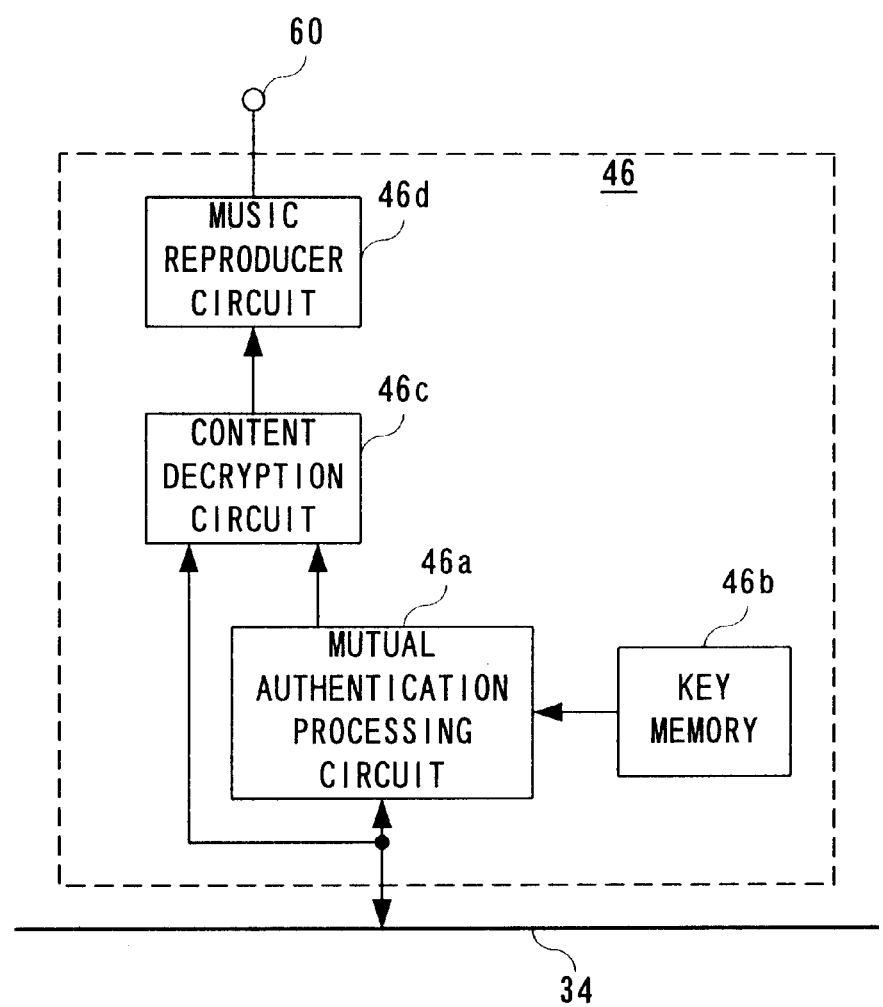
FIG. 22 is an illustrative view showing a configuration of a reproducer circuit provided in the cellular phone shown in FIG. 7.

The music-data reproducer circuit 46 includes a mutual authentication processing circuit 46a, as shown in FIG. 22. The mutual authentication processing circuit 46a is coupled to the memory card 58 through the bus 34, and interchanges keys with the memory card 58 to obtain a content key (Kc) protected under the copyright and control information (AC2), thereby carrying out mutual authentication. Also, the mutual authentication processing circuit 46a is coupled with a key memory 46b and a content decryption processing circuit 46c. The key memory 46b stores a key unique to a plus of the reproducer circuit to be handled by the mutual authentication processing circuit 46a. The content decryption processing circuit 46c is also coupled to the memory card 58 through the bus 34 to be supplied with encrypted music data ({Data}Kc) from the memory card 58. Also, supplied is a content key (Kc) finally obtained by the mutual authentication processing circuit 46a. Accoridngly, in the content decryption processing circuit 46c the encrypted music data ({Data}Kc) is decrypted (into normal text) by use of the content key (Kc). That is, music data (Data) as normal text information is outputted from the content decryption processing circuit 46c and supplied to the music reproducing processing circuit 46d. The music reproducing processing circuit 46d performs a reproducing process on the music data (Data), outputting to the terminal 60.

Figure 23:
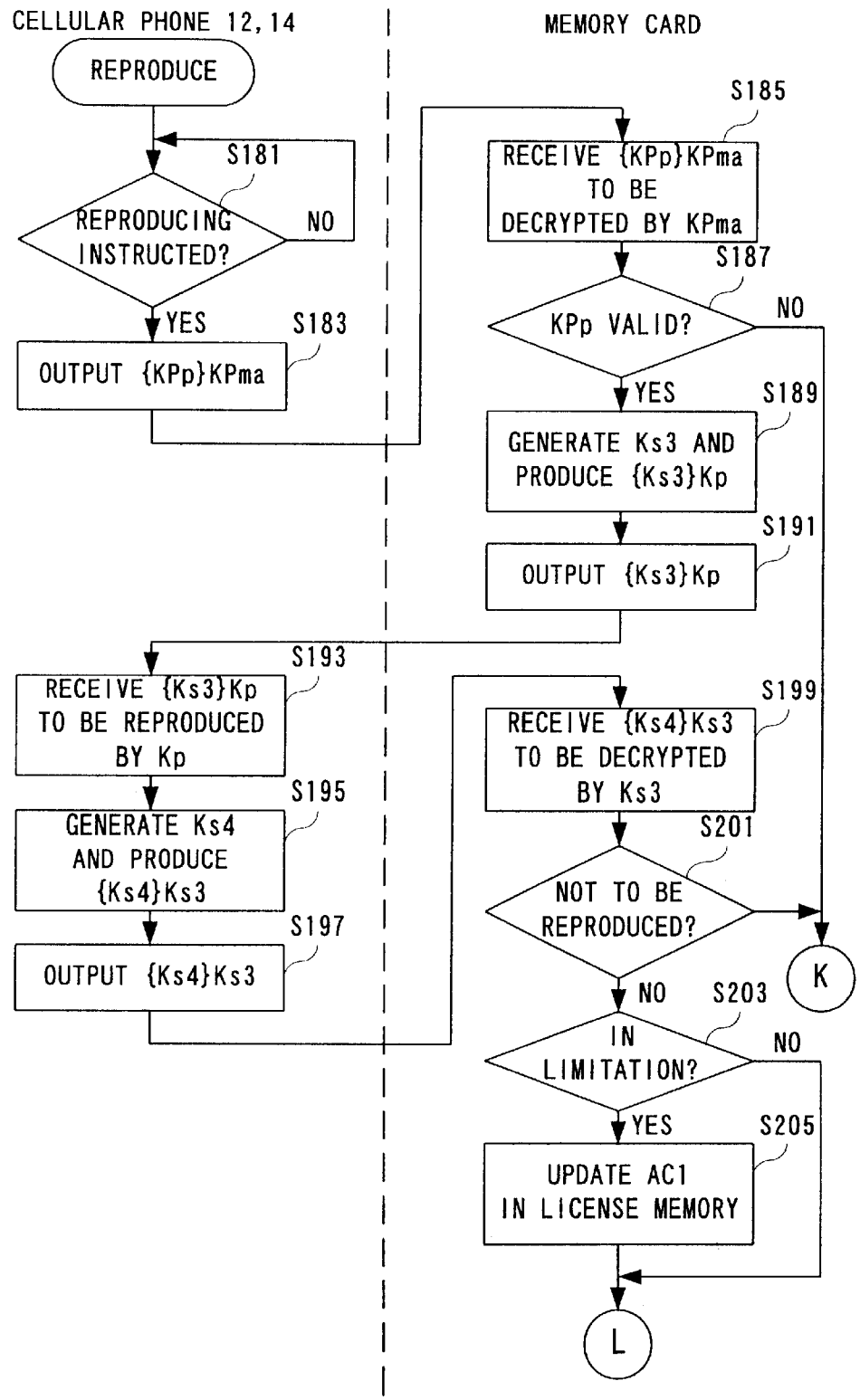
FIG. 23 is a flowchart showing a part of reproducing process to reproduce the music data downloaded to the memory card using the cellular phone shown in FIG. 7.
Figure 24:
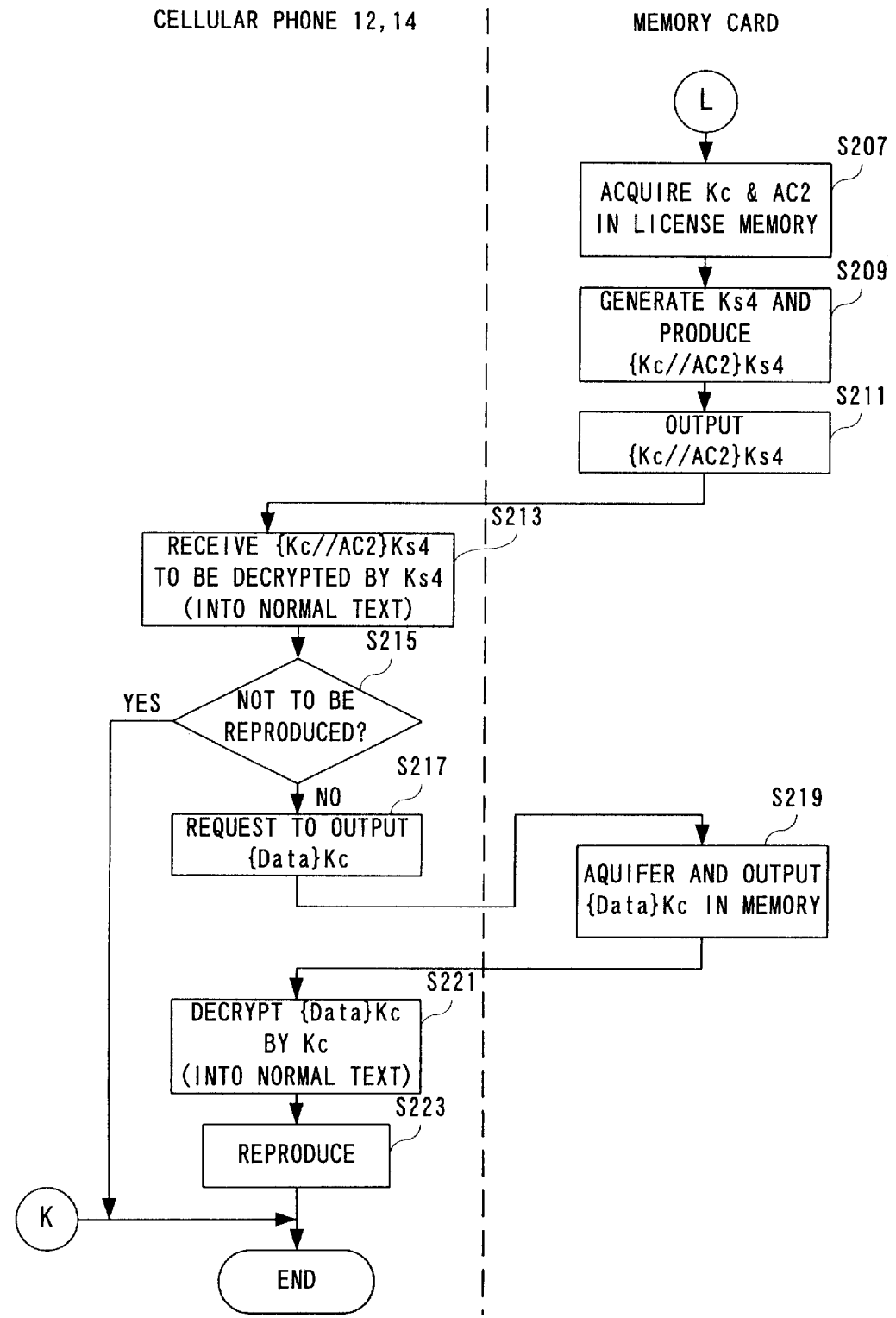
FIG. 24 is a flowchart showing another part of the reproducing process to reproduce the music data downloaded on the memory card using the cellular phone shown in FIG. 7.

Specifically, a reproducing process is carried out according to a flowchart as shown in FIG. 23 and FIG. 24. Incidentally, the reproducing process is also concretely shown in Japanese Patent Application No. H11-345229 devised independently by the present inventors. As described above, because the reproducing process is executed by the controller 36 within the cellular phone 12 or 14, a reproducer circuit 46, and the controller 70 within the memory card 58, in FIG. 23 and FIG. 24 dot-lined partitioning is provided to facilitate understanding the respective operations.

First, the controller 36 in step S181 determines whether or not a reproduce instruction has been inputted by the user. If "NO" in the step S181, i.e. a reproduce instruction is not inputted, the process returns to the same step S181. On the other hand, if "YES" in the step S181, i.e. a reproduce instruction is inputted, then in step S183 a reproduce instruction is inputted to the reproducer circuit 46. Consequently, the mutual authentication processing circuit 46a reads out a certified encrypted key ({KPp}KPma) stored in the key memory 46b and outputs it.

Accordingly, the controller 70 in step S185 receives the certified decryption key ({KPp}KPma) and decrypt (into normal text) the certified encryption key ({KPp}KPma) by use of the authentication key (KPma). In the subsequent step S187, the controller 70 in step S185 determines from a result of decryption whether the public encryption key (KPp) is valid or not. If "NO" in step S187, i.e. the public encryption key (KPp) is invalid, the process is ended as it is as shown in FIG. 23. On the other hand, if "YES" in the step S187, i.e. the public encryption key (KPp) is valid, the controller 70 in step S189 generates a common key (ks3) unique to the session and encrypts it into a decryptable form by use of the public decryption key (KP) of the cellular phone 12. That is, {Ks3}Kp is produced. Then, the controller 70 in step S191 outputs {Ks3}Kp.

Accordingly, the controller 36 in step S193 receives {Ks3}Kp and inputs it to the mutual authentication processing circuit 46a. The mutual authentication processing circuit 46a decrypts {Ks3}(into normal text) by use of the privacy decryption key (Kp) stored in the key memory 46b. In the subsequent step S195, a common key (Ks4) unique to the session is generated and the common key (Ks4) is encrypted by the common key (Ks3). That is, {Ks4}Ks3 is produced. Subsequently, in step S197 this {Ks4}Ks3 is outputted.

In step S199, the controller 70 receives {Ks4}Ks3 and decrypts it (into normal text) by the common key (Ks3). Thus, a common key (Ks4) is obtained. In the succeeding step S201, the controller 70 determines based on limiting information (AC1) whether non-reproducible or not. If "YES" in step S201, i.e. content key (Kc) output is not permitted or content key (Kc) output is permitted but the number-of-times limiting information is "00", determination is as non-reproducible and the process is ended as shown in FIG. 24. On the other hand, if "NO" in the step S201, i.e. content key (Kc) output is permitted and the number-of-times limiting information is other than "00", determination is as reproducible and in step S203 it is determined whether there is limitation in the number of times of reproducing.

If "NO" in the step S203, i.e. the number-of-times limiting information is "FF", determination is as not limited in the number of times of reproducing, and the process directly proceeds to step S137 shown in FIG. 23. On the other hand, if "YES" in the step S203, i.e. the number-of-times limiting information is "01"–"FE", determination is as limited in the number of times of reproducing, and the process advances to step S207. After in step S205 the limiting information (AC1) in the license memory 77 is updated, i.e. after the number-of-times limiting information is counted down.

In step S207 shown in FIG. 23, the controller 70 acquires the content key (Kc) in the license memory 76 and the control information (AC2) for the reproducer circuit and writes them to the memory 74. In the succeeding step S209, the content key (Kc) and the reproducer-circuit control information (AC2) are encrypted by the afore-acquired common key (Ks4) unique to the session. Accordingly, {Kc//AC2}Ks4 is produced. Then, in step S211 the controller 70 outputs this {Kc//AC2}Ks4.

Accordingly, in step S213 the controller 36 acquires {Kc//AC2}Ks4 and inputs it to the mutual authentication processing circuit 46a. Then, the mutual authentication processing circuit 46a decrypts (into normal text) {Kc//AC2}Ks4 with use of the common key (Ks4), according to an instruction by the controller 36. Thus, a content key (Kc) and control information (AC2) are obtained. The content key (Kc) is supplied to a content decryption processing circuit 46c according to an instruction by the controller 36, while the control information (AC2) is given to the controller 36. Subsequently, in step S215 the controller 36 determines based on the control information (AC2) whether it is non-reproducible or not. That is, it is determined whether or not a term for reproducing by the reproducer circuit 46 expired, by referring to time information given from a timer 42. If "YES" in the step S215, i.e. the reproducible term is over, the process is ended as it is. On the other hand, if "NO" in the step S215, i.e. the reproducible term is not expired, the controller 36 in step S217 requests the memory card 58 to output the encrypted music data ({Data}Kc). In response, in step S219 the controller 70 acquires the encrypted music data {Data}Kc of the memory 74 and then outputs it.

In response, the controller 36 in step S221 inputs the encrypted music data {Data}Kc to the content decryption processing circuit 46c. The content decryption processing circuit 46c decrypts (into normal text) the decrypted music data {Data}Kc by use of the content key (Kc) and in step S223 outputs the music data (Data) to a music-reproducing processing circuit 46d. The music-reproducing processing circuit 46d reproduces the music data (Data) and ends the process.

In this manner, the encrypted music data downloaded to the memory card 58 can be reproduced on the cellular phone 12 (or cellular phone 14).

According to the third embodiment, the user can download desired encrypted music data for the purpose of own position. Also, the download server instructs the mail server according to a coupon registered by the user to transmit, from the mail server to a presentee's cellular phone, a message, connection information of download-server access point and a coupon. Accordingly, the presentee's cellular phone can access the download server according to the connection information and download music data to be presented. That is, giving a present is possible on a particular day and hour, e.g. on a birthday or memorable day. Furthermore, pay information is stored to the HDD of the download server at the time of scheduling, according to an ID unique to the requester. Thus, the music data can be presented without problems.

Incidentally, although in the third embodiment the pay information was registered upon scheduling, the pay information may be registered when transmitting a message, etc. from the mail server. Or otherwise, the pay information may be registered upon completing download.

Also, in the third embodiment, where there is a notification on a presence of a present from the mail server, the cellular phone responds to accesses the mail server and acquires a message, connection information (DAP-TEL) and a coupon. Alternatively, notification may be repeated in an absence of a response to a notification by the mail server.

For example, in the download server 26 CPU 100a periodically accesses the database 104c of the HDD 104 to perform schedule management based on a delivery day and hour of schedule information. When coming a delivery day and hour (day and hour of making a present) contained in a coupon, an e-mail is transmitted through the mail server 22 notifying a presence of a present. At this time, update is made on the scheduled management information, i.e. delivery day and hour. Meanwhile, when coming an updated day and hour of delivery without access to the download server 26 from the cellular phone regardless of issuing notifications, an e-mail is again transmitted through the mail server 24 to notify a presence of a present. Hereafter, such operations are repeated a predetermined number of times at a predetermined time interval each time of which schedule management information is updated in delivery day and hour and a presence of a present is notified.

Incidentally, where music data could not be delivered onto a cellular phone, the coupon may be cancelled in compliance with a contract with a user as a presenter (requester).

Fourth Embodiment

An information delivery system 10 of a fourth embodiment is similar to the FIG. 1 embodiment except in that processing is collective for a process of a present-giving schedule, a process of downloading encrypted music data for one's own position and a process of receiving a present. Hence, duplicated explanations will be omitted.

The information delivery system 10 of the fourth embodiment is similar in configuration to the third embodiment shown in FIG. 6 excepting that the mail server 22 of the delivery server 20 is eliminated, hence omitting duplicated explanations.

In this information delivery system 10, where there is a present-giving schedule, when a cellular phone 12 or cellular phone 14 accesses a menu server 24, a coupon and connection information (DAP-TEL) to a download server 26 are transmitted. That is, the menu server 24 identifies whether a cellular phone accessing the menu server 24 is a cellular phone or not to which download due to present-giving schedule is possible according to information such as a telephone no. of that phone. If it is a cellular phone downloadable through schedule, a coupon and connection information (DAP-TEL) are transmitted to the cellular phone accessed the menu server 24.

That is, the user of the cellular phone 12 or cellular phone 14 if accesses menu server 24 can select to schedule for a present, download encrypted music data for his or her possession or receive a present. Thus, the user can perform corresponding processing.

Specifically, the process is carried out according to a flowchart as shown in FIG. 25 to FIG. 30. Incidentally, this process will be explained using the cellular phone 12 for easy understanding. It should however be noted that the process is similarly possible using a cellular phone 14, i.e. the cellular phone 12 is replacable with the cellular phone 14.

Figure 25:
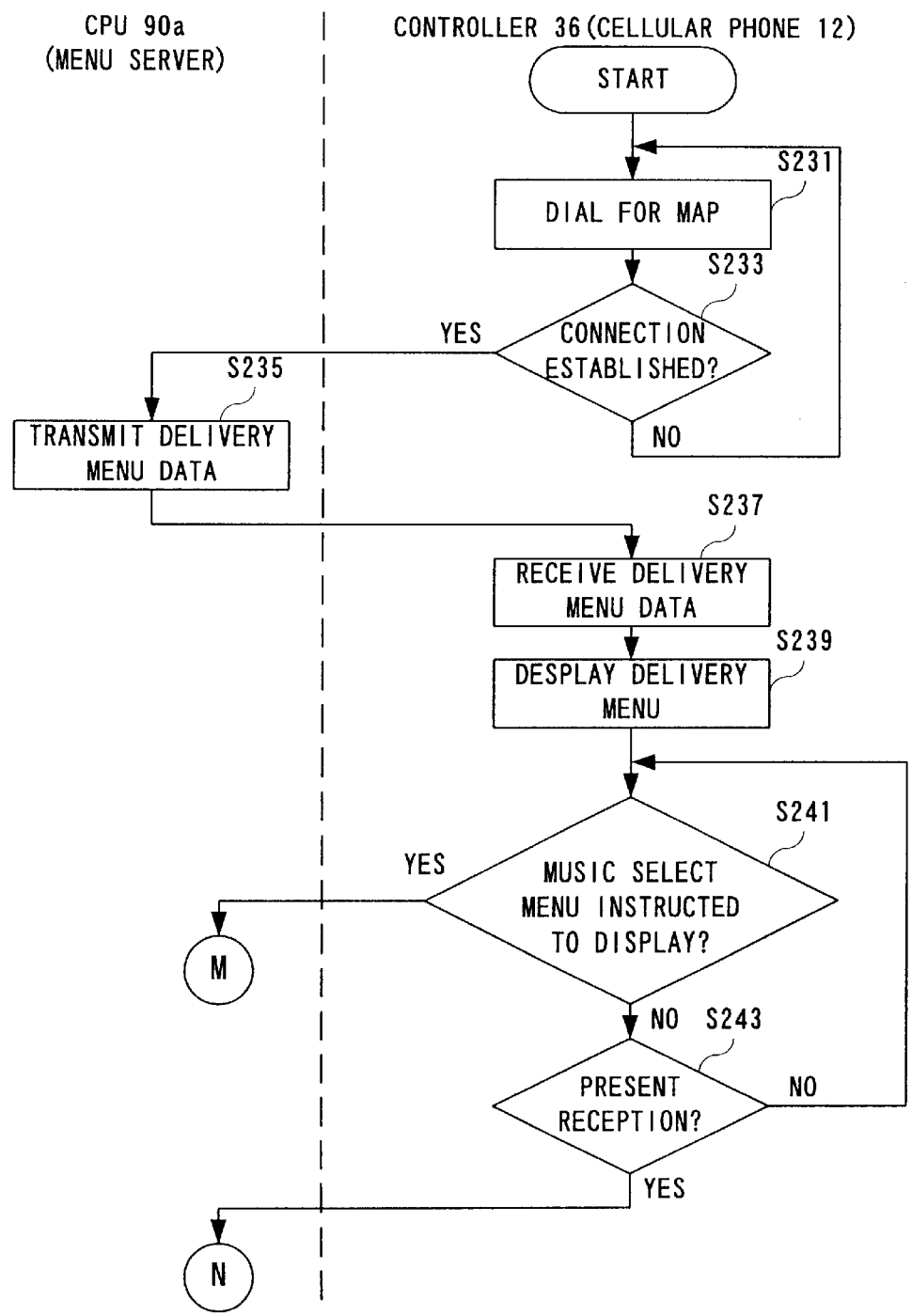
FIG. 25 is a flowchart showing one part of a process to execute present-giving schedule, real-time delivery and present reception in the fourth embodiment of the information delivery system of the invention.

Referring to FIG. 25, first the controller 36 in step S231 dials for connection information (MAP-TEL) to a menu server 24 access point (MAP). In the succeeding step S233 the controller 36 determines whether a connection has been established to the menu server 24 or not. If "NO" in step S233, i.e. a connection is not established, the process returns to the step S231 to perform re-dialing. On the other hand, if "YES" in the step S233, i.e. a connection is established to the menu server 24, then in step S235 the CPU 90a transmits delivery menu data. Consequently, the controller 36 in step S237 receives the delivery menu data and in step S239 controls the driver 38 to display a delivery menu on the display 40. The delivery menu herein includes at least information representative of a presence or absence of music data as a present wherein, for example, determination of executing a process of receiving a present is possible according to this delivery menu.

Next, the controller 36 in step S241 determines whether an instruction to display a music selection menu has been inputted by the user or not. If "YES" in the step S241, i.e. an instruction to display a music selection menu is inputted, the process proceeds to step S245 shown in FIG. 26. On the other hand, if "NO" in the step S241, i.e. an instruction to display a music selection menu is not inputted, it is determined in step S243 whether reception of a present is to be executed or not. If "NO" in the step S243, i.e. present reception is not to be executed, the process returns directly to the step S241. On the other hand, if "YES" in the step S243, i.e. present reception is to be executed, the process advances to the step S303 shown in FIG. 29.

Figure 26:
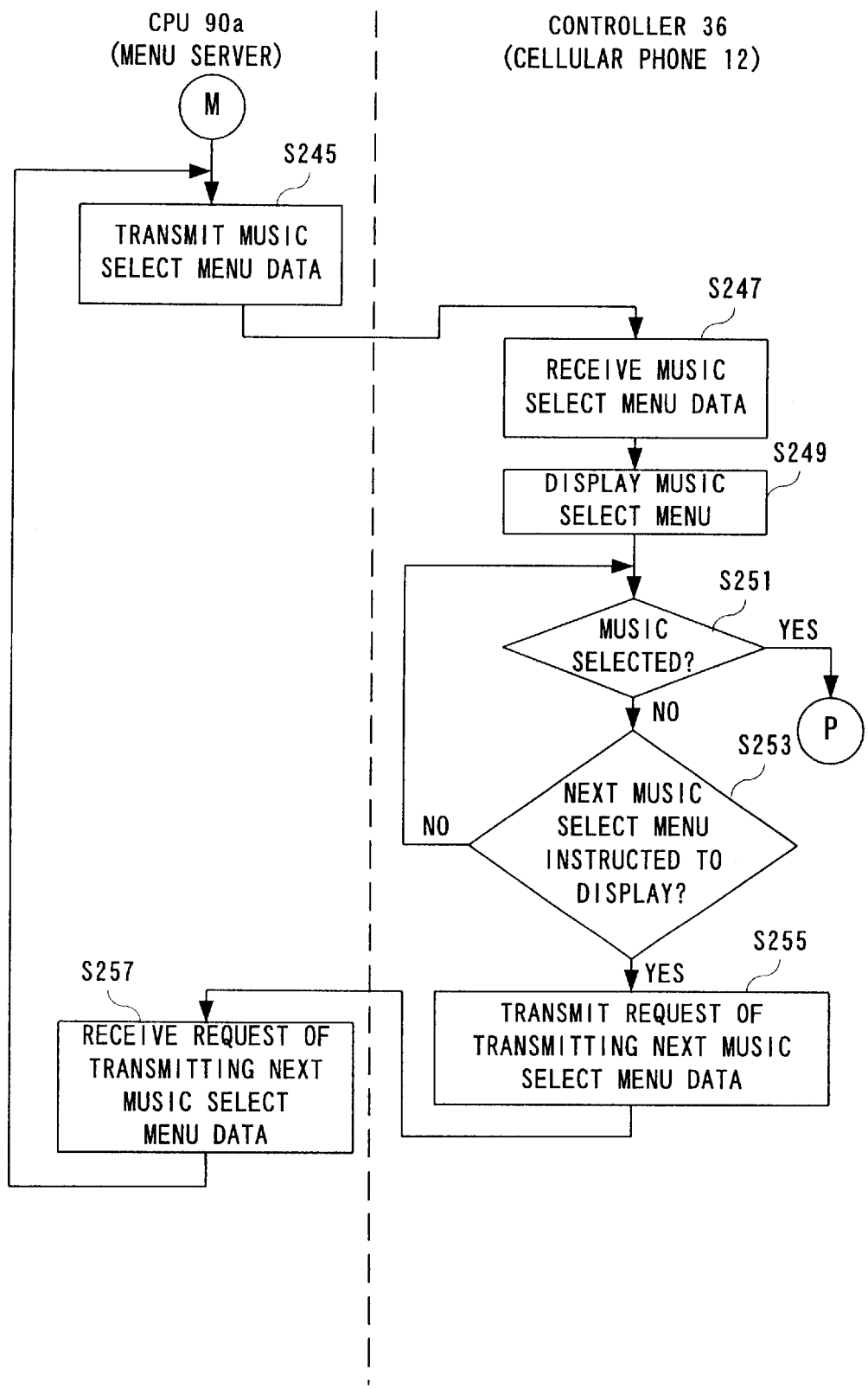
FIG. 26 is a flowchart showing another part of the process to execute present-giving schedule, real-time delivery and present reception in the fourth embodiment of the information delivery system of the invention.

As shown in FIG. 26, in step S245 the CPU 90 transmits a predetermined amount of music selection menu data. Consequently, the controller 36 in step S247 receives the music selection menu data, and in step S249 controls the driver 38 to display a music selection menu on the display. In the succeeding step S251, the controller 36 determines whether there is music selection or not. If "YES" in the step S251, i.e. there is a music selection, the process advances to step S259 shown in FIG. 27. On the other hand, if "NO" in the step S251, i.e. there is no music selection, it is determined in step S253 whether an instruction for displaying a next music selection menu has been inputted or not. If "NO" in the step S253, i.e. an instruction is not inputted for displaying a next music selection menu, the process directly returns to the step S251. On the other hand, if "YES" in the step S253, i.e. an instruction is inputted for displaying a next music selection menu, in step S255 a request is transmitted to transmit the next music selection menu data. Accordingly, in step S257 the CPU 90a receives the request of transmitting the next music selection menu data, and the process returns to the step S245 to transmit the next music selection menu data.

Figure 27:
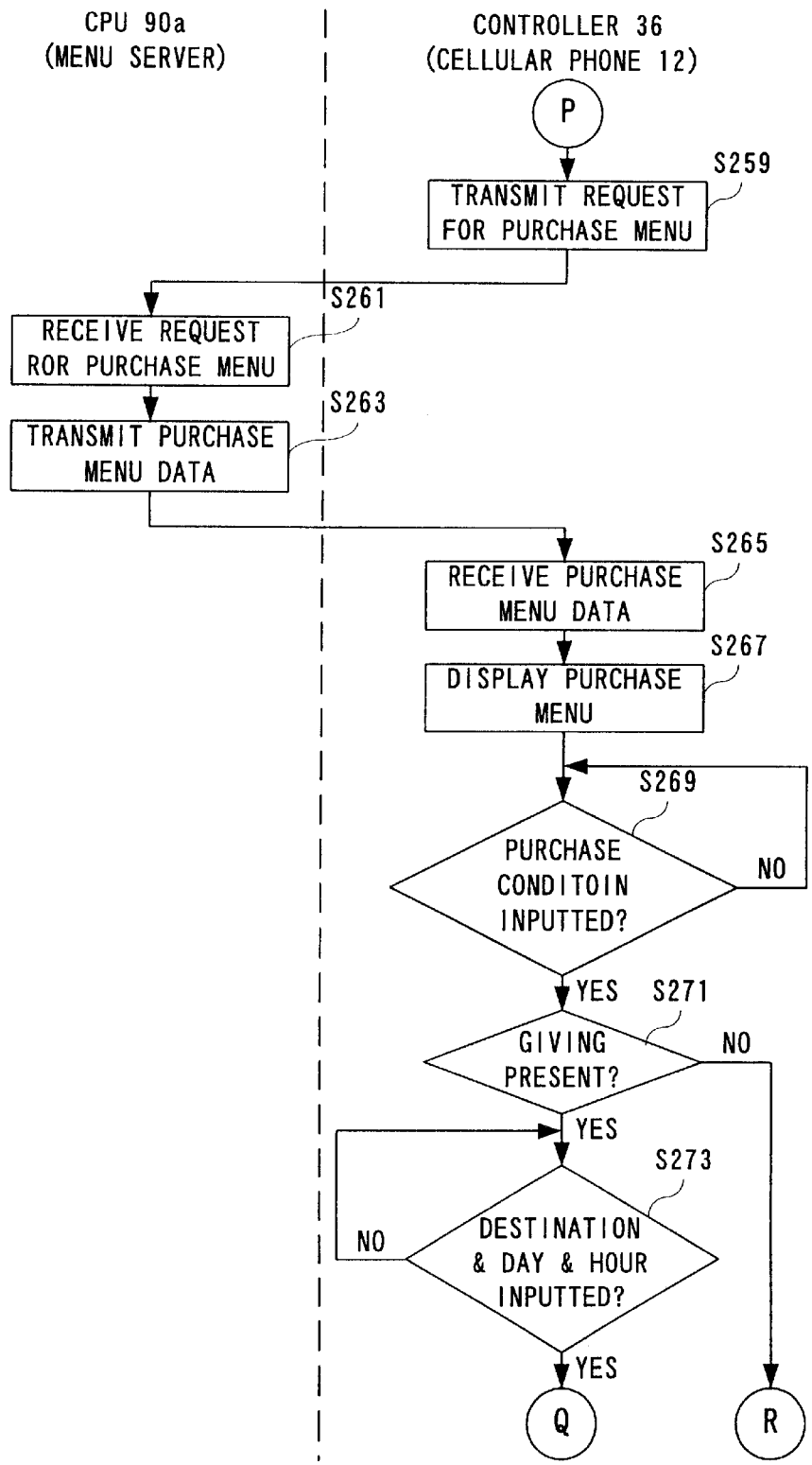
FIG. 27 is a flowchart showing still another part of the process to execute present-giving schedule, real-time delivery and present reception in the fourth embodiment of the information delivery system of the invention.
Figure 28:
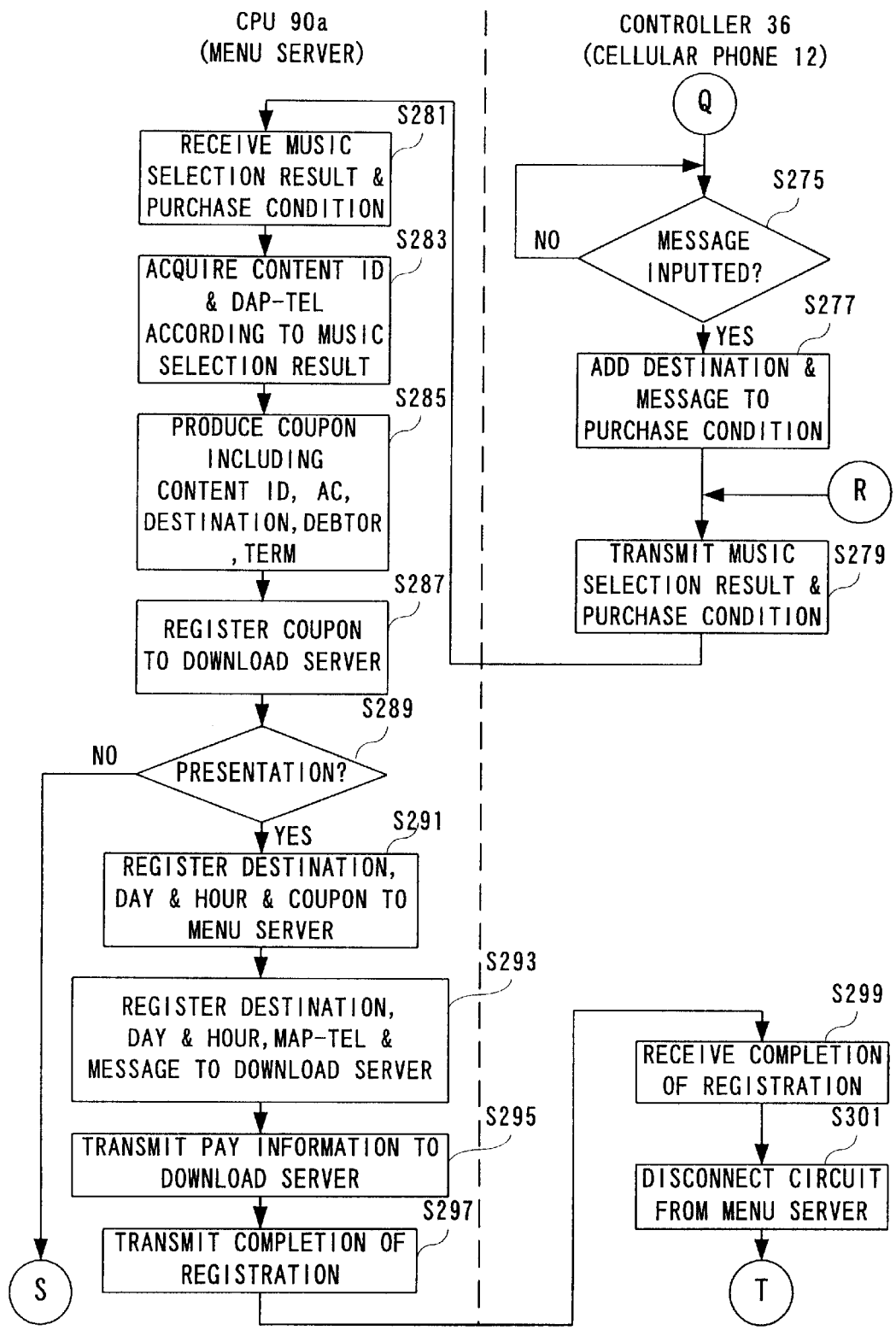
FIG. 28 is a flowchart showing yet another part of the process to execute present-giving schedule, real-time delivery and present reception in the fourth embodiment of the information delivery system of the invention.

As shown in FIG. 27, in step S259 the controller 36 transmits a purchase menu request. Consequently, in step S261 the CPU 90a receives the purchase menu request and in step S263 transmits purchase menu data. In step S265 the controller 36 receives the purchase menu data and in step S267 controls the driver 38 to display a purchase menu on the display 40. Subsequently, in step S269 the controller 36 determines whether a purchase condition has been inputted or not according to the purchase menu. If "NO" in the step S269, i.e. the purchase condition has not been completed, the process directly returns to the step S269. On the other hand, if "YES" in the step S269, i.e. the purchase condition has been inputted, it is determined in step S271 whether giving a present or not. If "NO" in the step S271, i.e. not a present, the process proceeds to step S279 shown in FIG. 28. On the other hand, if "YES" in the step S271, i.e. to give a present, it is determined in step S273 whether a destination and delivery day and hour have been inputted or not. If "NO" in the step S273, i.e. a destination and delivery day and hour or the both is not inputted, the process directly returns to the step S273. On the other hand, if "YES" in the step S273, i.e. a destination and delivery day and hour are inputted, it is determined in step S275 shown in FIG. 28 whether a message has been inputted or not. If "NO" in the step S275, i.e. a message is not inputted, the process directly returns to the same step S275. On the other hand, if "YES" in the step S275, i.e. a message has been inputted, in step S277 the destination (telephone no., etc.) and the message are added to the purchase condition. Then, in step S279 the controller 36 transmits a music selection result and purchase condition.

Consequently, the CPU 90a in step S281 receives the music selection result and purchase condition and in step S283 acquires from the HDD 94 a content ID and connection information (DAP-TEL) to a download-server 26 access point (DAP) according to the music selection result. Next, the CPU 90a in step S285 produces a coupon including a content ID, AC, a destination, a debtor and a downloadable term according to the purchase condition, and in step S287 registers the coupon to the download server 26. That is, the coupon is stored in the database 104b on the HDD 104.

Subsequently, the CPU 90a in step S289 determines whether to give a present or not. If "NO" in the step S289, i.e. not to give a present, the process advances to step S311 shown in FIG. 29. On the other hand, if "YES" in the step S289, i.e. to give a present, then in step S291 the destination and DAP-TEL//coupon are stored in the HDD 94. In step S293, the CPU 90a registers the destination, delivery day and hour and connection information (MAP-TEL) to the access point (MAP), and message to the download server 26. That is, the destination, delivery day and hour, connection information (MAP-TEL) and message are stored in the database 104b on the HDD 104. Subsequently, in step S295 the CPU 90a transmits pay information to the download server 26. That is, pay information is stored in the database 104d on the HDD 104 of the download server 26. Then, the CPU 90a in step S297 transmits registration completion of the present-giving schedule.

Figure 29:
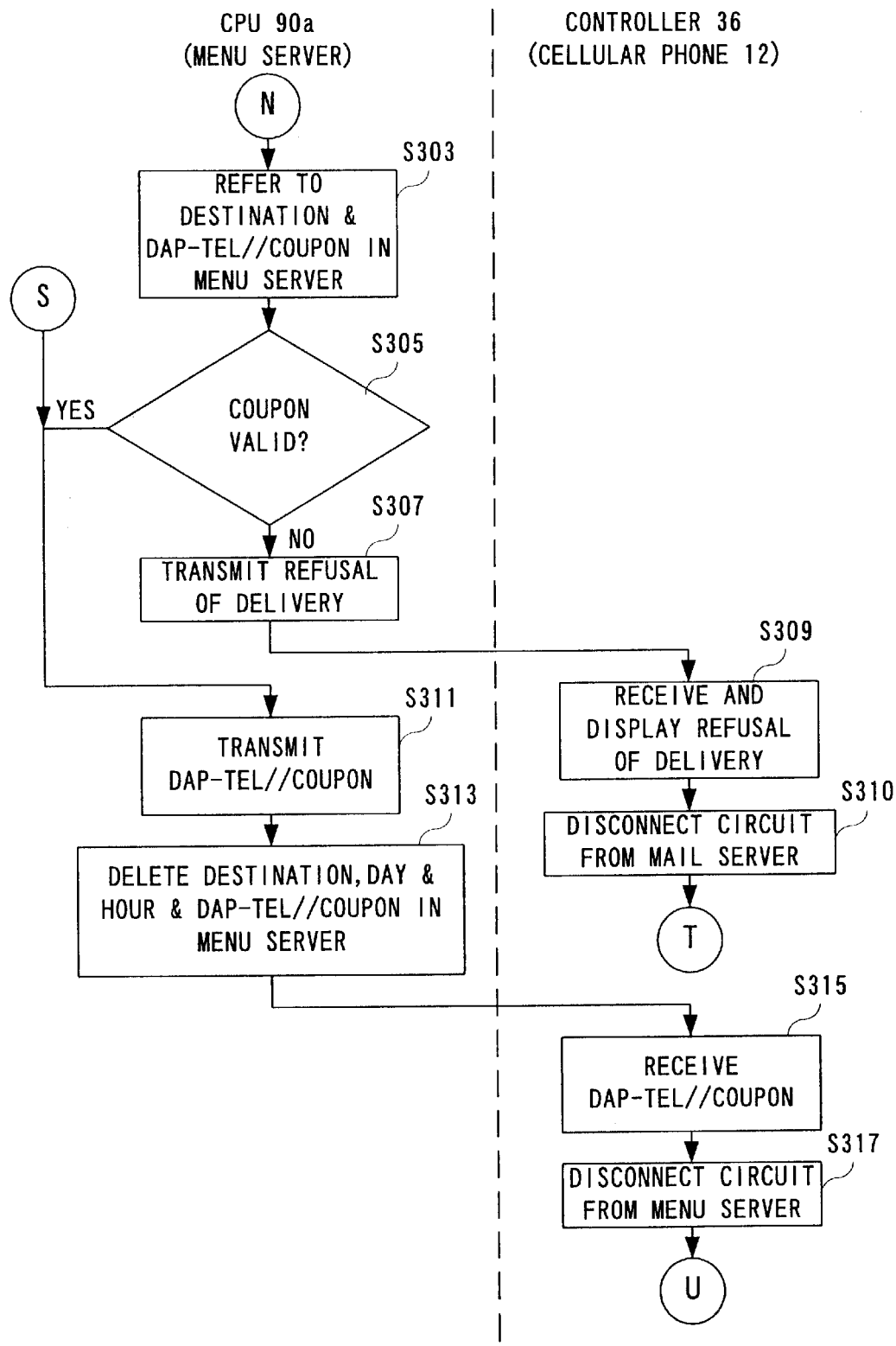
FIG. 29 is a flowchart showing further part of the process to execute present-giving schedule, real-time delivery and present reception in the fourth embodiment of the information delivery system of the invention.

Accordingly, the controller 36 in step S299 receives registration completion and in step S 301 disconnects the circuit from the menu server 24, then ending the process as shown in FIG. 29. That is, the present-giving scheduling is ended.

Meanwhile, where determined as reception of a present in step S243 shown in FIG. 25, the CPU 90a in step S303 shown in FIG. 29 refers to the destination and DAP-TEL// coupon stored on the HDD 94 of the menu server 24. In the succeeding step S305, the CPU 90a determines whether the coupon is valid or not. Specifically, in the menu server 24 checking is made for at least the destination (receiptor) and downloadable term included in the coupon. If "NO" in step S305, i.e. at least one do not satisfy a condition, then a refusal of delivery is transmitted in step S307. Consequently, in step S309 the controller 36 receives the refusal of delivery and hence controls the driver 38 to display a notice message of delivery refusal, e.g. not downloadable, and in step S310 disconnects the circuit from the menu server 24, ending the process as shown in FIG. 30.

On the other hand, if "YES" in the step S305, i.e. the destination is met and further in a term of downloadable, the process advances to step S311. In the step S311, the CPU 90a transmits DAP-TEL//coupon and in step S313 deletes the destination, delivery day and hour and DAP-TEL// coupon from the storage on the HDD 94. Incidentally, in the case of downloading encrypted music data for own possession, the process of the step S313 is not to be carried out because a destination, a delivery day and hour and DAP-TEL//coupon are not registered in the menu server 24.

Figure 30:
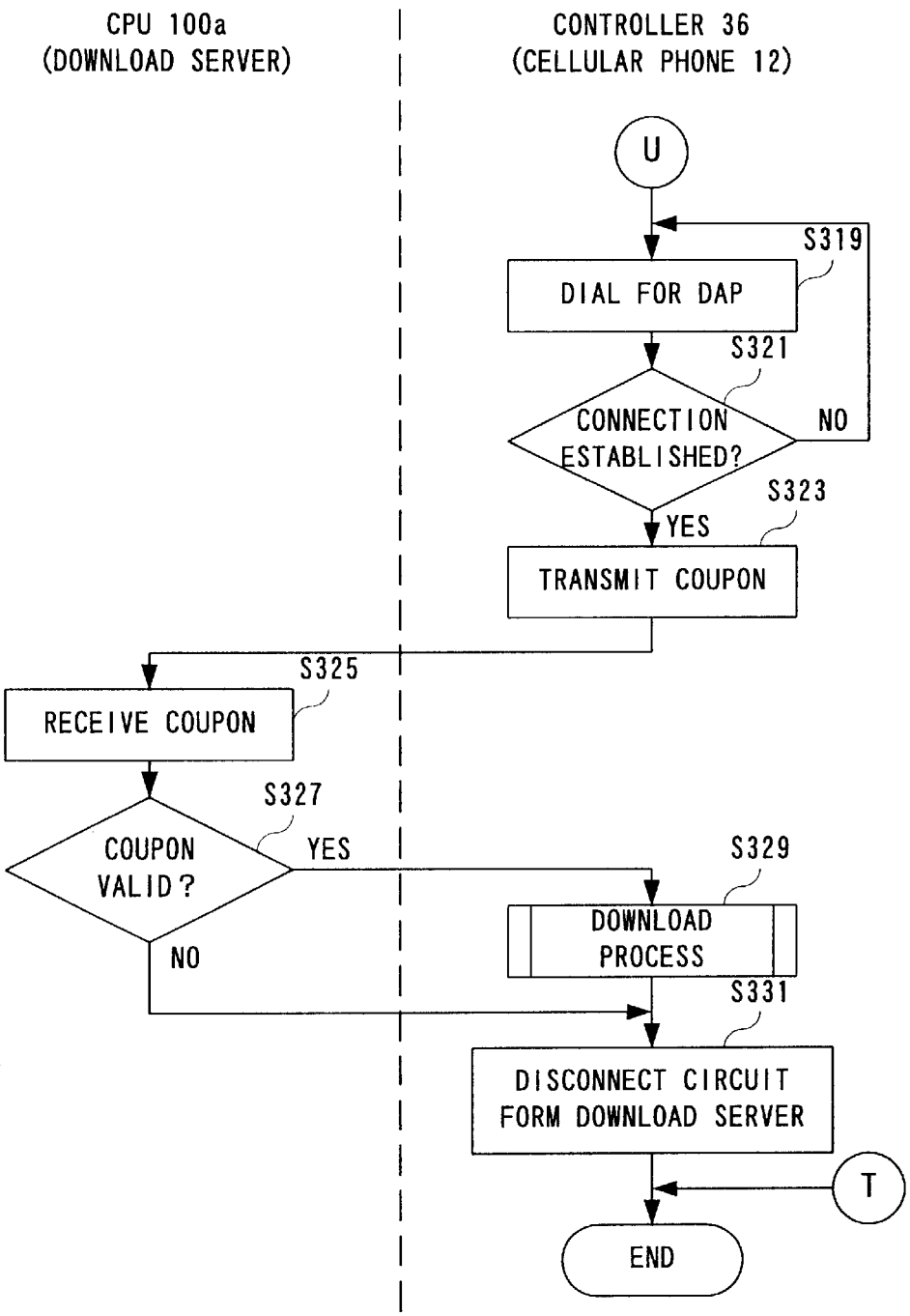
FIG. 30 is a flowchart showing another part of the process to execute present-giving schedule, real-time delivery and present reception in the fourth embodiment of the information delivery system of the invention.

The controller 36 in step S315 receives the DAP-TEL// coupon and in step S317 disconnects the circuit from the menu server 24, advancing to the step S319 shown in FIG. 30. In the step S319, the controller 36 dials for connection information (DAP-TEL) to a download-server 26 access point (DAP). In the subsequent step S321, it is determined whether a connection has been established to the download server 26 or not. If "NO" in the step S321, i.e. a connection is not established, the process returns to the step S319 to perform re-dialing. On the other hand, if "YES" in the step S321, i.e. a connection is established, in step S323 the coupon is transmitted to the download server 26.

Accordingly, in step S325 the CPU 100a in the download server 26 receives the coupon and in step S327 determines whether the coupon is valid or not. That is, it is determined whether the transmitted coupon is the same as the coupon stored in the database 104b or not. Further, determination is made whether within a downloadable term or not. If "YES" in the step S327, i.e. the coupon is valid, then in step S329 the controller 36 executes a download process and in step S331 disconnects the circuit from the download server 26, then ending the process. On the other hand, if "NO" in the step S327, i.e. the coupon is invalid, the controller 36 in step S331 disconnects the circuit from the download server 26, thus ending the process.

Figure 18:
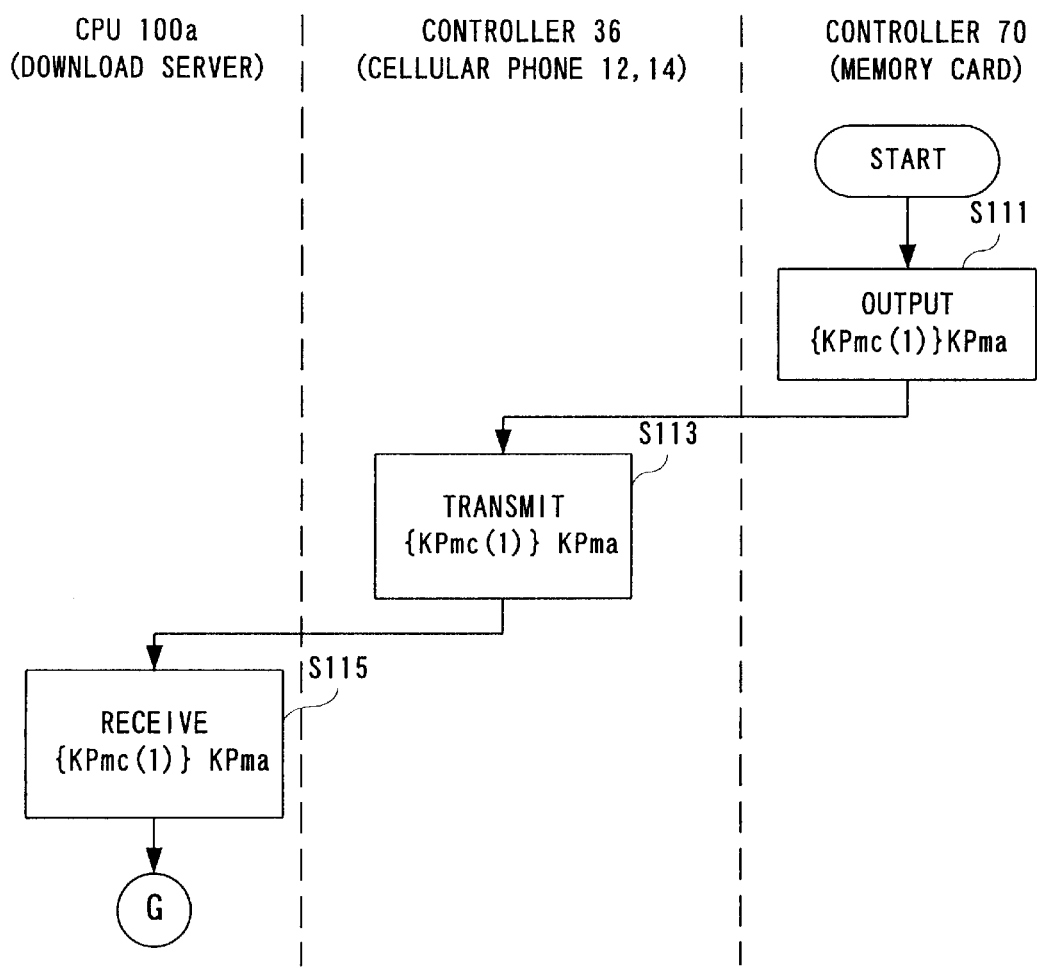
FIG. 18 is a flowchart showing one part of a download process to actually download music data from a download server shown in FIG. 6 into a memory card.
Figure 19:
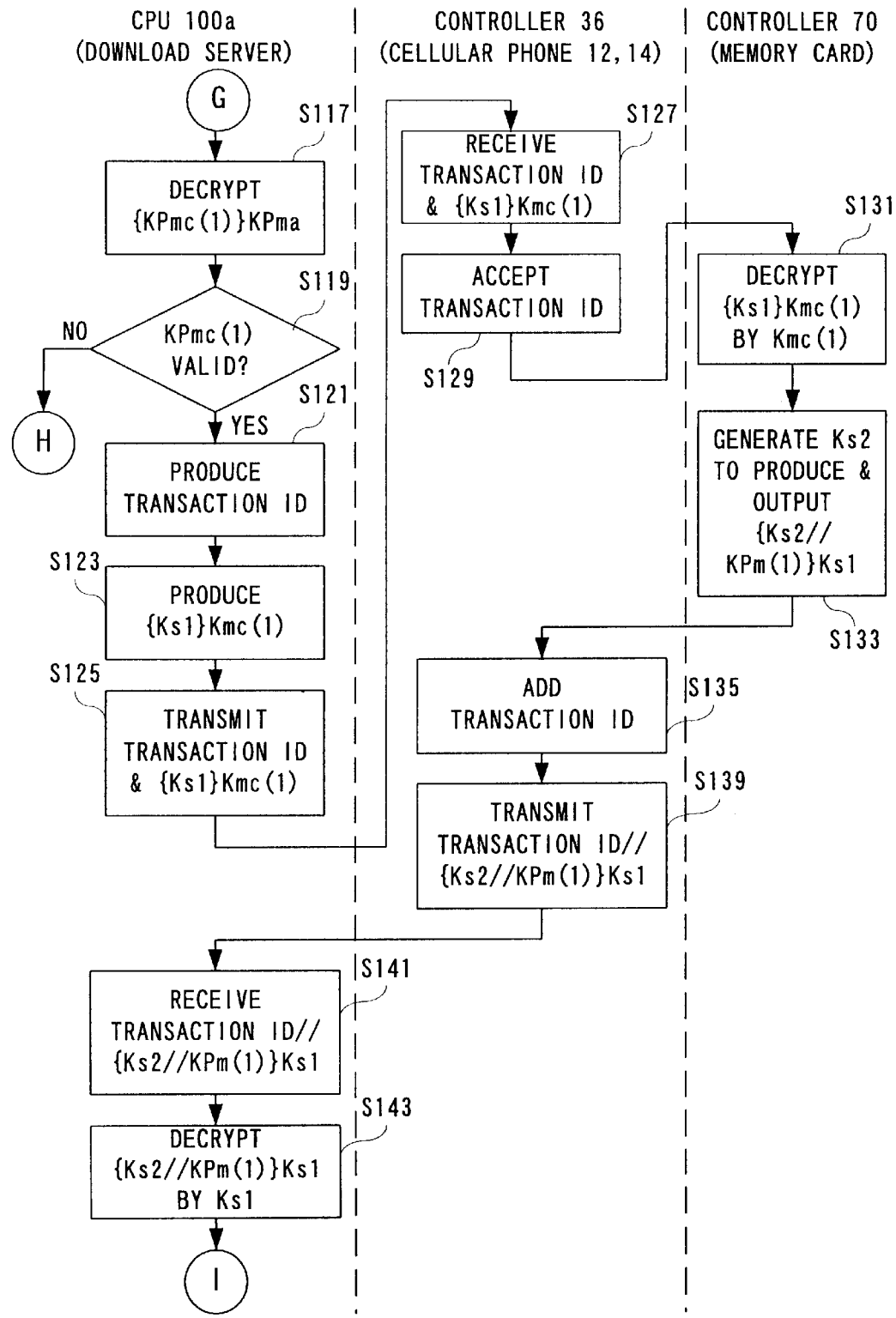
FIG. 19 is a flowchart showing another part of the download process to actually download music data from the download server shown in FIG. 6 onto the memory card.
Figure 20:
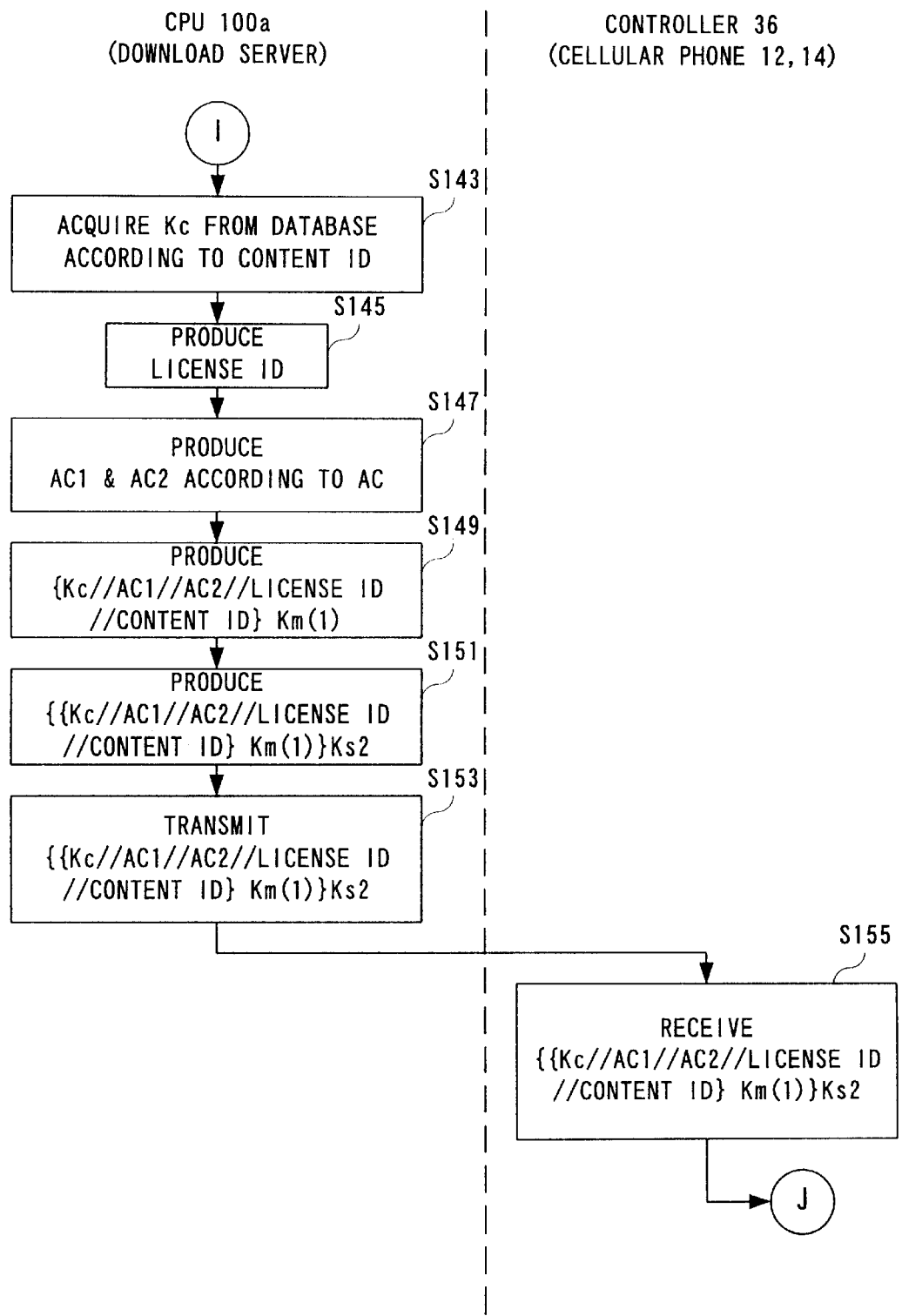
FIG. 20 is a flowchart showing still another part of the download process to actually download music data from the download server shown in FIG. 6 onto the memory card.

Incidentally, the download process shown in the step S329 is similar to the process of FIG. 18 and FIG. 21. Hence, duplicated explanations will be omitted. Also, the reproducing process is similar to the process of FIG. 23 and FIG. 24, omitting duplicated explanations. Furthermore, the process in the case of notifying a presence of a present is similar to that of the third embodiment, omitting duplicated explanations.

According to the fourth embodiment, a coupon is received according to a delivery menu regardless of a presence or absence of a present. Accordingly, processing is made similar for a process of receiving a present and a process of downloading encrypted music data for own possession.

Incidentally, in the third and fourth embodiments, after receiving a coupon, encrypted music data and a content key are downloaded according to a serial stream. Alternatively, a coupon may be once received and thereafter a download process be implemented.

For example, in step S313 shown in FIG. 29, coupon// DAP-TEL is transmitted from the main server 24 to the cellular phone 12 (or cellular phone 14) and in step S315 the cellular phone 12 (or cellular phone 14) receives the coupon//DAP-TEL, whereupon the circuit is disconnected from the menu server 24. Here, the process is once ended.

Incidentally, hereafter the cellular phone 12 or cellular phone 14 can access the download server 26 according to an instruction of the user and execute a download process according to the coupon.

Fifth Embodiment

An information deliver system 10 of a fifth embodiment is similar to the third embodiment except in that in present-giving scheduling the cellular phone 12 (or cellular phone 14) in executing a present-giving schedule acquires at one time connection information to a download-server 26 access point (DAP) and a coupon from the menu server 24 and then attaches them to a message to be sent as an e-mail and registered to the mail server 22. Hence duplicated explanations will be omitted.

The processes of a concrete present-giving schedule and of downloading encrypted music data for own possession by a user of the cellular phone 12 (or cellular phone 14) are carried out according to a flowchart shown in FIG. 31 to FIG. 35. Incidentally, the process of FIG. 31 to FIG. 35 shows only a case of using the cellular phone 12. It is of course possible to replace with the cellular phone 14.

Figure 31:
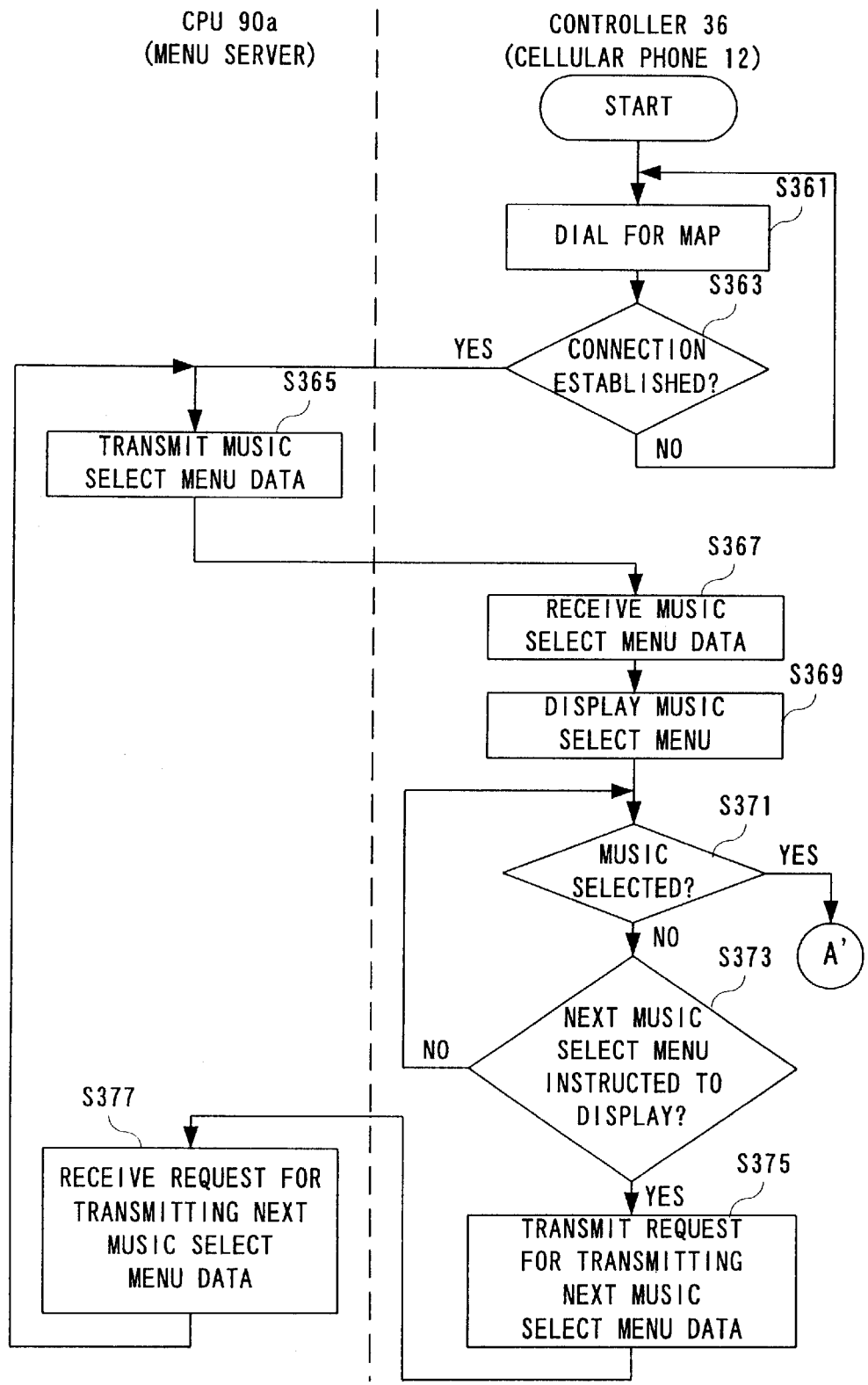
FIG. 31 is a flowchart showing one part of a process to execute present-giving schedule and real-time delivery in the fifth embodiment of the information delivery system of the invention.

Referring to FIG. 31, first the controller 36 in step S361 dials for connection information (MAP-TEL) to a menu-server 24 access point (MAP). In the succeeding step S363, the controller 36 determines whether a connection has been established or not. If "NO" in the step S363, i.e. a connection is not established, the process returns to the step S1 to perform re-dialing. On the other hand, if "YES" in the step S363, i.e. a connection is established, in step S365 the CPU 90a transmits a predetermined amount of music selection menu data.

Consequently, in step S367 the controller 36 receives the music selection menu data and in step S369 controls the driver 38 to display a menu on the display 40. That is, on the display 40 is displayed a list classified in the order of the kana syllabary on a singer-by-singer or title-by-title basis. Subsequently, the controller 36 in step S371 determines whether there is music selection or not. That is, it is determined whether a determine button (not shown) provided on the operation panel 44 has been pressed or not. If "YES" in the step S371, i.e. the determine button is pressed, the process advances to step S379 shown in FIG. 32.

On the other hand, if "NO" in the step S371, i.e. if the determine button is not pressed, the controller 36 in step S373 determines whether there is an instruction to display a next menu or not. That is, it is determined whether a next-page button (not shown) provided on the operation panel 44 has been pressed or not. If "NO" in the step S373, i.e. the next-page button is not pressed, the process directly returns to the step S371. On the other hand, if "YES" in the step S373, i.e. the next-page button is pressed, then in step S375 is transmitted a transmission request for next music selection menu data. Consequently, the CPU 90a in step S377 receives the transmission request for music selection menu data and in step S365, in response thereto, executes transmission of the next music selection menu data.

Figure 32:
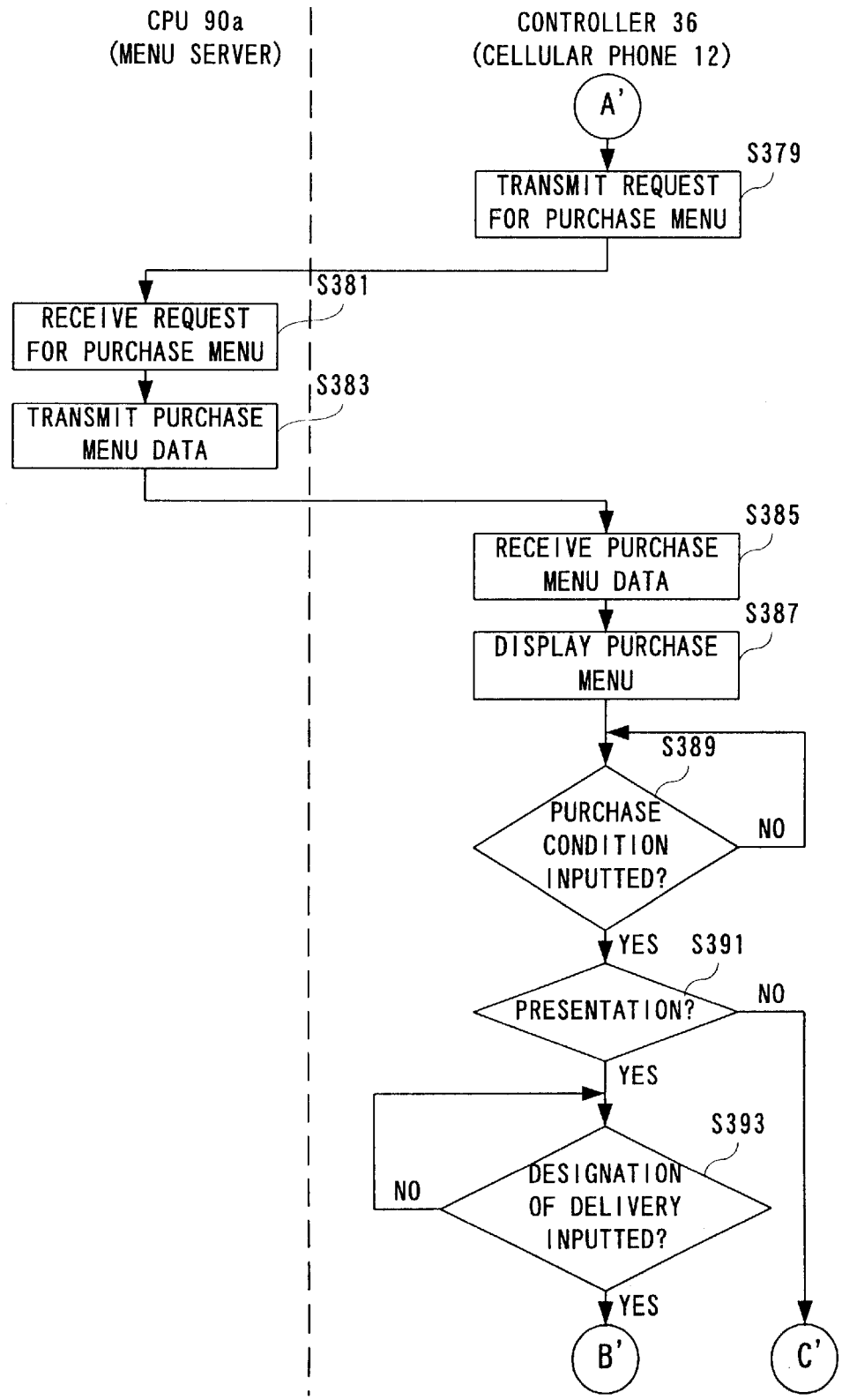
FIG. 32 is a flowchart showing another part of the process to execute present-giving schedule and real-time delivery in the fifth embodiment of the information delivery system of the invention.

In step S379 shown in FIG. 32, a purchase menu request is transmitted. In the succeeding step S381, the CPU 90a receives the purchase menu request. In response, the CPU 90a in step S383 transmits purchase menu data. Accordingly, in step S385 the controller 36 receives the purchase menu data and in step S387 controls the driver 38 to display a purchase menu on the display 40. Thus, the user is allowed to input a purchase condition in accordance with the purchase menu. That is, as was explained in the FIG. 6 embodiment, it is possible to select (input) whether to give a present or not and input a day and hour of presentation (or download day and hour). Furthermore, a reproduce condition such as the number of times of reproducing can be also be inputted.

In the succeeding step S389, the controller 36 determines whether the purchase condition has been inputted or not. That is, it is determined whether a reproduce condition and the like have been inputted or not. If "NO" in the step S389, i.e. the input of the reproduce condition and the like is not completed, the process directly returns to the same step S389. On the other hand, if "YES" in the step S389, i.e. the input of the reproduced condition and the like is completed, the controller 36 in step S391 determines whether to give a present or not. That is, it is determined whether giving a present has been selected on the purchase menu or not.

Figure 33:
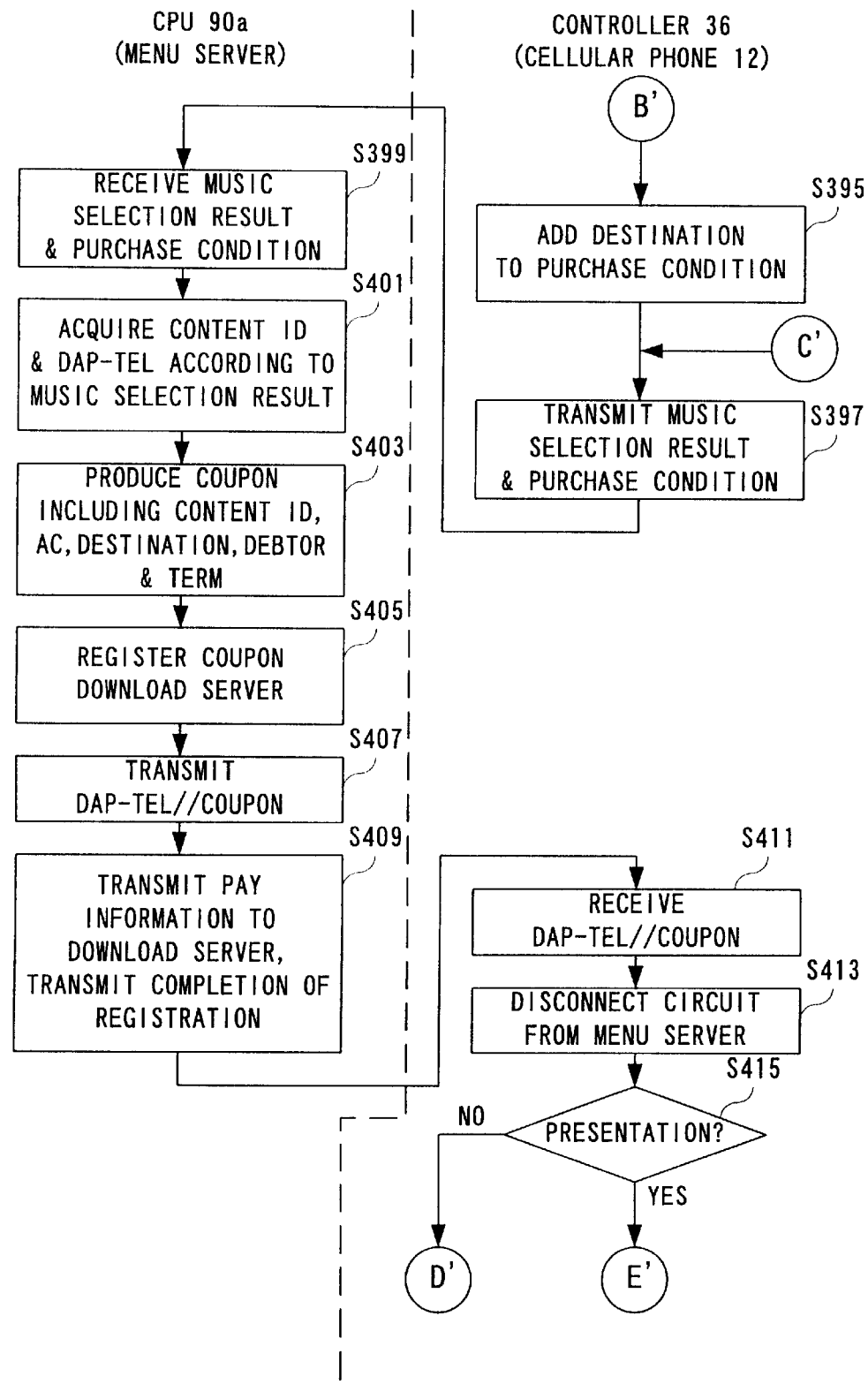
FIG. 33 is a flowchart showing still another part of the process to execute present-giving schedule and real-time delivery in the fifth embodiment of the information delivery system of the invention.

If "NO" in the step S391, i.e. not to give a present, the process directly advances to step S397 shown in FIG. 33. On the other hand, if "YES" in the step S391, i.e. to give a present, it is determined in step S393 whether a destination instruction, i.e. a telephone no. of a destination cellular phone or the like has been inputted or not. If "NO" in the step S393, i.e. a telephone no. or the like is not inputted, the process directly returns to the step S393. On the other hand, if "YES" in the step S393, i.e. a telephone no. or the like is inputted, the process proceeds to step S395 shown in FIG. 33.

In the step S395 the controller 36 adds the destination (telephone no. or the like) to the purchase condition, and the process proceeds to step S397. In the step S397 the controller 36 transmits a music selection result and purchase condition.

Consequently, in step S399 the CPU 90a receives the music selection result and purchase condition. In the succeeding step S401, the CPU 90a acquires from the HDD 94 a content ID and connection information (DAP-TEL) to an access point to the download server 26, according to the music selection result. Next, the CPU 90a in step S403 produces a coupon including a content ID, a license request information AC, a destination, a debtor and a downloadable term. Then, the CPU 90a in step S405 communicates with the download server 26 and registers the coupon to the download server 26. That is, the coupon is stored to the database 104b on the HDD provided in the download server 26.

Subsequently, the CPU 90a in step S407 transmits to the cellular phone 12 the connection information (DAP-TEL) to an access point (DAP) to the download server 26 and a coupon, i.e. DAP-TEL//coupon, and in step S409 communicates with the download server 26 to register pay information. The pay information is stored to the database 104c on the HDD 104 provided in the download server 26.

On the other hand, the controller 36 in step S411 receives the DAP-TEL//coupon and in step S413 disconnects the circuit from the menu server 24, and in step S415 determines whether to give a present or not according to the information inputted in the purchase menu. If "NO" in the step S415, i.e. not to give a present, the process proceeds to step S427 shown in FIG. 35 to execute a process of downloading for own purpose.

Figure 34:
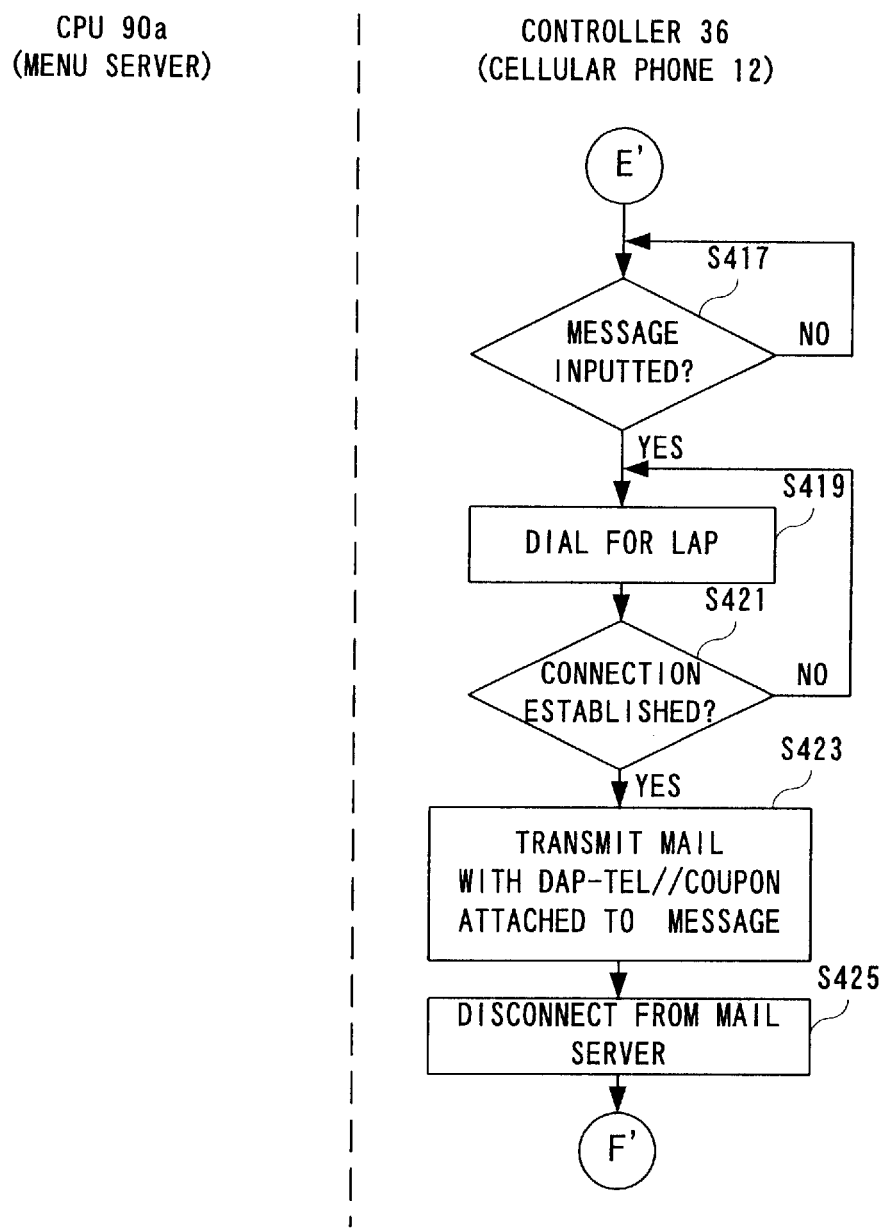
FIG. 34 is a flowchart showing yet another part of the process to execute present-giving schedule and real-time delivery in the fifth embodiment of the information delivery system of the invention.

On the other hand, if "YES" in step S415, i.e. to give a present, it is determined in step S417 shown in FIG. 34 whether a message has been inputted or not. If "NO" in the step S417, i.e. the input of a message is not completed, the process directly returns to the same step S417. On the other hand, if "YES" in the step S417, i.e. the input of a message is ended, in step S419 dialing is made for connection information (LAP-TEL) to the an access point (LAP) to the mail server 22.

In the succeeding step S421, it is determined whether a connection has been established to the mail server 22 or not. If "NO" in the step S421, i.e. a connection is not established, the process returns to the step S419 to perform re-dialing. On the other hand, if "YES" in the step S421, i.e. a connection is established, then in step S423 an e-mail with a message attached with the DAP-TEL//coupon is transmitted (registered) to the mail server 22, and in step S425 the circuit to the mail server 22 is disconnected. Then, the process is ended as shown in FIG. 35. That is, the present-giving schedule process is completed.

As shown in FIG. 35, in step S427 the controller 36 dials for connection information (DAP-TEL) to an access point (DAP) to the download server 26. Subsequently, in step S429 it is determined whether a connection to the download server 26 has been established or not. If "NO" in the step S429, i.e. a connection is not established, the process returns to the step S427 to perform re-dialing. On the other hand, if "YES" in the step S429, i.e. a connection is established, in step s431 the coupon is transmitted to the download server 26.

Accordingly, in step S433 the CPU 100a of the download server 26 receives the coupon and in the succeeding step S435 determines whether the coupon is valid or not. If "YES" in the step S435, i.e. the coupon is valid, in step S437 the controller 36 executes a download process and in step S439 disconnects the circuit from the download server 26, then ending the process. On the other hand, if "NO" in the step S435, i.e. the coupon is invalid, the controller 36 in step S439 directly disconnects the circuit from the download server 26, thus ending the process.

Incidentally, the present receiving process, the download process and the reproducing process are the same as the processes shown in FIG. 16 to FIG. 24, duplicated explanations being omitted.

According to the fifth embodiment, it is possible to download, from the menu server, connection information to an access point to the download server and a coupon by the use of a cellular phone, and attach them to a message to be sent as an e-mail and registered to the mail server. That is, there is no need of including a mail server in the delivery server. Thereafter, the cellular phone having received the e-mail is allowed to receive a present according to the download-server access point and coupon. That is, music data is downloaded.

Incidentally, the third to fifth embodiments explained on only music data as content data. It is also possible to use other ones of data such as character data, map data and image data.

Meanwhile, in the third to fifth embodiments, the CPUs and controllers provided in the download server and memory card made the encryption and decryption processes. Alternatively, an exclusive circuit may be provided because the processing of encryption and decryption is enormous.

Furthermore, although these embodiments showed to use cellular phones, other portable communication terminals without having call functions may be of course applicable.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information delivery system, comprising: at least two portable communication terminals having a first portable communications terminal and a second portable communications terminal; and a delivery server for delivering content data to the portable communication terminal, wherein said at least two portable communication terminal each include content data selection means to select content data, delivery information input means to input delivery information including destination terminal information representative of at least said portable communication terminal as a destination, a delivery information transmitting means to transmit the delivery information input by said delivery information input means to said delivery server, delivery data receiving means to receive the content data delivered from said delivery server, and recording means to record the content data received by said delivery data receiving means; and said delivery server including delivery information receiving means to receive the delivery information from any of said portable communication terminals, and delivery means to deliver the content data to said portable communication terminal as the destination based on the delivery information received by said delivery information receiving means, wherein said server holds a plurality of content data being able to be delivered, and said server further includes menu transmitting means to transmit a menu by which one or more content data can be selected to first portable communication terminal, and said at least two portable communication terminal each include menu receiving means to receive the menu transmitted by said menu transmitting means, the first portable communications terminal selects by said content data selection means the content data to be transmitted to the second portable communications terminal.

2. An information delivery system according to claim 1, wherein said delivery server includes notifying means to notify said destination portable communication terminal of a presence of data to be delivered, and said delivery means delivering the data when there is a response to a notification of said notifying means from said destination portable communication terminal.

3. An information delivery system according to claim 1, wherein said portable communication terminal further includes message input means to input a message, and message transmitting means to transmit the message inputted by said message input means to said delivery server, said delivery server further including message receiving means to receive the message transmitted by said message transmitting means, and notifying means to notify said destination portable communication terminal of a presence of the message received by said message receiving means and data to be delivered, and said delivery means delivering the data when there is a response to a notification of said notifying means from said destination portable communication terminal.

4. An information delivery system according to claim 1, wherein the delivery information further includes delivery day and hour information representative of a day and hour of delivery for the data.

5. An information delivery system according to claim 4, wherein said delivery server includes notifying means to notify said destination portable communication terminal of a presence of data to be delivered on the delivery day and hour, and said delivery means delivering the data when there is a response to said notification of said notifying means from said destination portable communication terminal.

6. An information delivery system according to claim 5, wherein said delivery server includes managing means to manage said delivery information, and said managing means postponing the delivery day and hour when there is no response to the notification of said notifying means from said destination portable communication terminal.

7. An information delivery system according to claim 4, wherein
said portable communication terminal further includes message input means to input a message, and message transmitting means to transmit the message inputted by said message input means to said delivery server,
said delivery server further including message receiving means to receive the message transmitted by said message transmitting means, and notifying means to notify said destination portable communication terminal of a presence of the message received by said message receiving means and data to be delivered on the delivery day and hour, and
said delivery means delivering the data when there is a response to a notification of said notifying means from said destination portable communication terminal.

8. An information delivery system according to claim 7, wherein
said delivery server further includes managing means to manage the delivery information, and
said managing means postponing the delivery day and hour when there is no response to said notification of said notifying means from said destination portable communication terminal.

9. An information delivery system according to claim 4, wherein
said delivery server includes transmitting means to perform automatic transmission to said destination portable communication terminal on the delivery day and hour, and
said delivery means delivering the data when there is a response to automatic transmission from said destination portable communication terminal.

10. An information delivery system according to claim 9, wherein
said delivery server further includes managing means to manage the delivery information,
said managing means postponing the delivery day and hour when there is no response to the automatic transmission from said destination portable communication terminal or when there is a response to the automatic transmission from said destination portable communication terminal but the data cannot be recorded to said recording medium of said destination portable communication terminal.

11. An information delivery system according to claim 9, wherein
said delivery server further includes notifying means to notify a presence of data to be delivered, and
said notifying means notifying said destination portable communication terminal of a presence of data to be delivered when there is no response to the automatic transmission from said destination portable communication terminal or when there is a response to the automatic transmission from said destination portable communication terminal but the data cannot be recorded to said recording medium of said destination portable communication terminal.

12. An information delivery system according to claim 1, wherein
said portable communication terminal further includes message input means to input a message, and message transmitting means to transmit a message inputted through said message input means to said delivery server,
said delivery server further including message receiving means to receive the message transmitted by said message transmitting means, and
said delivery means delivering the data and the message received by said message receiving means to said destination portable communication terminal.

13. An information delivery system according to claim 1, wherein
said delivery information receiving means further includes producing means to produce a coupon based on the delivery information, and delivery guide transmitting means to transmit a delivery guide including the coupon produced by said producing means to said destination portable communication terminal,
said portable communication terminal further including delivery guide receiving means to receive the delivery guide, and coupon transmitting means to transmit the coupon included in the delivery guide to said delivery means, and
said delivery means including a coupon receiving means to receive the coupon from said portable communication terminal, and data delivery means to deliver the data to said destination portable communication terminal based on the coupon received by said coupon receiving means.

14. An information delivery system according to claim 13, wherein
said delivery guide includes connection information to said delivery means, and
said coupon transmitting means transmitting the coupon to said delivery means based on the connection information.

15. An information delivery system according to claim 13, wherein
said delivery means further includes comparing means to compare between the coupon produced by said producing means and the coupon received by said coupon receiving means, and
said data delivery means delivering data depending upon a result of comparison by said comparing means.

16. An information delivery system according to claim 13, wherein
said portable communication terminal further includes message input means to input a message, and message transmitting means to transmit the message inputted by said message input means to said delivery server, and
said delivery server further including message receiving means to receive the message transmitted by said message transmitting means, and
said delivery guide transmitting means transmitting the delivery guide and the message received by said message receiving means to said destination portable communication terminal.

17. An information delivery server according to claim 1, wherein
said delivery information receiving means further includes producing means to produce a coupon based on the delivery information, determining means to determine in response to connection of said portable communication terminal whether said portable communication terminal is a terminal to be delivered with the data or not, and delivery guide transmitting means to transmit a delivery guide including the coupon to said portable communication terminal when determined as a terminal to be delivered with the data, said portable communication terminal further including establishing means to establish a connection state with said delivery information receiving means, delivery guide receiving means to receive the delivery guide including an own-directed coupon in a presence of the own-directed coupon when connection state is established by said establishing means, and coupon transmitting means to transmit the coupon included in the delivery guide to said delivery means, and said delivery means including coupon receiving means to receive the coupon from said portable communication terminal, and data delivery means to deliver the data based on the coupon received by said coupon receiving means.

18. An information delivery system according to claim 17, wherein said portable communication terminal further includes message input means to input a message, and message transmitting means to transmit the message inputted by said message input means to said delivery server, said delivery server further including message receiving means to receive the message transmitted by said message transmitting means, and said delivery guide transmitting means transmitting the delivery guide and the message received by said message receiving means to said portable communication terminal.

19. An information delivery system according to claim 17, wherein the delivery guide includes connection information to said delivery means, and said coupon transmitting means transmitting the coupon to said delivery means based on the connection information.

20. An information delivery system according to claim 1, further comprising a mail server to transmit and receive an electronic mail between said portable communication terminals, wherein said delivery information receiving means includes producing means to produce a coupon based on the delivery information, and delivery guide transmitting means to transmit a delivery guide including a coupon produced by said producing means to said portable communication terminal, said portable communication terminal including delivery guide receiving means to receive the delivery guide, establishing means to establish a connection state to said mail server, registering means to register in said mail server an electronic mail directed to said destination portable communication terminal including the delivery guide received by said delivery guide receiving means, electronic mail receiving means to receive the electronic mail from said mail server, and coupon transmitting means to transmit the coupon included in the delivery guide included in the electronic mail to said delivery means, said mail server including arrival notifying means to receiving registration of the electronic mail from said portable communication terminal and notify of a presence of the electronic mail to said destination portable communication terminal, and electronic mail transmitting means to transmit the electronic mail to said destination portable communication terminal come into connection in response to a notification by said arrival notifying means, and said delivery means including coupon receiving means to receive the coupon from said portable communication terminal, and said data delivery means to deliver the data based on the coupon received by said coupon receiving means.

21. An information delivery system according to claim 20, wherein said portable communication terminal further includes message input means to input a message, and said registering means registering in said mail server the electronic mail including the delivery guide and the message input by said message input means.

22. An information delivery system according to claim 20, wherein said delivery guide includes connection information to said delivery means, and said coupon transmitting means transmitting the coupon to said delivery means based on the connection information.

23. An information delivery system according to claim 1, wherein said delivery server further includes billing means for data deliveries, and said billing means charging on a source of said delivery information.

24. A delivery server, comprising:

content data holding means to hold a plurality of content data being able to be delivered;

menu transmitting means to transmit a menu by which one or more content data can be selected to a first arbitrary portable communication terminal;

content data selection means to select data to be transmitted to a second arbitrary portable communication terminal on the basis of menu selection sent by said first arbitrary portable communication terminal;

delivery information receiving means for receiving, from said first arbitrary portable communication terminal, delivery information including destination terminal information representing at least a second destination portable communication terminal; and delivery means for delivering the selected data to said destination portable communication terminal based on the delivery information received by said delivery information receiving means.

25. A delivery server according to claim 24, further including notifying means to notify said destination portable communication terminal of a presence of data to be delivered, wherein said delivery means delivers when there is a response to a notification of said notifying means from said destination portable communication terminal.

26. A delivery server according to claim 24, wherein the delivery information further includes delivery day and hour information representative of a day and hour on which the data is to be delivered.

27. A delivery server according to claim 26, further including notifying means to notify on the delivery day and hour said destination portable communication terminal of a presence of data to be delivered, wherein said delivery means delivers the data when there is a response to a notification of said notifying means from said destination portable communication terminal.

28. A delivery server according to claim 27, further including managing means to manage the delivery information, wherein said managing means postpones the delivery day and hour when there is no response to a notification of said notifying means from said destination portable communication terminal.

29. A delivery server according to claim 26, further including transmitting means to perform automatic transmission to said destination portable communication terminal on the delivery day and hour; and said delivery means delivering the data when there is a response from said destination portable communication terminal.

30. A delivery server according to claim 24, wherein said delivery information receiving means further includes producing means to produce a coupon based on the delivery information, and delivery guide transmitting means to transmit a delivery guide including the coupon produced by said producing means to said destination portable communication terminal, and including coupon receiving means to receive the coupon from said portable communication terminal, and data delivery means to deliver the data to said destination portable communication terminal based on the coupon received by said coupon receiving means.

31. A delivery server according to claim 30, wherein the delivery information includes connection information to said delivery means.

32. A delivery server according to claim 30, wherein said delivery means further includes comparing means to compare between the coupon produced by said producing means and the coupon received by said coupon receiving means, and said data delivery means delivering the data depending upon a result of comparison by said comparing means.

33. A delivery server according to claim 24, further including message receiving means to receive a message from said portable communication terminal, and notifying means to notify said destination portable communication terminal of a presence of the message received by said message receiving means and data to be delivered.

34. A delivery server according to claim 24, further including message receiving means to receive a message from said portable communication terminal, wherein said delivery means delivers the data and the message received by said message receiving means to said destination portable communication terminal.

35. A delivery server according to claim 24, wherein said delivery information receiving means further includes producing means to produce a coupon based on the delivery information, determining means to determine responsive to connection of said portable communication terminal whether or not said portable communication terminal is a terminal to be delivered with the data, and delivery guide transmitting means to transmit a delivery guide including the coupon to said portable communication terminal when determined as a terminal to be delivered with the data, and said delivery means including coupon receiving means to receive the coupon from said portable communication terminal, and data delivery means to deliver the data based on the coupon received by said coupon receiving means.

36. A delivery server according to claim 35, further including message receiving means to receive a message from said portable communication terminal, wherein said delivery guide transmitting means transmit the delivery guide and the message received by said message receiving means to said portable communication terminal.

37. A delivery server according to claim 24, further including electronic mail managing means to transmit and receive an electronic mail, wherein said delivery information receiving means further includes producing means to produce a coupon based on the delivery information, and delivery guide transmitting means to transmit a delivery guide including the coupon produced by said producing means to said portable communication terminal, said electronic mail managing means including arrival notifying means to receive registration of an electronic mail including the delivery guide and directed to said portable communication terminal from said portable communication terminal and notify said destination portable communication terminal of a presence of the electronic mail, and electronic mail transmitting means to transmit the electronic mail to said destination portable communication terminal come into connection responsive to a notification from said arrival notifying means, and said delivery means including coupon receiving means to receive the coupon from said portable communication terminal, and data delivery means to deliver the data based upon the coupon received by said coupon receiving means.

38. A delivery server according to claim 24, further including billing means concerning data delivery, wherein said billing means charging on a source of the delivery information.

39. The information delivery system recited in claim 1, wherein the data is digital content selected by the first portable communications terminal from a menu.

40. The information delivery system recited in claim 39, wherein the digital content is music.

41. The information delivery system recited in claim 24, wherein the data is digital content selected by the first portable communications terminal from a menu.

42. The information delivery system recited in claim 41, wherein the digital content is music.

43. The information delivery system as recited in claim 13, wherein said coupon includes a content ID, a delivery destination, and debtor information.

44. The delivery server as recited in claim 30, wherein said coupon includes a content ID, a delivery destination, and debtor information.

* * * * *